US010740193B2

(12) United States Patent
Dhatrak

(10) Patent No.: US 10,740,193 B2
(45) Date of Patent: Aug. 11, 2020

(54) HYPERVISOR-INDEPENDENT REFERENCE COPIES OF VIRTUAL MACHINE PAYLOAD DATA BASED ON BLOCK-LEVEL PSEUDO-MOUNT

(71) Applicant: Commvault Systems, Inc., Tinton Falls, NJ (US)

(72) Inventor: Vinit Dilip Dhatrak, Iselin, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 280 days.

(21) Appl. No.: 15/899,779

(22) Filed: Feb. 20, 2018

(65) Prior Publication Data

US 2018/0253361 A1 Sep. 6, 2018

Related U.S. Application Data

(60) Provisional application No. 62/464,256, filed on Feb. 27, 2017.

(51) Int. Cl.
*G06F 16/00* (2019.01)
*G06F 11/14* (2006.01)
(Continued)

(52) U.S. Cl.
CPC ........ *G06F 11/1469* (2013.01); *G06F 11/302* (2013.01); *G06F 11/3034* (2013.01);
(Continued)

(58) Field of Classification Search
CPC ........... G06F 11/1469; G06F 2201/815; G06F 9/45558; G06F 11/1451
See application file for complete search history.

(56) References Cited

U.S. PATENT DOCUMENTS

| | | | |
|---|---|---|---|
| 4,084,231 | A | 4/1978 | Capozzi et al. |
| 4,267,568 | A | 5/1981 | Dechant et al. |

(Continued)

FOREIGN PATENT DOCUMENTS

| | | | |
|---|---|---|---|
| CN | 101650680 | A | 2/2010 |
| EP | 0259912 | | 3/1988 |

(Continued)

OTHER PUBLICATIONS

Kumarasamy et al., U.S. Appl. No. 13/794,357 U.S. Pat. No. 8,938,481, filed Mar. 11, 2013, Generic File Level Restore From a Block-Level Secondary Copy.

(Continued)

*Primary Examiner* — Leslie Wong
(74) *Attorney, Agent, or Firm* — Knobbe Martens Olson & Bear LLP

(57) ABSTRACT

Hypervisor-independent reference copies of virtual machine payload data based on block-level pseudo-mount infrastructure and techniques are generated and stored in an illustrative data storage management system. An illustrative hypervisor-independent reference copy comprises one or more virtual-machine payload data files that originated from a first virtual machine. The hypervisor-independent virtual-machine-payload reference copy is governed by a distinct reference copy policy that controls retention, storage, tiering, scheduling, etc. for the reference copy, independently of how the illustrative system treats other virtual machine payload data files originating from the same virtual machine.

20 Claims, 21 Drawing Sheets

(51) Int. Cl.
*G06F 11/30* (2006.01)
*G06F 11/32* (2006.01)
*G06F 9/455* (2018.01)

(52) U.S. Cl.
CPC ........ *G06F 11/3055* (2013.01); *G06F 11/328* (2013.01); *G06F 9/45558* (2013.01); *G06F 11/1451* (2013.01); *G06F 11/1453* (2013.01); *G06F 2009/45583* (2013.01); *G06F 2201/815* (2013.01); *G06F 2201/865* (2013.01)

(56) References Cited

U.S. PATENT DOCUMENTS 4,283,787 A 8/1981 Chambers
4,417,321 A 11/1983 Chang et al.
4,641,274 A 2/1987 Swank
4,654,819 A 3/1987 Stiffler et al.
4,686,620 A 8/1987 Ng
4,912,637 A 3/1990 Sheedy et al.
4,995,035 A 2/1991 Cole et al.
5,005,122 A 4/1991 Griffin et al.
5,093,912 A 3/1992 Dong et al.
5,133,065 A 7/1992 Cheffetz et al.
5,193,154 A 3/1993 Kitajima et al.
5,212,772 A 5/1993 Masters
5,226,157 A 7/1993 Nakano et al.
5,239,647 A 8/1993 Anglin et al.
5,241,668 A 8/1993 Eastridge et al.
5,241,670 A 8/1993 Eastridge et al.
5,276,860 A 1/1994 Fortier et al.
5,276,867 A 1/1994 Kenley et al.
5,287,500 A 2/1994 Stoppani, Jr.
5,301,286 A 4/1994 Rajani
5,321,816 A 6/1994 Rogan et al.
5,347,653 A 9/1994 Flynn et al.
5,410,700 A 4/1995 Fecteau et al.
5,420,996 A 5/1995 Aoyagi
5,454,099 A 9/1995 Myers et al.
5,559,991 A 9/1996 Kanfi
5,642,496 A 6/1997 Kanfi
6,006,029 A 12/1999 Bianchi et al.
6,418,478 B1 7/2002 Ignatius et al.
6,542,972 B2 4/2003 Ignatius et al.
6,658,436 B2 12/2003 Oshinsky et al.
6,721,767 B2 4/2004 De Meno et al.
6,760,723 B2 7/2004 Oshinsky et al.
6,832,330 B1 12/2004 Boudrie
6,912,629 B1 6/2005 West et al.
6,934,725 B1 8/2005 Dings
7,003,641 B2 2/2006 Prahlad et al.
7,035,880 B1 4/2006 Crescenti et al.
7,107,298 B2 9/2006 Prahlad et al.
7,130,970 B2 10/2006 Devassy et al.
7,162,496 B2 1/2007 Amarendran et al.
7,174,433 B2 2/2007 Kottomtharayil et al.
7,246,207 B2 7/2007 Kottomtharayil et al.
7,315,923 B2 1/2008 Retnamma et al.
7,337,264 B2 2/2008 Iida et al.
7,343,453 B2 3/2008 Prahlad et al.
7,389,311 B1 6/2008 Crescenti et al.
7,395,282 B1 7/2008 Crescenti et al.
7,440,982 B2 10/2008 Lu et al.
7,454,569 B2 11/2008 Kavuri et al.
7,490,207 B2 2/2009 Amarendran et al.
7,500,053 B1 3/2009 Kavuri et al.
7,529,782 B2 5/2009 Prahlad et al.
7,536,291 B1 5/2009 Vijayan Retnamma et al.
7,539,707 B2 5/2009 Prahlad
7,543,125 B2 6/2009 Gokhale
7,546,324 B2 6/2009 Prahlad et al.
7,552,358 B1 6/2009 Asgar-Deen et al.
7,603,386 B2 10/2009 Amarendran et al.
7,606,844 B2 10/2009 Kottomtharayil
7,613,752 B2 11/2009 Prahlad et al.
7,617,253 B2 11/2009 Prahlad et al.
7,617,262 B2 11/2009 Prahlad et al.
7,620,710 B2 11/2009 Kottomtharayil et al.
7,634,627 B1 12/2009 Ohr
7,636,743 B2 12/2009 Erofeev
7,651,593 B2 1/2010 Prahlad et al.
7,657,550 B2 2/2010 Prahlad et al.
7,660,807 B2 2/2010 Prahlad et al.
7,661,028 B2 2/2010 Erofeev
7,676,628 B1 3/2010 Compton et al.
7,734,669 B2 6/2010 Kottomtharayil et al.
7,747,579 B2 6/2010 Prahlad et al.
7,801,864 B2 9/2010 Prahlad et al.
7,809,914 B2 10/2010 Kottomtharayil et al.
7,937,545 B1 5/2011 Wu
8,140,786 B2 3/2012 Bunte et al.
8,156,086 B2 4/2012 Lu et al.
8,170,995 B2 5/2012 Prahlad et al.
8,200,638 B1 6/2012 Zheng et al.
8,229,954 B2 7/2012 Kottomtharayil et al.
8,230,195 B2 7/2012 Amarendran
8,285,681 B2 10/2012 Prahlad
8,290,994 B2 10/2012 Allalouf et al.
8,307,177 B2 * 11/2012 Prahlad ............... G06F 11/1453 711/162
8,352,422 B2 1/2013 Prahlad et al.
8,364,652 B2 1/2013 Vijayan
8,370,542 B2 2/2013 Lu et al.
8,386,733 B1 2/2013 Tsaur
8,510,573 B2 8/2013 Muller et al.
8,528,059 B1 * 9/2013 Labana .................. H04L 63/18 726/5
8,578,120 B2 11/2013 Attarde
8,595,191 B2 11/2013 Prahlad et al.
8,719,264 B2 5/2014 Varadharajan
8,725,688 B2 5/2014 Lad
8,726,242 B2 5/2014 Ngo
8,745,105 B2 6/2014 Erofeev
8,775,823 B2 7/2014 Gokhale et al.
8,849,762 B2 9/2014 Kumarasamy et al.
8,938,481 B2 1/2015 Kumarasamy et al.
8,954,446 B2 2/2015 Retnamma
9,020,900 B2 4/2015 Retnamma
9,098,495 B2 8/2015 Gokhale
9,239,687 B2 1/2016 Vijayan
9,405,482 B2 8/2016 Varadharajan
9,436,555 B2 9/2016 Dornemann
9,547,562 B1 1/2017 Feathergill et al.
9,632,882 B2 4/2017 Kumarasamy et al.
9,633,033 B2 4/2017 Vijayan
9,766,825 B2 9/2017 Bhagi
9,811,522 B2 * 11/2017 St. Laurent ......... G06F 9/45558
9,852,026 B2 12/2017 Mitkar
9,946,603 B1 * 4/2018 Kumar .................. G06F 16/148
10,089,193 B2 10/2018 Kumarasamy et al.
10,228,962 B2 3/2019 Dornemann et al.
10,296,368 B2 5/2019 Dornemann et al.
10,360,110 B2 7/2019 Mitkar et al.
2004/0268068 A1 12/2004 Curran et al.
2006/0179261 A1 8/2006 Rajan
2006/0224846 A1 10/2006 Amarendran et al.
2008/0313236 A1 12/2008 Vijayakumar et al.
2009/0319534 A1 12/2009 Gokhale
2010/0011178 A1 1/2010 Feathergill
2010/0070544 A1 3/2010 Gopalan et al.
2010/0070725 A1 * 3/2010 Prahlad ............... G06F 11/1453 711/162
2010/0076932 A1 3/2010 Lad
2010/0262585 A1 10/2010 Rosikiewicz
2011/0184993 A1 7/2011 Chawla et al.
2012/0150818 A1 6/2012 Vijayan Retnamma et al.
2012/0150826 A1 6/2012 Vijayan Retnamma et al.
2012/0185437 A1 7/2012 Pavlov et al.
2013/0238562 A1 9/2013 Kumarasamy
2014/0032495 A1 1/2014 Erofeev
2014/0046900 A1 * 2/2014 Kumarasamy ...... G06F 11/1489 707/620
2014/0181438 A1 6/2014 Varadharajan
2014/0201151 A1 7/2014 Kumarasamy et al.
2014/0201162 A1 7/2014 Kumarasamy

(56) References Cited

U.S. PATENT DOCUMENTS

| | | | | |
|---|---|---|---|---|
| 2014/0201170 | A1 | 7/2014 | Vijayan et al. | |
| 2014/0250076 | A1 | 9/2014 | Lad | |
| 2015/0058382 | A1* | 2/2015 | St. Laurent | G06F 9/45558 707/823 |
| 2015/0286434 | A1 | 10/2015 | Dain et al. | |
| 2016/0042090 | A1 | 2/2016 | Mitkar et al. | |
| 2016/0132400 | A1 | 5/2016 | Pawar et al. | |
| 2016/0154709 | A1 | 6/2016 | Mitkar et al. | |
| 2016/0350391 | A1 | 12/2016 | Vijayan | |
| 2017/0024152 | A1 | 1/2017 | Bhagi et al. | |
| 2017/0168903 | A1 | 6/2017 | Dornemann | |
| 2017/0185488 | A1* | 6/2017 | Kumarasamy | G06F 11/2038 |
| 2017/0192860 | A1 | 7/2017 | Vijayan et al. | |
| 2017/0192861 | A1 | 7/2017 | Vijayan et al. | |
| 2017/0192866 | A1 | 7/2017 | Vijayan et al. | |
| 2017/0192867 | A1 | 7/2017 | Vijayan et al. | |
| 2017/0192868 | A1 | 7/2017 | Vijayan et al. | |
| 2017/0193003 | A1 | 7/2017 | Vijayan et al. | |
| 2017/0235507 | A1* | 8/2017 | Sinha | G06F 11/2069 711/114 |
| 2017/0235647 | A1 | 8/2017 | Kilaru et al. | |
| 2017/0242871 | A1 | 8/2017 | Kilaru et al. | |
| 2017/0249220 | A1 | 8/2017 | Kumarasamy et al. | |
| 2017/0262204 | A1* | 9/2017 | Dornemann | G06F 9/45558 |
| 2018/0089031 | A1 | 3/2018 | Mitkar et al. | |
| 2018/0373597 | A1 | 12/2018 | Rana | |
| 2019/0227832 | A1 | 7/2019 | Dornemann et al. | |
| 2019/0278667 | A1 | 9/2019 | Mitkar et al. | |

FOREIGN PATENT DOCUMENTS

| | | |
|---|---|---|
| EP | 0405926 | 1/1991 |
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| WO | WO 95/13580 | 5/1995 |
| WO | WO 99/12098 | 3/1999 |
| WO | WO 2006/052872 | 5/2006 |

OTHER PUBLICATIONS

Kumarasamy et al., U.S. Appl. No. 14/566,239 U.S. Pat. No. 9,632,882, filed Dec. 10, 2014, Generic File Level Restore From a Block-Level Secondary Copy.

Kumarasamy et al., U.S. Appl. No. 15/459,979 Published as 2017/0249220, filed Mar. 15, 2017, Generic File Level Restore From a Block-Level Secondary Copy.

Mitkar et al., U.S. Appl. No. 14/453,045 U.S. Pat. No. 9,852,026, filed Aug. 6, 2014, Efficient Application Recovery in an Information Management System Based on a Pseudo-Storage-Device Driver.

Mitkar et al., U.S. Appl. No. 15/809,776 Published as U.S. Appl. No. 15/809,776, filed Nov. 10, 2017, Application Recovery in an Information Management System Based on a Pseudo-Storage-Device Driver.

Mitkar et al., U.S. Appl. No. 15/015,049 Published as 2016/0154709, filed Feb. 3, 2016, Point-In-Time Backups of a Production Application Made Accessible Over Fibre Channel and/or ISCSI as Data Sources to a Remote Application by Representing the Backups as Pseudo-Disks Operating Apart From the Production Application and Its Host.

Dornemann et al., U.S. Appl. No. 15/436,563 Published as 2017/0262204, filed Feb. 17, 2017, Hypervisor-Independent Block-Level Live Browse for Access to Backed Up Virtual Machine (VM) Data and Hypervisor-Free File-Level Recovery (Block-Level Pseudo-Mount).

Arneson, "Mass Storage Archiving in Network Environments" IEEE, Oct. 31-Nov. 1998, pp. 45-50.

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, 1994, pp. 124-126.

Huff, KL, "Data Set Usage Sequence Number," IBM Technical Disclosure Bulletin, vol. 24, No. 5, Oct. 1981 New York, US, pp. 2404-2406.

Rosenblum et al., "The Design and Implementation of a Log-Structure File System," Operating Systems Review SIGOPS, vol. 25, No. 5, May 1991, New York, US, pp. 1-15.

* cited by examiner

FIG. 8 System 800 For Creating And Storing Hypervisor-Independent Reference Copies Of VM Payload Data Based On Block-Level Pseudo-Mount

HYPERVISOR-INDEPENDENT REFERENCE COPIES OF VIRTUAL MACHINE PAYLOAD DATA BASED ON BLOCK-LEVEL PSEUDO-MOUNT

INCORPORATION BY REFERENCE TO ANY PRIORITY APPLICATIONS

The present application claims the benefit of priority to U.S. Provisional Patent Application Ser. No. 62/464,256, filed on Feb. 27, 2017 with the title of "Hypervisor-Independent Reference Copies of Virtual Machine Payload Data Based on Block-Level Pseudo-Mount." Any and all applications for which a foreign or domestic priority claim is identified in the Application Data Sheet of the present application are hereby incorporated by reference in their entireties herein under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Businesses recognize the commercial value of their data and seek reliable, cost-effective ways to protect the information stored on their computer networks while minimizing impact on productivity. A company might back up critical computing systems such as databases, file servers, web servers, virtual machines, and so on as part of a daily, weekly, or monthly maintenance schedule. The company may similarly protect computing systems used by its employees, such as those used by an accounting department, marketing department, engineering department, and so forth. Given the rapidly expanding volume of data under management, companies also continue to seek innovative techniques for managing data growth, for example by migrating data to lower-cost storage over time, reducing redundant data, pruning lower priority data, etc.

SUMMARY

One of the major problems that arise in virtual machine ("VM") VM-rich data environments is that a lot of data is generated by using VMs, but due to the temporary nature of many VMs, the generated data can be lost track of or lost altogether due to poor data protection practices. The illustrative embodiment(s) according to the present invention solve this problem by way of generating the illustrative VM-payload reference copy. By being able to identify VM payload data files within block-level backups that lack file-level differentiation—and by doing so apart from the VM's hypervisor metadata in the block-level backups—the payload data files are properly protected within the illustrative data storage management system. The illustrative VM-payload reference copy techniques do not depend upon the continued operation of the VM that created the payload data files, nor do they depend upon a later re-activation of a VM to access the VM payload data files. Instead, VM-payload reference copies are created and managed in a hypervisor-independent and hypervisor-absent fashion, subject to their own retention and management policies without regard to how and when the VMs operate. For example, by using the illustrative VM-payload reference copy and associated techniques disclosed herein, VM payload data that is created by a first kind of VM-hypervisor technology can be protected (e.g., backed up, retained, etc.) apart from the VM environment, and independently of the VM virtual disk file (e.g., VMDK, VHD, etc.), such that individual VM-payload data files can be later restored to a non-VM non-hypervisor environment, to a different VM environment, or to a VM environment similar to the source.

According to the illustrative embodiment, backed up VM payload data is identified at a file level and selectively backed up into a so-called "VM-payload reference copy" without needing or using a hypervisor. A VM-payload reference copy is a secondary copy representing one or more, or as many as all of the, payload data files generated by a VM. The VM-payload reference copy becomes a uniquely identified and individually managed secondary copy in the exemplary data storage management system. The VM-payload reference copy is subject to storage management policy/policies in the system apart from and independent of the source data, regardless of how the system treats the original VM payload data, and/or any other copies of the VM payload data, and/or the VM's hypervisor metadata. The illustrative data storage management system defines a given subclient as comprising portions of data in the system, such as an exemplary collection of VM payload data files that act as the source for the VM-payload reference copy described herein. Thus, an exemplary subclient might be defined as the data files generated by a given VM in the system. Once defined, the subclient is subject to an associated storage policy (or "reference-copy storage policy") that initially creates the VM-payload reference copy and later manages it and subsequent versions of it, if any. The storage policy illustratively includes operational parameters such as retention/pruning rules, storage rules, tiering rules, schedules, etc. that are applied to one or more subclients associated with the given policy.

The illustrative system is capable of identifying the fact that the source of the data allocated to a subclient is a VM or data derived from a VM virtual disk file (e.g., VHD, VMDK, etc.). This is important because ordinarily VM payload data co-resides with hypervisor/VM metadata in the VM virtual disk file (e.g., VMDK, VHD, etc.) that is associated with the given VM. Typically, in block-level storage management environments, the VM virtual disk file is managed as a whole. However, according to an embodiment of the present invention, the illustrative data storage management system recognizes that source data comes from a VM and determines that specialized treatment is needed to protect some or all of the VM payload data, yet without being dependent upon the hypervisor that supports the VM, or for that matter, other hypervisors.

Consequently, the exemplary data storage management system invokes so-called "block-level pseudo-mount" techniques that identify and enumerate the VM payload data files (and/or secondary copies thereof) apart from hypervisor metadata and without needing or using a hypervisor. In regard to a backed up VM virtual disk file (e.g., VHD, VMDK, etc.), the VM payload data files are singled out, identified, and enumerated so that they may be individually or collectively selected and assigned to a reference-copy subclient, thus enabling a VM-payload reference copy to be generated and managed. The enumerated VM payload data files can be individually selected (e.g., by a user) or can be collectively assigned (e.g., based on selection criteria) to an illustrative VM-payload subclient, which is then governed by a reference-copy policy to create and manage the example VM-payload reference copy.

The advantage of determining that the data source is from a VM (e.g., found in a backup copy of the VM's virtual disk file (e.g., VHD, VMDK, etc.)) is that the illustrative system isolates the VM payload data away from the VM's hypervisor metadata, enumerates individual files even though the source is a block-level backup that lacks file-level granularity, selects which of the individual files to assign to a reference-copy subclient, and generates a VM-payload reference copy therefrom without having to invoke a hypervisor for any of these operations. Once the VM's virtual disk file (e.g., VHD, VMDK, etc.) has been backed up to a block-level secondary copy, subsequent data storage management operations illustratively described herein no longer require a hypervisor to access the VM's payload data files.

Moreover, the illustrative process for generating the VM-payload reference copy is flexible, in that individual VM-payload data files can be selectively treated differently, e.g., by being assigned to different subclients. For example, in regard to data files generated by a given VM, a first data file (e.g., test results) is assigned to a first reference-copy subclient associated with a certain test project; on the other hand, a second data file (e.g., VM user's word documents) is assigned to a second reference-copy subclient associated with the user's identity, which is subjected to a different reference-copy policy having different retention rules from the retention rules for the test project. Alternatively, for some VMs, all VM payload data files can be collectively assigned to a third reference-copy subclient so that they are all subjected to the same reference-copy policy based on their provenance (the given VM) regardless of individual data files' identities and/or purposes.

The illustrative process for generating the VM-payload reference copy is also flexible in that the same VM payload data file can be assigned to more than one subclient, each subclient leading to a distinct VM-payload reference copy having its own identity and subjected to its own reference-copy policy rules.

Flexibility is further enhanced by deduplication techniques. For example, the illustrative data storage management system can create a VM-payload reference copy that comprises actual copies of the source VM payload data files assigned in the reference-copy subclient, i.e., an actual copy of the data files. However, this creates duplicated storage and takes up storage resources. Alternatively, the VM-payload reference copy comprises pointers to the particular extents in the backup copy of the VM virtual disk file that form the data files assigned in the subclient, or pointers to actual copies of the VM payload data files residing elsewhere in the example data storage management system. Accordingly, the VM-payload reference copy(ies) occupy less storage space in the system, yet are able to protect the data files user separate storage policies.

As noted above, the illustrative system invokes a so-called "block-level pseudo-mount" technique that enables the VM payload data files (and/or secondary copies thereof) to be identified and enumerated apart from hypervisor metadata and without needing or using a hypervisor. Individual backed up VM files can be requested and restored to anywhere without a hypervisor and without the need to restore the rest of the backed up virtual disk. Hypervisor-agnostic VM backups can be browsed and recovered without a hypervisor and from anywhere, and individual backed up VM files can be restored to anywhere, e.g., to a different VM platform, to a non-VM environment, without restoring an entire virtual disk, and without a recovery data agent needed at the destination. The present inventors devised an advantageous approach to live browsing backed up virtual machine ("VM") data without needing or using a hypervisor to do so—an approach that is speedier and less prone to failure than the prior art, and which also provides more portability, as the backed up VM data can be browsed anywhere. The present approach takes advantage of hypervisor-agnostic backups of virtual disks, which occur in the disclosed information and storage management system. On backup, the payload data is segregated from and separately indexed apart from the hypervisor-specific metadata of the hypervisor that created the data. Furthermore, on backup, payload files are broken up into extents (groups of data blocks), and the extents are individually indexed. The result is that hypervisor-agnostic block-level file backup copies are stored on backup media.

Notable differences to the prior art include:

- enumerating backed up VM payload data files for creating the VM-payload subclient is made possible from anywhere without using, accessing, or connecting to a hypervisor;
- restoring of a selected backed up VM file for incorporating it into a VM-payload reference copy is performed at a media agent host without using, accessing, or connecting to a hypervisor;
- selecting a VM payload data file for the reference-copy subclient and restoring the selected backed up VM payload data file is possible at the individual file level, without selecting or restoring the rest of the backed up VM virtual disk in order to create the desired VM-payload reference copy;
- because the reference copy is created based on a predefined subclient definition, it protects the respective selected VM payload data files independently of how other VM payload data files are managed in the illustrative system, e.g., having its own policy for retention, storage, tiering, schedule, etc.; as well as independent of how metadata associated with the source VM and hypervisor from which the VM payload data originated is managed in the system.

Backed up virtual machine ("VM") data can be browsed without needing or using a hypervisor. Individual backed up VM files can be requested and restored to anywhere without a hypervisor and without the need to restore the rest of the backed up virtual disk. Hypervisor-agnostic VM backups can be browsed and recovered without a hypervisor and from anywhere, and individual backed up VM files can be restored to anywhere, e.g., to a different VM platform, to a non-VM environment, without restoring an entire virtual disk, and without a recovery data agent needed at the destination. The present inventors devised an advantageous approach to live browsing backed up virtual machine ("VM") data without needing or using a hypervisor to do so—an approach that is speedier and less prone to failure than the prior art, and which also provides more portability, as the backed up VM data can be browsed anywhere. The present approach takes advantage of hypervisor-agnostic backups of virtual disks, which occur in the disclosed information and storage management system. On backup, the payload data is segregated from and separately indexed apart from the hypervisor-specific metadata of the hypervisor that created the data. Furthermore, on backup, payload files are broken up into extents (groups of data blocks), and the extents are individually indexed. The result is that hypervisor-agnostic block-level file backup copies are stored on backup media.

On recovery, a hypervisor-agnostic backup is exposed to an enhanced media agent as a pseudo-disk (e.g., using illustrative pseudo-disk driver CVBLK). The pseudo-disk driver intercepts read requests, identifies the actual location of the requested extents on the backup media, and pulls them directly therefrom—without the need for or use of a hypervisor to interpret the read request and browse the file. The result is that hypervisor-agnostic backups can be recovered without a hypervisor, which means that they can be restored anywhere, e.g., to a different VM platform, a non-VM environment, etc., without limitation.

In contrast, the prior art approach required a VM server executing a compatible hypervisor to be attached on recovery in order to read and interpret backed up VMDK/VHD (or other source hypervisor's) metadata in order to find the requested data on the backup media. This indispensable connection to a VM server and compatible hypervisor on recovery in the prior art was substantially disadvantageous, as it increased configuration complexity as well as expense, and was also slower than the current hypervisor-free recovery approach. In disaster recovery scenarios, this prior art approach would have required that compatible VM servers and hypervisors be available at the disaster recovery data center in order to access and recover the backed up VM data.

The present approach provides vendor-neutral file recovery from VM backups facilitated by a Virtual Server Data Agent ("VSA") and/or from physical machine backups facilitated by other data agents. This vendor-neutral/platform-neutral backup approach enables file recovery without needing a hypervisor stack to be present to recover files/applications from backups. This is a valuable advantage, for example in disaster recovery scenarios where a compatible hypervisor (or any hypervisor for that matter) may not be readily available. In fact, the present approach enables hypervisor-free file recoveries to any platform, whether virtualized or not and whether the same or different from the source hypervisor, providing maximum flexibility and portability. No hypervisor is required to perform file-level recovery from block-level backups. Thus files can be recovered to any platform. This approach leverages and substantially improves the capabilities disclosed in U.S. patent application Ser. No. 14/805,615, entitled "Browse and Restore for Block-Level Backups".

The present approach provides a number of advantages, including without limitation:

- Fewer components involved in file recovery
  - Faster performance
  - Fewer possible points of failure
  - Easier to configure
- No need for an ESX proxy or other VM proxy server
- Supports all hypervisors
- Initial VM backup is hypervisor-agnostic, which enables file recoveries without invoking a hypervisor
- File level recoveries are performed without a hypervisor and can be directed to a non-VM platform—can restore to anywhere
- Pseudo-disk driver (e.g., CVBLK) accesses backed up payload data directly, without a hypervisor needed to interpret VMDK/VHD (or other hypervisor's) metadata to find the payload data.

The operations according to an illustrative embodiment comprise: (1) mounting a pseudo-disk onto an enhanced media agent via a block-level pseudo-disk driver (e.g., CVBLK); (2) enumerating the file system found in a hypervisor-agnostic backup copy stored on backup media (e.g., by the enhanced media agent's file system reading the MFT or other file directory found on the exposed backup); and (3) reading directly into/from the backup copy (content store) to recover and serve read requests without using/accessing/connecting-to a hypervisor.

DETAILED DESCRIPTION

Detailed descriptions and examples of systems and methods according to one or more illustrative embodiments of the present invention may be found in the section entitled HYPERVISOR-INDEPENDENT REFERENCE COPIES OF VIRTUAL MACHINE PAYLOAD DATA BASED ON BLOCK-LEVEL PSEUDO-MOUNT and FIGS. 8-11 herein. Furthermore, components and functionality for the present invention may be configured and/or incorporated into information management systems such as those described herein in FIGS. 1A-1H, 2A-2C, and 3-7.

Various embodiments described herein are intimately tied to, enabled by, and would not exist except for, computer technology. For example, using hypervisor-independent block-level live browse to directly access backed up VM data and perform file-level recovery described herein in reference to various embodiments cannot reasonably be performed by humans alone, without the computer technology upon which they are implemented.

Information Management System Overview

With the increasing importance of protecting and leveraging data, organizations simply cannot risk losing critical data. Moreover, runaway data growth and other modern realities make protecting and managing data increasingly difficult. There is therefore a need for efficient, powerful, and user-friendly solutions for protecting and managing data and for smart and efficient management of data storage. Depending on the size of the organization, there may be many data production sources which are under the purview of tens, hundreds, or even thousands of individuals. In the past, individuals were sometimes responsible for managing and protecting their own data, and a patchwork of hardware and software point solutions may have been used in any given organization. These solutions were often provided by different vendors and had limited or no interoperability. Certain embodiments described herein address these and other shortcomings of prior approaches by implementing scalable, unified, organization-wide information management, including data storage management.

Figure 1A:
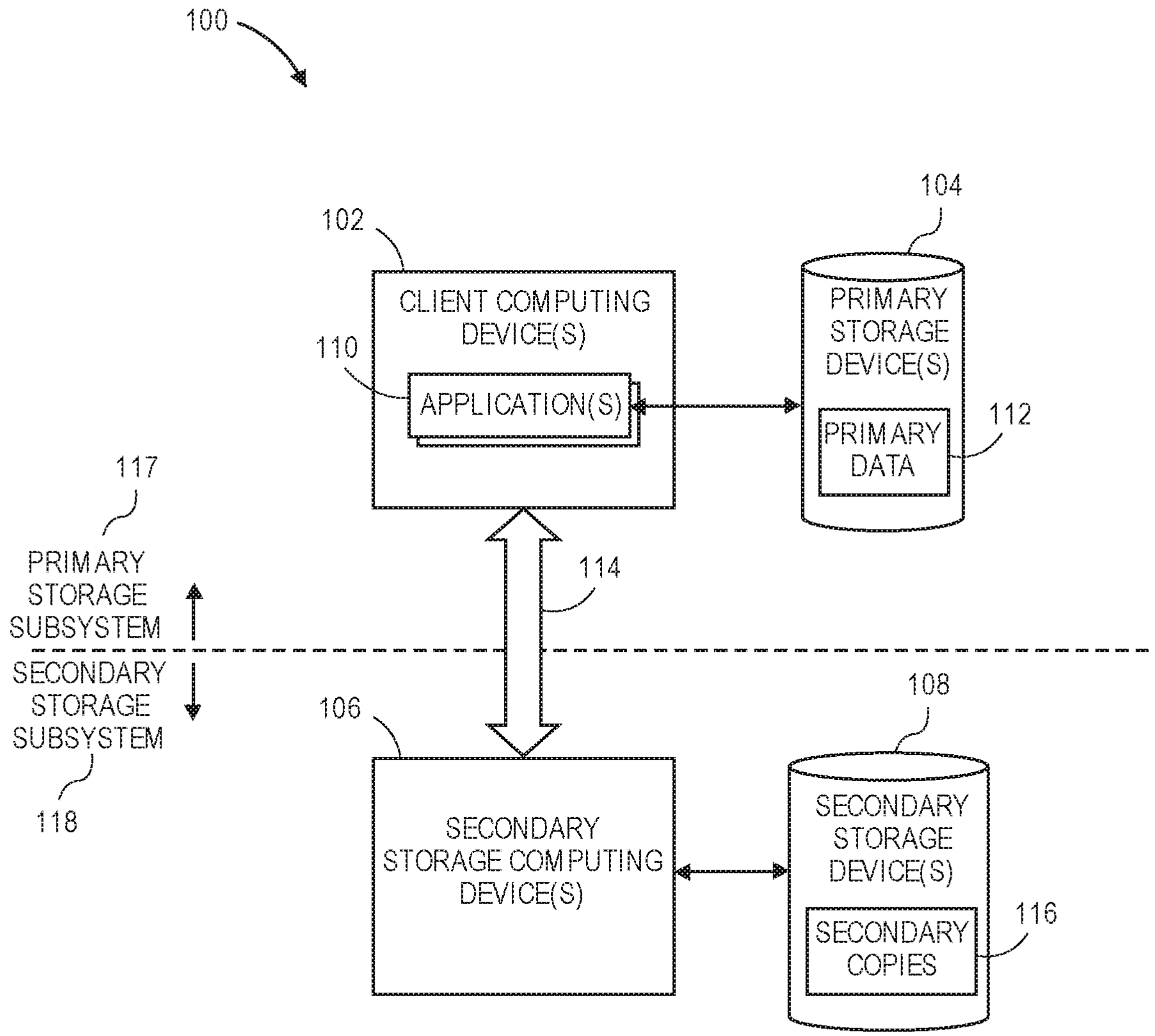
FIG. 1A is a block diagram illustrating an exemplary information management system.

FIG. 1A shows one such information management system 100 (or "system 100"), which generally includes combinations of hardware and software configured to protect and manage data and metadata that are generated and used by computing devices in system 100. System 100 may be referred to in some embodiments as a "storage management system" or a "data storage management system." System 100 performs information management operations, some of which may be referred to as "storage operations" or "data storage operations," to protect and manage the data residing in and/or managed by system 100. The organization that employs system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents/publications and patent applications assigned to Commvault Systems, Inc., each of which is hereby incorporated by reference in its entirety herein:

- U.S. Pat. No. 7,035,880, entitled "Modular Backup and Retrieval System Used in Conjunction With a Storage Area Network";
- U.S. Pat. No. 7,107,298, entitled "System And Method For Archiving Objects In An Information Store";
- U.S. Pat. No. 7,246,207, entitled "System and Method for Dynamically Performing Storage Operations in a Computer Network";
- U.S. Pat. No. 7,315,923, entitled "System And Method For Combining Data Streams In Pipelined Storage Operations In A Storage Network";
- U.S. Pat. No. 7,343,453, entitled "Hierarchical Systems and Methods for Providing a Unified View of Storage Information";
- U.S. Pat. No. 7,395,282, entitled "Hierarchical Backup and Retrieval System";
- U.S. Pat. No. 7,529,782, entitled "System and Methods for Performing a Snapshot and for Restoring Data";
- U.S. Pat. No. 7,617,262, entitled "System and Methods for Monitoring Application Data in a Data Replication System";
- U.S. Pat. No. 7,734,669, entitled "Managing Copies Of Data";
- U.S. Pat. No. 7,747,579, entitled "Metabase for Facilitating Data Classification";
- U.S. Pat. No. 8,140,786, entitled "Systems and Methods for Creating Copies of Data, such as Archive Copies";
- U.S. Pat. No. 8,156,086, entitled "Systems And Methods For Stored Data Verification";
- U.S. Pat. No. 8,170,995, entitled "Method and System for Offline Indexing of Content and Classifying Stored Data";
- U.S. Pat. No. 8,230,195, entitled "System And Method For Performing Auxiliary Storage Operations";
- U.S. Pat. No. 8,285,681, entitled "Data Object Store and Server for a Cloud Storage Environment, Including Data Deduplication and Data Management Across Multiple Cloud Storage Sites";
- U.S. Pat. No. 8,307,177, entitled "Systems And Methods For Management Of Virtualization Data";
- U.S. Pat. No. 8,364,652, entitled "Content-Aligned, Block-Based Deduplication";
- U.S. Pat. No. 8,578,120, entitled "Block-Level Single Instancing";
- U.S. Pat. No. 8,954,446, entitled "Client-Side Repository in a Networked Deduplicated Storage System";
- U.S. Pat. No. 9,020,900, entitled "Distributed Deduplicated Storage System";
- U.S. Pat. No. 9,098,495, entitled "Application-Aware and Remote Single Instance Data Management";
- U.S. Pat. No. 9,239,687, entitled "Systems and Methods for Retaining and Using Data Block Signatures in Data Protection Operations";
- U.S. Pat. No. 9,405,482, entitled "Filtered Reference Copy of Secondary Storage Data in a Data Storage System";
- U.S. Pat. No. 9,436,555, entitled "Efficient Live-Mount of a Backed-Up Virtual Machine in a Storage management System";
- U.S. Pat. Pub. No. 2006/0224846, entitled "System and Method to Support Single Instance Storage Operations";
- U.S. Pat. Pub. No. 2014/0181438, entitled "Filtered Reference Copy of Secondary Storage Data in a Data Storage System";
- U.S. Pat. Pub. No. 2014/0201170, entitled "High Availability Distributed Deduplicated Storage System";
- U.S. Pat. Pub. No. 2016/0041880 A1, entitled "Efficient Application Recovery in an Information Management System Based on a Pseudo-Storage-Device Driver";
- U.S. patent application Ser. No. 14/721,971, entitled "Replication Using Deduplicated Secondary Copy Data";
- U.S. patent application Ser. No. 14/805,615, entitled "Browse and Restore for Block-Level Backups".
- U.S. Patent Application No. 62/265,339 entitled "Live Synchronization and Management of Virtual Machines across Computing and Virtualization Platforms and Using Live Synchronization to Support Disaster Recovery";

U.S. Patent Application No. 62/273,286 entitled "Redundant and Robust Distributed Deduplication Data Storage System";

U.S. Patent Application No. 62/294,920, entitled "Data Protection Operations Based on Network Path Information";

U.S. Patent Application No. 62/297,057, entitled "Data Restoration Operations Based on Network Path Information";

U.S. Patent Application No. 62/387,384, entitled "Application-Level Live Synchronization Across Computing Platforms Including Synchronizing Co-Resident Applications To Disparate Standby Destinations And Selectively Synchronizing Some Applications And Not Others";

U.S. Patent Application No. 62/305,919, entitled "Using Hypervisor-Independent Block-Level Live Browse to Directly Access Backed Up Virtual Machine (VM) Data and Perform Hypervisor-Free File-Level Recovery (Block-Level Pseudo-Mount); and U.S. patent application Ser. No. 15/436,563, entitled "Hypervisor-Independent Block-Level Live Browse for Access to Backed Up Virtual Machine (VM) Data and Hypervisor-Free File-Level Recovery (Block-Level Pseudo-Mount).

System 100 includes computing devices and computing technologies. For instance, system 100 can include one or more client computing devices 102 and secondary storage computing devices 106, as well as storage manager 140 or a host computing device for it. Computing devices can include, without limitation, one or more: workstations, personal computers, desktop computers, or other types of generally fixed computing systems such as mainframe computers, servers, and minicomputers. Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Servers can include mail servers, file servers, database servers, virtual machine servers, and web servers. Any given computing device comprises one or more processors (e.g., CPU and/or single-core or multi-core processors), as well as corresponding non-transitory computer memory (e.g., random-access memory (RAM)) for storing computer programs which are to be executed by the one or more processors. Other computer memory for mass storage of data may be packaged/configured with the computing device (e.g., an internal hard disk) and/or may be external and accessible by the computing device (e.g., network-attached storage, a storage array, etc.). In some cases, a computing device includes cloud computing resources, which may be implemented as virtual machines. For instance, one or more virtual machines may be provided to the organization by a third-party cloud service vendor.

In some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine. A Virtual machine ("VM") is a software implementation of a computer that does not physically exist and is instead instantiated in an operating system of a physical computer (or host machine) to enable applications to execute within the VM's environment, i.e., a VM emulates a physical computer. A VM includes an operating system and associated virtual resources, such as computer memory and processor(s). A hypervisor operates between the VM and the hardware of the physical host machine and is generally responsible for creating and running the VMs. Hypervisors are also known in the art as virtual machine monitors or a virtual machine managers or "VMMs", and may be implemented in software, firmware, and/or specialized hardware installed on the host machine. Examples of hypervisors include ESX Server, by VMware, Inc. of Palo Alto, Calif.; Microsoft Virtual Server and Microsoft Windows Server Hyper-V, both by Microsoft Corporation of Redmond, Wash.; Sun xVM by Oracle America Inc. of Santa Clara, Calif.; and Xen by Citrix Systems, Santa Clara, Calif. The hypervisor provides resources to each virtual operating system such as a virtual processor, virtual memory, a virtual network device, and a virtual disk. Each virtual machine has one or more associated virtual disks. The hypervisor typically stores the data of virtual disks in files on the file system of the physical host machine, called virtual machine disk files ("VMDK" in VMware lingo) or virtual hard disk image files (in Microsoft lingo). For example, VMware's ESX Server provides the Virtual Machine File System (VMFS) for the storage of virtual machine disk files. A virtual machine reads data from and writes data to its virtual disk much the way that a physical machine reads data from and writes data to a physical disk. Examples of techniques for implementing information management in a cloud computing environment are described in U.S. Pat. No. 8,285,681. Examples of techniques for implementing information management in a virtualized computing environment are described in U.S. Pat. No. 8,307,177.

Information management system 100 can also include electronic data storage devices, generally used for mass storage of data, including, e.g., primary storage devices 104 and secondary storage devices 108. Storage devices can generally be of any suitable type including, without limitation, disk drives, storage arrays (e.g., storage-area network (SAN) and/or network-attached storage (NAS) technology), semiconductor memory (e.g., solid state storage devices), network attached storage (NAS) devices, tape libraries, or other magnetic, non-tape storage devices, optical media storage devices, DNA/RNA-based memory technology, combinations of the same, etc. In some embodiments, storage devices form part of a distributed file system. In some cases, storage devices are provided in a cloud storage environment (e.g., a private cloud or one operated by a third-party vendor), whether for primary data or secondary copies or both.

Figure 1B:
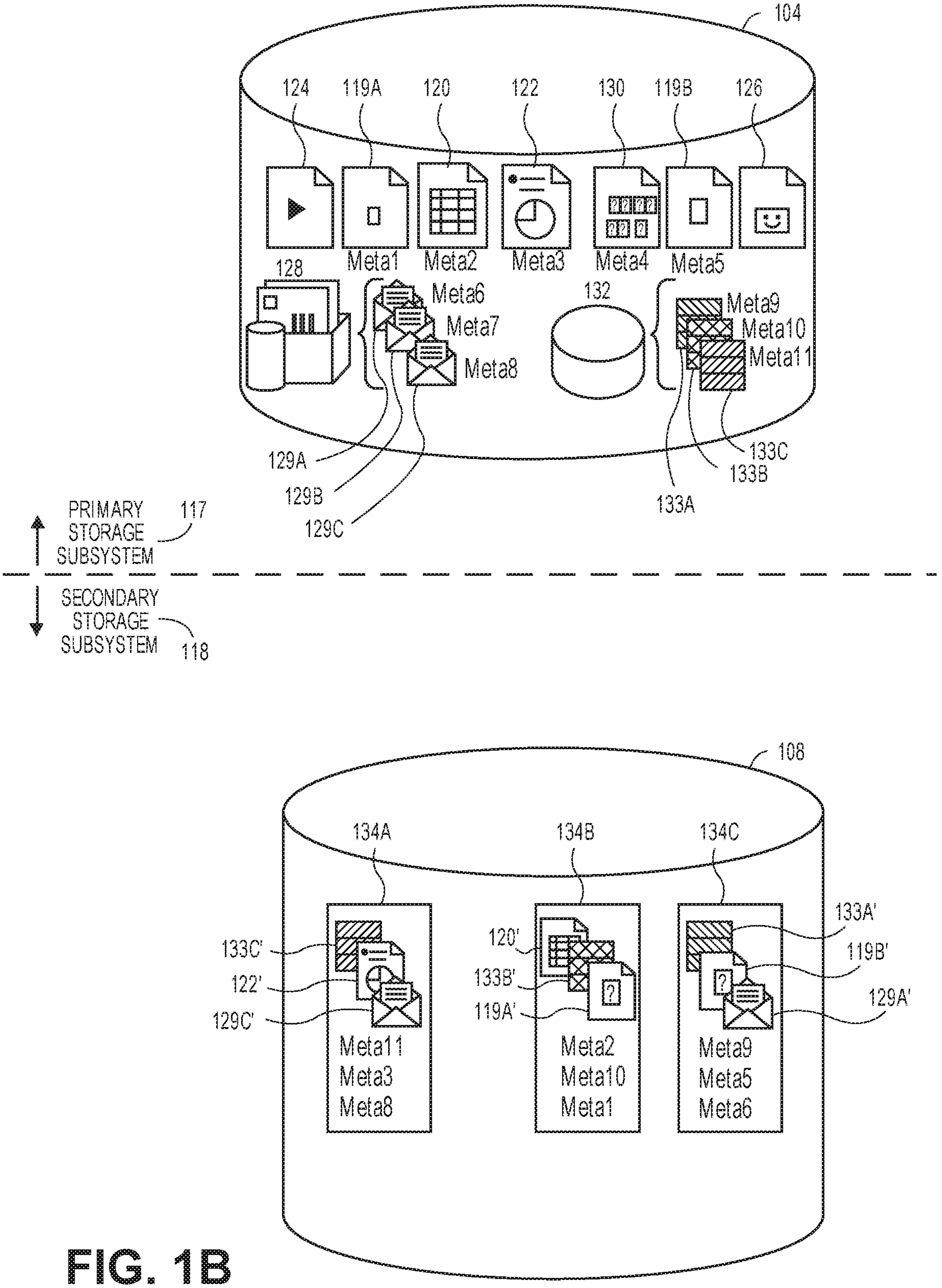
FIG. 1B is a detailed view of a primary storage device, a secondary storage device, and some examples of primary data and secondary copy data.
Figure 1C:
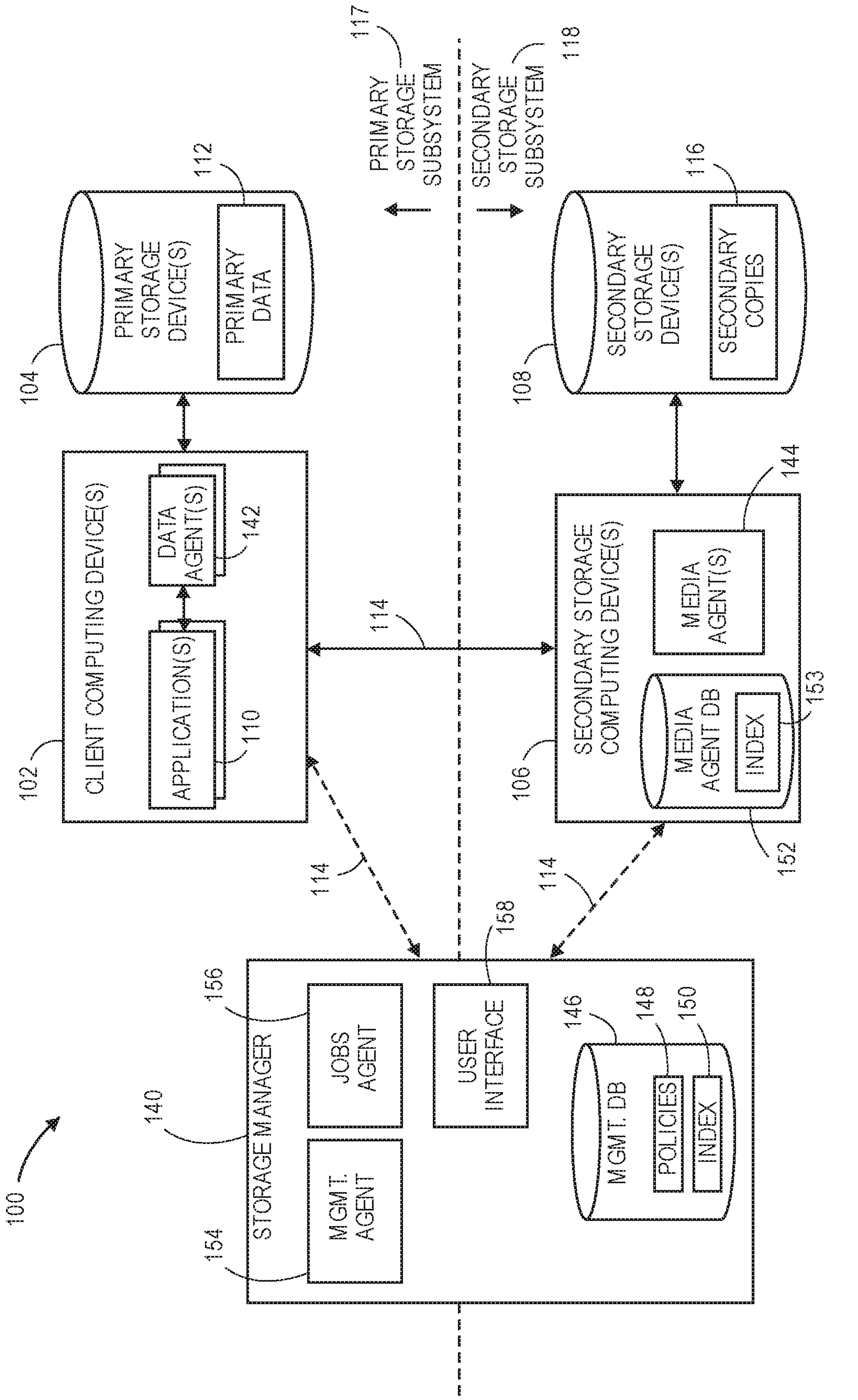
FIG. 1C is a block diagram of an exemplary information management system including a storage manager, one or more data agents, and one or more media agents.

Depending on context, the term "information management system" can refer to generally all of the illustrated hardware and software components in FIG. 1C, or the term may refer to only a subset of the illustrated components. For instance, in some cases, system 100 generally refers to a combination of specialized components used to protect, move, manage, manipulate, analyze, and/or process data and metadata generated by client computing devices 102. However, system 100 in some cases does not include the underlying components that generate and/or store primary data 112, such as the client computing devices 102 themselves, and the primary storage devices 104. Likewise secondary storage devices 108 (e.g., a third-party provided cloud storage environment) may not be part of system 100. As an example, "information management system" or "storage management system" may sometimes refer to one or more of the following components, which will be described in further detail below: storage manager, data agent, and media agent.

One or more client computing devices 102 may be part of system 100, each client computing device 102 having an operating system and at least one application 110 and one or more accompanying data agents executing thereon; and associated with one or more primary storage devices 104 storing primary data 112. Client computing device(s) 102 and primary storage devices 104 may generally be referred to in some cases as primary storage subsystem 117.

Client Computing Devices, Clients, and Subclients

Typically, a variety of sources in an organization produce data to be protected and managed. As just one illustrative example, in a corporate environment such data sources can be employee workstations and company servers such as a mail server, a web server, a database server, a transaction server, or the like. In system 100, data generation sources include one or more client computing devices 102. A computing device that has a data agent 142 installed and operating on it is generally referred to as a "client computing device" 102, and may include any type of computing device, without limitation. A client computing device 102 may be associated with one or more users and/or user accounts.

A "client" is a logical component of information management system 100, which may represent a logical grouping of one or more data agents installed on a client computing device 102. Storage manager 140 recognizes a client as a component of system 100, and in some embodiments, may automatically create a client component the first time a data agent 142 is installed on a client computing device 102. Because data generated by executable component(s) 110 is tracked by the associated data agent 142 so that it may be properly protected in system 100, a client may be said to generate data and to store the generated data to primary storage, such as primary storage device 104. However, the terms "client" and "client computing device" as used herein do not imply that a client computing device 102 is necessarily configured in the client/server sense relative to another computing device such as a mail server, or that a client computing device 102 cannot be a server in its own right. As just a few examples, a client computing device 102 can be and/or include mail servers, file servers, database servers, virtual machine servers, and/or web servers.

Each client computing device 102 may have application(s) 110 executing thereon which generate and manipulate the data that is to be protected from loss and managed in system 100. Applications 110 generally facilitate the operations of an organization, and can include, without limitation, mail server applications (e.g., Microsoft Exchange Server), file system applications, mail client applications (e.g., Microsoft Exchange Client), database applications or database management systems (e.g., SQL, Oracle, SAP, Lotus Notes Database), word processing applications (e.g., Microsoft Word), spreadsheet applications, financial applications, presentation applications, graphics and/or video applications, browser applications, mobile applications, entertainment applications, and so on. Each application 110 may be accompanied by an application-specific data agent 142, though not all data agents 142 are application-specific or associated with only application. A file manager application, e.g., Microsoft Windows Explorer, may be considered an application 110 and may be accompanied by its own data agent 142. Client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110. In some embodiments, a virtual machine that executes on a host client computing device 102 may be considered an application 110 and may be accompanied by a specific data agent 142 (e.g., virtual server data agent).

Client computing devices 102 and other components in system 100 can be connected to one another via one or more electronic communication pathways 114. For example, a first communication pathway 114 may communicatively couple client computing device 102 and secondary storage computing device 106; a second communication pathway 114 may communicatively couple storage manager 140 and client computing device 102; and a third communication pathway 114 may communicatively couple storage manager 140 and secondary storage computing device 106, etc. (see, e.g., FIG. 1A and FIG. 1C). A communication pathway 114 can include one or more networks or other connection types including one or more of the following, without limitation: the Internet, a wide area network (WAN), a local area network (LAN), a Storage Area Network (SAN), a Fibre Channel (FC) connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate computer or telecommunications networks, combinations of the same or the like. Communication pathways 114 in some cases may also include application programming interfaces (APIs) including, e.g., cloud service provider APIs, virtual machine management APIs, and hosted service provider APIs. The underlying infrastructure of communication pathways 114 may be wired and/or wireless, analog and/or digital, or any combination thereof; and the facilities used may be private, public, third-party provided, or any combination thereof, without limitation.

A "subclient" is a logical grouping of all or part of a client's primary data 112. In general, a subclient may be defined according to how the subclient data is to be protected as a unit in system 100. For example, a subclient may be associated with a certain storage policy. A given client may thus comprise several subclients, each subclient associated with a different storage policy. For example, some files may form a first subclient that requires compression and deduplication and is associated with a first storage policy. Other files of the client may form a second subclient that requires a different retention schedule as well as encryption, and may be associated with a different, second storage policy. As a result, though the primary data may be generated by the same application 110 and may belong to one given client, portions of the data may be assigned to different subclients for distinct treatment by system 100. More detail on subclients is given in regard to storage policies below.

Primary Data and Exemplary Primary Storage Devices

Primary data 112 is generally production data or "live" data generated by the operating system and/or applications 110 executing on client computing device 102. Primary data 112 is generally stored on primary storage device(s) 104 and is organized via a file system operating on the client computing device 102. Thus, client computing device(s) 102 and corresponding applications 110 may create, access, modify, write, delete, and otherwise use primary data 112. Primary data 112 is generally in the native format of the source application 110. Primary data 112 is an initial or first stored body of data generated by the source application 110.

Primary data 112 in some cases is created substantially directly from data generated by the corresponding source application 110. It can be useful in performing certain tasks to organize primary data 112 into units of different granularities. In general, primary data 112 can include files, directories, file system volumes, data blocks, extents, or any other hierarchies or organizations of data objects. As used herein, a "data object" can refer to (i) any file that is currently addressable by a file system or that was previously addressable by the file system (e.g., an archive file), and/or to (ii) a subset of such a file (e.g., a data block, an extent, etc.). Primary data 112 may include structured data (e.g., database files), unstructured data (e.g., documents), and/or semi-structured data. See, e.g., FIG. 1B.

It can also be useful in performing certain functions of system 100 to access and modify metadata within primary data 112. Metadata generally includes information about data objects and/or characteristics associated with the data objects. For simplicity herein, it is to be understood that, unless expressly stated otherwise, any reference to primary data 112 generally also includes its associated metadata, but references to metadata generally do not include the primary data. Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists (ACLs), system metadata (e.g., registry information), combinations of the same or other similar information related to the data object. In addition to metadata generated by or related to file systems and operating systems, some applications 110 and/or other components of system 100 maintain indices of metadata for data objects, e.g., metadata associated with individual email messages. The use of metadata to perform classification and other functions is described in greater detail below.

Primary storage devices 104 storing primary data 112 may be relatively fast and/or expensive technology (e.g., flash storage, a disk drive, a hard-disk storage array, solid state memory, etc.), typically to support high-performance live production environments. Primary data 112 may be highly changeable and/or may be intended for relatively short term retention (e.g., hours, days, or weeks). According to some embodiments, client computing device 102 can access primary data 112 stored in primary storage device 104 by making conventional file system calls via the operating system. Each client computing device 102 is generally associated with and/or in communication with one or more primary storage devices 104 storing corresponding primary data 112. A client computing device 102 is said to be associated with or in communication with a particular primary storage device 104 if it is capable of one or more of: routing and/or storing data (e.g., primary data 112) to the primary storage device 104, coordinating the routing and/or storing of data to the primary storage device 104, retrieving data from the primary storage device 104, coordinating the retrieval of data from the primary storage device 104, and modifying and/or deleting data in the primary storage device 104. Thus, a client computing device 102 may be said to access data stored in an associated storage device 104.

Primary storage device 104 may be dedicated or shared. In some cases, each primary storage device 104 is dedicated to an associated client computing device 102, e.g., a local disk drive. In other cases, one or more primary storage devices 104 can be shared by multiple client computing devices 102, e.g., via a local network, in a cloud storage implementation, etc. As one example, primary storage device 104 can be a storage array shared by a group of client computing devices 102, such as EMC Clariion, EMC Symmetrix, EMC Celerra, Dell EqualLogic, IBM XIV, NetApp FAS, HP EVA, and HP 3PAR.

System 100 may also include hosted services (not shown), which may be hosted in some cases by an entity other than the organization that employs the other components of system 100. For instance, the hosted services may be provided by online service providers. Such service providers can provide social networking services, hosted email services, or hosted productivity applications or other hosted applications such as software-as-a-service (SaaS), platform-as-a-service (PaaS), application service providers (ASPs), cloud services, or other mechanisms for delivering functionality via a network. As it services users, each hosted service may generate additional data and metadata, which may be managed by system 100, e.g., as primary data 112. In some cases, the hosted services may be accessed using one of the applications 110. As an example, a hosted mail service may be accessed via browser running on a client computing device 102.

Secondary Copies and Exemplary Secondary Storage Devices

Primary data 112 stored on primary storage devices 104 may be compromised in some cases, such as when an employee deliberately or accidentally deletes or overwrites primary data 112. Or primary storage devices 104 can be damaged, lost, or otherwise corrupted. For recovery and/or regulatory compliance purposes, it is therefore useful to generate and maintain copies of primary data 112. Accordingly, system 100 includes one or more secondary storage computing devices 106 and one or more secondary storage devices 108 configured to create and store one or more secondary copies 116 of primary data 112 including its associated metadata. The secondary storage computing devices 106 and the secondary storage devices 108 may be referred to as secondary storage subsystem 118.

Secondary copies 116 can help in search and analysis efforts and meet other information management goals as well, such as: restoring data and/or metadata if an original version is lost (e.g., by deletion, corruption, or disaster); allowing point-in-time recovery; complying with regulatory data retention and electronic discovery (e-discovery) requirements; reducing utilized storage capacity in the production system and/or in secondary storage; facilitating organization and search of data; improving user access to data files across multiple computing devices and/or hosted services; and implementing data retention and pruning policies.

A secondary copy 116 can comprise a separate stored copy of data that is derived from one or more earlier-created stored copies (e.g., derived from primary data 112 or from another secondary copy 116). Secondary copies 116 can include point-in-time data, and may be intended for relatively long-term retention before some or all of the data is moved to other storage or discarded. In some cases, a secondary copy 116 may be in a different storage device than other previously stored copies; and/or may be remote from other previously stored copies. Secondary copies 116 can be stored in the same storage device as primary data 112. For example, a disk array capable of performing hardware snapshots stores primary data 112 and creates and stores hardware snapshots of the primary data 112 as secondary copies 116. Secondary copies 116 may be stored in relatively slow and/or lower cost storage (e.g., magnetic tape). A secondary copy 116 may be stored in a backup or archive format, or in some other format different from the native source application format or other format of primary data 112.

Secondary storage computing devices 106 may index secondary copies 116 (e.g., using a media agent 144), enabling users to browse and restore at a later time and further enabling the lifecycle management of the indexed data. After creation of a secondary copy 116 that represents certain primary data 112, a pointer or other location indicia (e.g., a stub) may be placed in primary data 112, or be otherwise associated with primary data 112, to indicate the current location of a particular secondary copy 116. Since an instance of a data object or metadata in primary data 112 may change over time as it is modified by application 110 (or hosted service or the operating system), system 100 may create and manage multiple secondary copies 116 of a particular data object or metadata, each copy representing the state of the data object in primary data 112 at a particular point in time. Moreover, since an instance of a data object in primary data 112 may eventually be deleted from primary storage device 104 and the file system, system 100 may continue to manage point-in-time representations of that data object, even though the instance in primary data 112 no longer exists. For virtual machines, the operating system and other applications 110 of client computing device(s) 102 may execute within or under the management of virtualization software (e.g., a VMM), and the primary storage device(s) 104 may comprise a virtual disk created on a physical storage device. System 100 may create secondary copies 116 of the files or other data objects in a virtual disk file and/or secondary copies 116 of the entire virtual disk file itself (e.g., of an entire .vmdk file).

Secondary copies 116 are distinguishable from corresponding primary data 112. First, secondary copies 116 can be stored in a different format from primary data 112 (e.g., backup, archive, or other non-native format). For this or other reasons, secondary copies 116 may not be directly usable by applications 110 or client computing device 102 (e.g., via standard system calls or otherwise) without modification, processing, or other intervention by system 100 which may be referred to as "restore" operations. Secondary copies 116 may have been processed by data agent 142 and/or media agent 144 in the course of being created (e.g., compression, deduplication, encryption, integrity markers, indexing, formatting, application-aware metadata, etc.), and thus secondary copy 116 may represent source primary data 112 without necessarily being exactly identical to the source.

Second, secondary copies 116 may be stored on a secondary storage device 108 that is inaccessible to application 110 running on client computing device 102 and/or hosted service. Some secondary copies 116 may be "offline copies," in that they are not readily available (e.g., not mounted to tape or disk). Offline copies can include copies of data that system 100 can access without human intervention (e.g., tapes within an automated tape library, but not yet mounted in a drive), and copies that the system 100 can access only with some human intervention (e.g., tapes located at an offsite storage site).

Using Intermediate Devices for Creating Secondary Copies—Secondary Storage Computing Devices Creating secondary copies can be challenging when hundreds or thousands of client computing devices 102 continually generate large volumes of primary data 112 to be protected. Also, there can be significant overhead involved in the creation of secondary copies 116. Moreover, specialized programmed intelligence and/or hardware capability is generally needed for accessing and interacting with secondary storage devices 108. Client computing devices 102 may interact directly with a secondary storage device 108 to create secondary copies 116, but in view of the factors described above, this approach can negatively impact the ability of client computing device 102 to serve/service application 110 and produce primary data 112. Further, any given client computing device 102 may not be optimized for interaction with certain secondary storage devices 108.

Thus, system 100 may include one or more software and/or hardware components which generally act as intermediaries between client computing devices 102 (that generate primary data 112) and secondary storage devices 108 (that store secondary copies 116). In addition to off-loading certain responsibilities from client computing devices 102, these intermediate components provide other benefits. For instance, as discussed further below with respect to FIG. 1D, distributing some of the work involved in creating secondary copies 116 can enhance scalability and improve system performance. For instance, using specialized secondary storage computing devices 106 and media agents 144 for interfacing with secondary storage devices 108 and/or for performing certain data processing operations can greatly improve the speed with which system 100 performs information management operations and can also improve the capacity of the system to handle large numbers of such operations, while reducing the computational load on the production environment of client computing devices 102. The intermediate components can include one or more secondary storage computing devices 106 as shown in FIG. 1A and/or one or more media agents 144. Media agents are discussed further below (e.g., with respect to FIGS. 1C-1E). These special-purpose components of system 100 comprise specialized programmed intelligence and/or hardware capability for writing to, reading from, instructing, communicating with, or otherwise interacting with secondary storage devices 108.

Secondary storage computing device(s) 106 can comprise any of the computing devices described above, without limitation. In some cases, secondary storage computing device(s) 106 also include specialized hardware componentry and/or software intelligence (e.g., specialized interfaces) for interacting with certain secondary storage device(s) 108 with which they may be specially associated.

To create a secondary copy 116 involving the copying of data from primary storage subsystem 117 to secondary storage subsystem 118, client computing device 102 may communicate the primary data 112 to be copied (or a processed version thereof generated by a data agent 142) to the designated secondary storage computing device 106, via a communication pathway 114. Secondary storage computing device 106 in turn may further process and convey the data or a processed version thereof to secondary storage device 108. One or more secondary copies 116 may be created from existing secondary copies 116, such as in the case of an auxiliary copy operation, described further below.

Exemplary Primary Data and an Exemplary Secondary Copy

FIG. 1B is a detailed view of some specific examples of primary data stored on primary storage device(s) 104 and secondary copy data stored on secondary storage device(s) 108, with other components of the system removed for the purposes of illustration. Stored on primary storage device(s) 104 are primary data 112 objects including word processing documents 119A-B, spreadsheets 120, presentation documents 122, video files 124, image files 126, email mailboxes 128 (and corresponding email messages 129A-C), HTML/XML or other types of markup language files 130, databases 132 and corresponding tables or other data structures 133A-133C. Some or all primary data 112 objects are associated with corresponding metadata (e.g., "Meta1-11"), which may include file system metadata and/or application-specific metadata. Stored on the secondary storage device(s) 108 are secondary copy 116 data objects 134A-C which may include copies of or may otherwise represent corresponding primary data 112.

Secondary copy data objects 134A-C can individually represent more than one primary data object. For example, secondary copy data object 134A represents three separate primary data objects 133C, 122, and 129C (represented as 133C', 122', and 129C', respectively, and accompanied by corresponding metadata Meta11, Meta3, and Meta8, respectively). Moreover, as indicated by the prime mark ('), secondary storage computing devices 106 or other components in secondary storage subsystem 118 may process the data received from primary storage subsystem 117 and store a secondary copy including a transformed and/or supplemented representation of a primary data object and/or metadata that is different from the original format, e.g., in a compressed, encrypted, deduplicated, or other modified format. For instance, secondary storage computing devices 106 can generate new metadata or other information based on said processing, and store the newly generated information along with the secondary copies. Secondary copy data object 1346 represents primary data objects 120, 1336, and 119A as 120', 1336', and 119A', respectively, accompanied by corresponding metadata Meta2, Meta10, and Meta1, respectively. Also, secondary copy data object 134C represents primary data objects 133A, 1196, and 129A as 133A', 1196', and 129A', respectively, accompanied by corresponding metadata Meta9, Meta5, and Meta6, respectively.

Exemplary Information Management System Architecture

System 100 can incorporate a variety of different hardware and software components, which can in turn be organized with respect to one another in many different configurations, depending on the embodiment. There are critical design choices involved in specifying the functional responsibilities of the components and the role of each component in system 100. Such design choices can impact how system 100 performs and adapts to data growth and other changing circumstances. FIG. 1C shows a system 100 designed according to these considerations and includes: storage manager 140, one or more data agents 142 executing on client computing device(s) 102 and configured to process primary data 112, and one or more media agents 144 executing on one or more secondary storage computing devices 106 for performing tasks involving secondary storage devices 108.

Storage Manager

Storage manager 140 is a centralized storage and/or information manager that is configured to perform certain control functions and also to store certain critical information about system 100—hence storage manager 140 is said to manage system 100. As noted, the number of components in system 100 and the amount of data under management can be large. Managing the components and data is therefore a significant task, which can grow unpredictably as the number of components and data scale to meet the needs of the organization. For these and other reasons, according to certain embodiments, responsibility for controlling system 100, or at least a significant portion of that responsibility, is allocated to storage manager 140. Storage manager 140 can be adapted independently according to changing circumstances, without having to replace or re-design the remainder of the system. Moreover, a computing device for hosting and/or operating as storage manager 140 can be selected to best suit the functions and networking needs of storage manager 140. These and other advantages are described in further detail below and with respect to FIG. 1D.

Storage manager 140 may be a software module or other application hosted by a suitable computing device. In some embodiments, storage manager 140 is itself a computing device that performs the functions described herein. Storage manager 140 comprises or operates in conjunction with one or more associated data structures such as a dedicated database (e.g., management database 146), depending on the configuration. The storage manager 140 generally initiates, performs, coordinates, and/or controls storage and other information management operations performed by system 100, e.g., to protect and control primary data 112 and secondary copies 116. In general, storage manager 140 is said to manage system 100, which includes communicating with, instructing, and controlling in some circumstances components such as data agents 142 and media agents 144, etc.

As shown by the dashed arrowed lines 114 in FIG. 1C, storage manager 140 may communicate with, instruct, and/or control some or all elements of system 100, such as data agents 142 and media agents 144. In this manner, storage manager 140 manages the operation of various hardware and software components in system 100. In certain embodiments, control information originates from storage manager 140 and status as well as index reporting is transmitted to storage manager 140 by the managed components, whereas payload data and metadata are generally communicated between data agents 142 and media agents 144 (or otherwise between client computing device(s) 102 and secondary storage computing device(s) 106), e.g., at the direction of and under the management of storage manager 140. Control information can generally include parameters and instructions for carrying out information management operations, such as, without limitation, instructions to perform a task associated with an operation, timing information specifying when to initiate a task, data path information specifying what components to communicate with or access in carrying out an operation, and the like. In other embodiments, some information management operations are controlled or initiated by other components of system 100 (e.g., by media agents 144 or data agents 142), instead of or in combination with storage manager 140.

According to certain embodiments, storage manager 140 provides one or more of the following functions:

communicating with data agents 142 and media agents 144, including transmitting instructions, messages, and/or queries, as well as receiving status reports, index information, messages, and/or queries, and responding to same;
- initiating execution of information management operations;
- initiating restore and recovery operations;
- managing secondary storage devices 108 and inventory/capacity of the same;
- allocating secondary storage devices 108 for secondary copy operations;
- reporting, searching, and/or classification of data in system 100;
- monitoring completion of and status reporting related to information management operations and jobs;
- tracking movement of data within system 100;
- tracking age information relating to secondary copies 116, secondary storage devices 108, comparing the age information against retention guidelines, and initiating data pruning when appropriate;
- tracking logical associations between components in system 100;
- protecting metadata associated with system 100, e.g., in management database 146;
- implementing job management, schedule management, event management, alert management, reporting, job history maintenance, user security management, disaster recovery management, and/or user interfacing for system administrators and/or end users of system 100;
- sending, searching, and/or viewing of log files; and
- implementing operations management functionality.

Storage manager 140 may maintain an associated database 146 (or "storage manager database 146" or "management database 146") of management-related data and information management policies 148. Database 146 is stored in computer memory accessible by storage manager 140. Database 146 may include a management index 150 (or "index 150") or other data structure(s) that may store: logical associations between components of the system; user preferences and/or profiles (e.g., preferences regarding encryption, compression, or deduplication of primary data or secondary copies; preferences regarding the scheduling, type, or other aspects of secondary copy or other operations; mappings of particular information management users or user accounts to certain computing devices or other components, etc.; management tasks; media containerization; other useful data; and/or any combination thereof. For example, storage manager 140 may use index 150 to track logical associations between media agents 144 and secondary storage devices 108 and/or movement of data to/from secondary storage devices 108. For instance, index 150 may store data associating a client computing device 102 with a particular media agent 144 and/or secondary storage device 108, as specified in an information management policy 148.

Administrators and others may configure and initiate certain information management operations on an individual basis. But while this may be acceptable for some recovery operations or other infrequent tasks, it is often not workable for implementing on-going organization-wide data protection and management. Thus, system 100 may utilize information management policies 148 for specifying and executing information management operations on an automated basis. Generally, an information management policy 148 can include a stored data structure or other information source that specifies parameters (e.g., criteria and rules) associated with storage management or other information management operations. Storage manager 140 can process an information management policy 148 and/or index 150 and, based on the results, identify an information management operation to perform, identify the appropriate components in system 100 to be involved in the operation (e.g., client computing devices 102 and corresponding data agents 142, secondary storage computing devices 106 and corresponding media agents 144, etc.), establish connections to those components and/or between those components, and/or instruct and control those components to carry out the operation. In this manner, system 100 can translate stored information into coordinated activity among the various computing devices in system 100.

Management database 146 may maintain information management policies 148 and associated data, although information management policies 148 can be stored in computer memory at any appropriate location outside management database 146. For instance, an information management policy 148 such as a storage policy may be stored as metadata in a media agent database 152 or in a secondary storage device 108 (e.g., as an archive copy) for use in restore or other information management operations, depending on the embodiment. Information management policies 148 are described further below. According to certain embodiments, management database 146 comprises a relational database (e.g., an SQL database) for tracking metadata, such as metadata associated with secondary copy operations (e.g., what client computing devices 102 and corresponding subclient data were protected and where the secondary copies are stored and which media agent 144 performed the storage operation(s)). This and other metadata may additionally be stored in other locations, such as at secondary storage computing device 106 or on the secondary storage device 108, allowing data recovery without the use of storage manager 140 in some cases. Thus, management database 146 may comprise data needed to kick off secondary copy operations (e.g., storage policies, schedule policies, etc.), status and reporting information about completed jobs (e.g., status and error reports on yesterday's backup jobs), and additional information sufficient to enable restore and disaster recovery operations (e.g., media agent associations, location indexing, content indexing, etc.).

Storage manager 140 may include a jobs agent 156, a user interface 158, and a management agent 154, all of which may be implemented as interconnected software modules or application programs. These are described further below.

Jobs agent 156 in some embodiments initiates, controls, and/or monitors the status of some or all information management operations previously performed, currently being performed, or scheduled to be performed by system 100. A job is a logical grouping of information management operations such as daily storage operations scheduled for a certain set of subclients (e.g., generating incremental block-level backup copies 116 at a certain time every day for database files in a certain geographical location). Thus, jobs agent 156 may access information management policies 148 (e.g., in management database 146) to determine when, where, and how to initiate/control jobs in system 100.

Storage Manager User Interfaces

User interface 158 may include information processing and display software, such as a graphical user interface (GUI), an application program interface (API), and/or other interactive interface(s) through which users and system processes can retrieve information about the status of information management operations or issue instructions to storage manager 140 and other components. Via user interface 158, users may issue instructions to the components in system 100 regarding performance of secondary copy and recovery operations. For example, a user may modify a schedule concerning the number of pending secondary copy operations. As another example, a user may employ the GUI to view the status of pending secondary copy jobs or to monitor the status of certain components in system 100 (e.g., the amount of capacity left in a storage device). Storage manager 140 may track information that permits it to select, designate, or otherwise identify content indices, deduplication databases, or similar databases or resources or data sets within its information management cell (or another cell) to be searched in response to certain queries. Such queries may be entered by the user by interacting with user interface 158.

Various embodiments of information management system 100 may be configured and/or designed to generate user interface data usable for rendering the various interactive user interfaces described. The user interface data may be used by system 100 and/or by another system, device, and/or software program (for example, a browser program), to render the interactive user interfaces. The interactive user interfaces may be displayed on, for example, electronic displays (including, for example, touch-enabled displays), consoles, etc., whether direct-connected to storage manager 140 or communicatively coupled remotely, e.g., via an internet connection. The present disclosure describes various embodiments of interactive and dynamic user interfaces, some of which may be generated by user interface agent 158, and which are the result of significant technological development. The user interfaces described herein may provide improved human-computer interactions, allowing for significant cognitive and ergonomic efficiencies and advantages over previous systems, including reduced mental workloads, improved decision-making, and the like. User interface 158 may operate in a single integrated view or console (not shown). The console may support a reporting capability for generating a variety of reports, which may be tailored to a particular aspect of information management.

User interfaces are not exclusive to storage manager 140 and in some embodiments a user may access information locally from a computing device component of system 100. For example, some information pertaining to installed data agents 142 and associated data streams may be available from client computing device 102. Likewise, some information pertaining to media agents 144 and associated data streams may be available from secondary storage computing device 106.

Storage Manager Management Agent

Management agent 154 can provide storage manager 140 with the ability to communicate with other components within system 100 and/or with other information management cells via network protocols and application programming interfaces (APIs) including, e.g., HTTP, HTTPS, FTP, REST, virtualization software APIs, cloud service provider APIs, and hosted service provider APIs, without limitation. Management agent 154 also allows multiple information management cells to communicate with one another. For example, system 100 in some cases may be one information management cell in a network of multiple cells adjacent to one another or otherwise logically related, e.g., in a WAN or LAN. With this arrangement, the cells may communicate with one another through respective management agents 154. Inter-cell communications and hierarchy is described in greater detail in e.g., U.S. Pat. No. 7,343,453.

Information Management Cell

An "information management cell" (or "storage operation cell" or "cell") may generally include a logical and/or physical grouping of a combination of hardware and software components associated with performing information management operations on electronic data, typically one storage manager 140 and at least one data agent 142 (executing on a client computing device 102) and at least one media agent 144 (executing on a secondary storage computing device 106). For instance, the components shown in FIG. 1C may together form an information management cell. Thus, in some configurations, a system 100 may be referred to as an information management cell or a storage operation cell. A given cell may be identified by the identity of its storage manager 140, which is generally responsible for managing the cell.

Multiple cells may be organized hierarchically, so that cells may inherit properties from hierarchically superior cells or be controlled by other cells in the hierarchy (automatically or otherwise). Alternatively, in some embodiments, cells may inherit or otherwise be associated with information management policies, preferences, information management operational parameters, or other properties or characteristics according to their relative position in a hierarchy of cells. Cells may also be organized hierarchically according to function, geography, architectural considerations, or other factors useful or desirable in performing information management operations. For example, a first cell may represent a geographic segment of an enterprise, such as a Chicago office, and a second cell may represent a different geographic segment, such as a New York City office. Other cells may represent departments within a particular office, e.g., human resources, finance, engineering, etc. Where delineated by function, a first cell may perform one or more first types of information management operations (e.g., one or more first types of secondary copies at a certain frequency), and a second cell may perform one or more second types of information management operations (e.g., one or more second types of secondary copies at a different frequency and under different retention rules). In general, the hierarchical information is maintained by one or more storage managers 140 that manage the respective cells (e.g., in corresponding management database(s) 146).

Data Agents

A variety of different applications 110 can operate on a given client computing device 102, including operating systems, file systems, database applications, e-mail applications, and virtual machines, just to name a few. And, as part of the process of creating and restoring secondary copies 116, the client computing device 102 may be tasked with processing and preparing the primary data 112 generated by these various applications 110. Moreover, the nature of the processing/preparation can differ across application types, e.g., due to inherent structural, state, and formatting differences among applications 110 and/or the operating system of client computing device 102. Each data agent 142 is therefore advantageously configured in some embodiments to assist in the performance of information management operations based on the type of data that is being protected at a client-specific and/or application-specific level.

Data agent 142 is a component of information system 100 and is generally directed by storage manager 140 to participate in creating or restoring secondary copies 116. Data agent 142 may be a software program (e.g., in the form of a set of executable binary files) that executes on the same client computing device 102 as the associated application 110 that data agent 142 is configured to protect. Data agent 142 is generally responsible for managing, initiating, or otherwise assisting in the performance of information management operations in reference to its associated application(s) 110 and corresponding primary data 112 which is generated/accessed by the particular application(s) 110. For instance, data agent 142 may take part in copying, archiving, migrating, and/or replicating of certain primary data 112 stored in the primary storage device(s) 104. Data agent 142 may receive control information from storage manager 140, such as commands to transfer copies of data objects and/or metadata to one or more media agents 144. Data agent 142 also may compress, deduplicate, and encrypt certain primary data 112, as well as capture application-related metadata before transmitting the processed data to media agent 144. Data agent 142 also may receive instructions from storage manager 140 to restore (or assist in restoring) a secondary copy 116 from secondary storage device 108 to primary storage 104, such that the restored data may be properly accessed by application 110 in a suitable format as though it were primary data 112.

Each data agent 142 may be specialized for a particular application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data. A file system data agent, for example, may handle data files and/or other file system information. If a client computing device 102 has two or more types of data 112, a specialized data agent 142 may be used for each data type. For example, to backup, migrate, and/or restore all of the data on a Microsoft Exchange server, the client computing device 102 may use: (1) a Microsoft Exchange Mailbox data agent 142 to back up the Exchange mailboxes; (2) a Microsoft Exchange Database data agent 142 to back up the Exchange databases; (3) a Microsoft Exchange Public Folder data agent 142 to back up the Exchange Public Folders; and (4) a Microsoft Windows File System data agent 142 to back up the file system of client computing device 102. In this example, these specialized data agents 142 are treated as four separate data agents 142 even though they operate on the same client computing device 102. Other examples may include archive management data agents such as a migration archiver or a compliance archiver, Quick Recovery® agents, and continuous data replication agents. Application-specific data agents 142 can provide improved performance as compared to generic agents. For instance, because application-specific data agents 142 may only handle data for a single software application, the design, operation, and performance of the data agent 142 can be streamlined. The data agent 142 may therefore execute faster and consume less persistent storage and/or operating memory than data agents designed to generically accommodate multiple different software applications 110.

Each data agent 142 may be configured to access data and/or metadata stored in the primary storage device(s) 104 associated with data agent 142 and its host client computing device 102, and process the data appropriately. For example, during a secondary copy operation, data agent 142 may arrange or assemble the data and metadata into one or more files having a certain format (e.g., a particular backup or archive format) before transferring the file(s) to a media agent 144 or other component. The file(s) may include a list of files or other metadata. In some embodiments, a data agent 142 may be distributed between client computing device 102 and storage manager 140 (and any other intermediate components) or may be deployed from a remote location or its functions approximated by a remote process that performs some or all of the functions of data agent 142. In addition, a data agent 142 may perform some functions provided by media agent 144. Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data, while another generic data agent may handle Microsoft Exchange Public Folder data and Microsoft Windows File System data.

Media Agents

As noted, off-loading certain responsibilities from client computing devices 102 to intermediate components such as secondary storage computing device(s) 106 and corresponding media agent(s) 144 can provide a number of benefits including improved performance of client computing device 102, faster and more reliable information management operations, and enhanced scalability. In one example which will be discussed further below, media agent 144 can act as a local cache of recently-copied data and/or metadata stored to secondary storage device(s) 108, thus improving restore capabilities and performance for the cached data.

Media agent 144 is a component of system 100 and is generally directed by storage manager 140 in creating and restoring secondary copies 116. Whereas storage manager 140 generally manages system 100 as a whole, media agent 144 provides a portal to certain secondary storage devices 108, such as by having specialized features for communicating with and accessing certain associated secondary storage device 108. Media agent 144 may be a software program (e.g., in the form of a set of executable binary files) that executes on a secondary storage computing device 106. Media agent 144 generally manages, coordinates, and facilitates the transmission of data between a data agent 142 (executing on client computing device 102) and secondary storage device(s) 108 associated with media agent 144. For instance, other components in the system may interact with media agent 144 to gain access to data stored on associated secondary storage device(s) 108, (e.g., to browse, read, write, modify, delete, or restore data). Moreover, media agents 144 can generate and store information relating to characteristics of the stored data and/or metadata, or can generate and store other types of information that generally provides insight into the contents of the secondary storage devices 108—generally referred to as indexing of the stored secondary copies 116. Each media agent 144 may operate on a dedicated secondary storage computing device 106, while in other embodiments a plurality of media agents 144 may operate on the same secondary storage computing device 106.

A media agent 144 may be associated with a particular secondary storage device 108 if that media agent 144 is capable of one or more of: routing and/or storing data to the particular secondary storage device 108; coordinating the routing and/or storing of data to the particular secondary storage device 108; retrieving data from the particular secondary storage device 108; coordinating the retrieval of data from the particular secondary storage device 108; and modifying and/or deleting data retrieved from the particular secondary storage device 108. Media agent 144 in certain embodiments is physically separate from the associated secondary storage device 108. For instance, a media agent 144 may operate on a secondary storage computing device 106 in a distinct housing, package, and/or location from the associated secondary storage device 108. In one example, a media agent 144 operates on a first server computer and is in communication with a secondary storage device(s) 108 operating in a separate rack-mounted RAID-based system.

A media agent 144 associated with a particular secondary storage device 108 may instruct secondary storage device 108 to perform an information management task. For instance, a media agent 144 may instruct a tape library to use a robotic arm or other retrieval means to load or eject a certain storage media, and to subsequently archive, migrate, or retrieve data to or from that media, e.g., for the purpose of restoring data to a client computing device 102. As another example, a secondary storage device 108 may include an array of hard disk drives or solid state drives organized in a RAID configuration, and media agent 144 may forward a logical unit number (LUN) and other appropriate information to the array, which uses the received information to execute the desired secondary copy operation. Media agent 144 may communicate with a secondary storage device 108 via a suitable communications link, such as a SCSI or Fibre Channel link.

Each media agent 144 may maintain an associated media agent database 152. Media agent database 152 may be stored to a disk or other storage device (not shown) that is local to the secondary storage computing device 106 on which media agent 144 executes. In other cases, media agent database 152 is stored separately from the host secondary storage computing device 106. Media agent database 152 can include, among other things, a media agent index 153 (see, e.g., FIG. 1C). In some cases, media agent index 153 does not form a part of and is instead separate from media agent database 152.

Media agent index 153 (or "index 153") may be a data structure associated with the particular media agent 144 that includes information about the stored data associated with the particular media agent and which may be generated in the course of performing a secondary copy operation or a restore. Index 153 provides a fast and efficient mechanism for locating/browsing secondary copies 116 or other data stored in secondary storage devices 108 without having to access secondary storage device 108 to retrieve the information from there. For instance, for each secondary copy 116, index 153 may include metadata such as a list of the data objects (e.g., files/subdirectories, database objects, mailbox objects, etc.), a logical path to the secondary copy 116 on the corresponding secondary storage device 108, location information (e.g., offsets) indicating where the data objects are stored in the secondary storage device 108, when the data objects were created or modified, etc. Thus, index 153 includes metadata associated with the secondary copies 116 that is readily available for use from media agent 144. In some embodiments, some or all of the information in index 153 may instead or additionally be stored along with secondary copies 116 in secondary storage device 108. In some embodiments, a secondary storage device 108 can include sufficient information to enable a "bare metal restore," where the operating system and/or software applications of a failed client computing device 102 or another target may be automatically restored without manually reinstalling individual software packages (including operating systems).

Because index 153 may operate as a cache, it can also be referred to as an "index cache." In such cases, information stored in index cache 153 typically comprises data that reflects certain particulars about relatively recent secondary copy operations. After some triggering event, such as after some time elapses or index cache 153 reaches a particular size, certain portions of index cache 153 may be copied or migrated to secondary storage device 108, e.g., on a least-recently-used basis. This information may be retrieved and uploaded back into index cache 153 or otherwise restored to media agent 144 to facilitate retrieval of data from the secondary storage device(s) 108. In some embodiments, the cached information may include format or containerization information related to archives or other files stored on storage device(s) 108.

In some alternative embodiments media agent 144 generally acts as a coordinator or facilitator of secondary copy operations between client computing devices 102 and secondary storage devices 108, but does not actually write the data to secondary storage device 108. For instance, storage manager 140 (or media agent 144) may instruct a client computing device 102 and secondary storage device 108 to communicate with one another directly. In such a case, client computing device 102 transmits data directly or via one or more intermediary components to secondary storage device 108 according to the received instructions, and vice versa. Media agent 144 may still receive, process, and/or maintain metadata related to the secondary copy operations, i.e., may continue to build and maintain index 153. In these embodiments, payload data can flow through media agent 144 for the purposes of populating index 153, but not for writing to secondary storage device 108. Media agent 144 and/or other components such as storage manager 140 may in some cases incorporate additional functionality, such as data classification, content indexing, deduplication, encryption, compression, and the like. Further details regarding these and other functions are described below.

Distributed, Scalable Architecture

As described, certain functions of system 100 can be distributed amongst various physical and/or logical components. For instance, one or more of storage manager 140, data agents 142, and media agents 144 may operate on computing devices that are physically separate from one another. This architecture can provide a number of benefits. For instance, hardware and software design choices for each distributed component can be targeted to suit its particular function. The secondary computing devices 106 on which media agents 144 operate can be tailored for interaction with associated secondary storage devices 108 and provide fast index cache operation, among other specific tasks. Similarly, client computing device(s) 102 can be selected to effectively service applications 110 in order to efficiently produce and store primary data 112.

Moreover, in some cases, one or more of the individual components of information management system 100 can be distributed to multiple separate computing devices. As one example, for large file systems where the amount of data stored in management database 146 is relatively large, database 146 may be migrated to or may otherwise reside on a specialized database server (e.g., an SQL server) separate from a server that implements the other functions of storage manager 140. This distributed configuration can provide added protection because database 146 can be protected with standard database utilities (e.g., SQL log shipping or database replication) independent from other functions of storage manager 140. Database 146 can be efficiently replicated to a remote site for use in the event of a disaster or other data loss at the primary site. Or database 146 can be replicated to another computing device within the same site, such as to a higher performance machine in the event that a storage manager host computing device can no longer service the needs of a growing system 100.

Figure 1D:
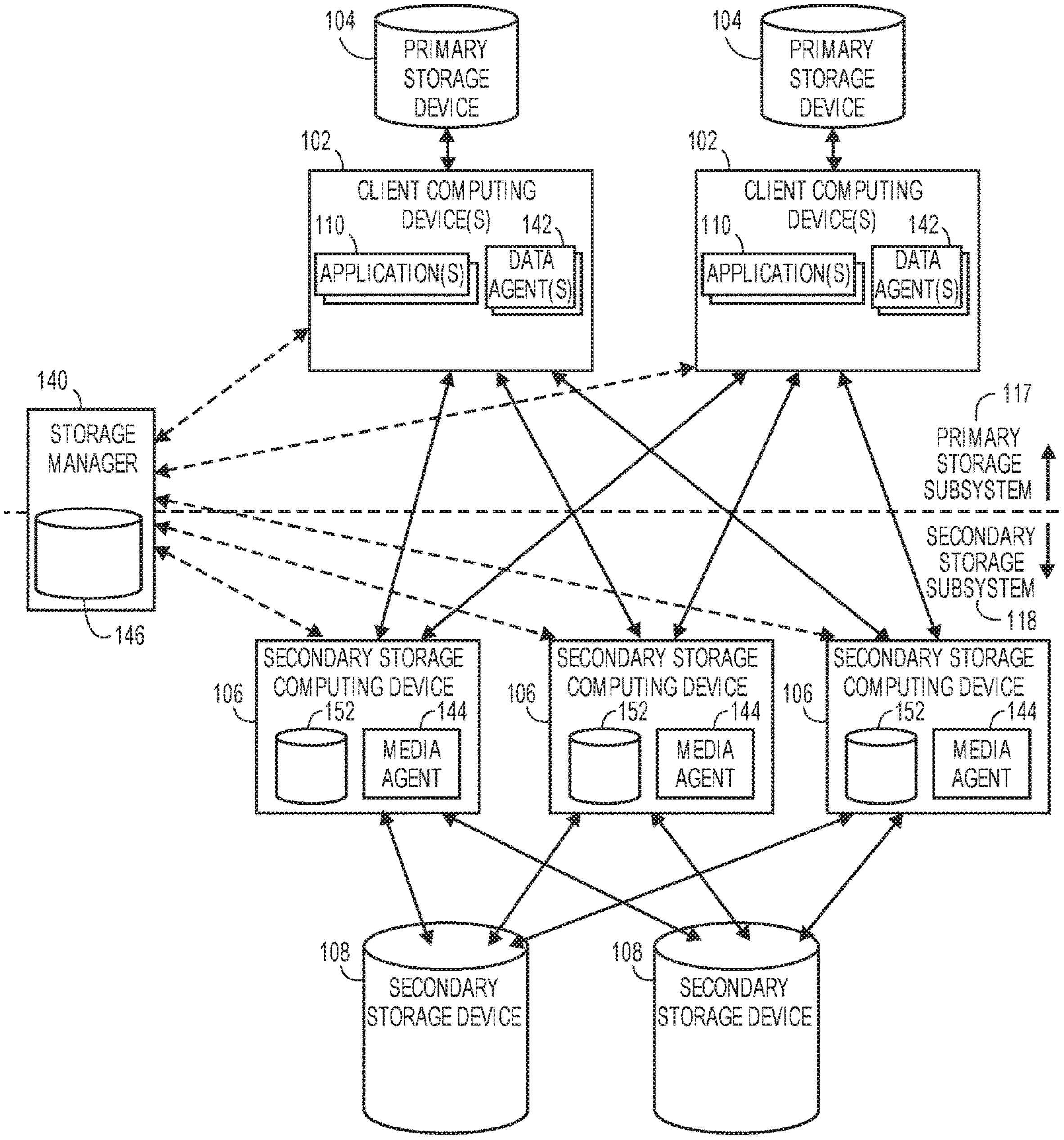
FIG. 1D is a block diagram illustrating a scalable information management system.

The distributed architecture also provides scalability and efficient component utilization. FIG. 1D shows an embodiment of information management system 100 including a plurality of client computing devices 102 and associated data agents 142 as well as a plurality of secondary storage computing devices 106 and associated media agents 144. Additional components can be added or subtracted based on the evolving needs of system 100. For instance, depending on where bottlenecks are identified, administrators can add additional client computing devices 102, secondary storage computing devices 106, and/or secondary storage devices 108. Moreover, where multiple fungible components are available, load balancing can be implemented to dynamically address identified bottlenecks. As an example, storage manager 140 may dynamically select which media agents 144 and/or secondary storage devices 108 to use for storage operations based on a processing load analysis of media agents 144 and/or secondary storage devices 108, respectively.

Where system 100 includes multiple media agents 144 (see, e.g., FIG. 1D), a first media agent 144 may provide failover functionality for a second failed media agent 144. In addition, media agents 144 can be dynamically selected to provide load balancing. Each client computing device 102 can communicate with, among other components, any of the media agents 144, e.g., as directed by storage manager 140. And each media agent 144 may communicate with, among other components, any of secondary storage devices 108, e.g., as directed by storage manager 140. Thus, operations can be routed to secondary storage devices 108 in a dynamic and highly flexible manner, to provide load balancing, failover, etc. Further examples of scalable systems capable of dynamic storage operations, load balancing, and failover are provided in U.S. Pat. No. 7,246,207.

While distributing functionality amongst multiple computing devices can have certain advantages, in other contexts it can be beneficial to consolidate functionality on the same computing device. In alternative configurations, certain components may reside and execute on the same computing device. As such, in other embodiments, one or more of the components shown in FIG. 1C may be implemented on the same computing device. In one configuration, a storage manager 140, one or more data agents 142, and/or one or more media agents 144 are all implemented on the same computing device. In other embodiments, one or more data agents 142 and one or more media agents 144 are implemented on the same computing device, while storage manager 140 is implemented on a separate computing device, etc. without limitation.

Exemplary Types of Information Management Operations, Including Storage Operations In order to protect and leverage stored data, system 100 can be configured to perform a variety of information management operations, which may also be referred to in some cases as storage management operations or storage operations. These operations can generally include (i) data movement operations, (ii) processing and data manipulation operations, and (iii) analysis, reporting, and management operations.

Data Movement Operations, Including Secondary Copy Operations

Data movement operations are generally storage operations that involve the copying or migration of data between different locations in system 100. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104, or in some cases within the same primary storage device 104 such as within a storage array.

Data movement operations can include by way of example, backup operations, archive operations, information lifecycle management operations such as hierarchical storage management operations, replication operations (e.g., continuous data replication), snapshot operations, deduplication or single-instancing operations, auxiliary copy operations, disaster-recovery copy operations, and the like. As will be discussed, some of these operations do not necessarily create distinct copies. Nonetheless, some or all of these operations are generally referred to as "secondary copy operations" for simplicity, because they involve secondary copies. Data movement also comprises restoring secondary copies.

Backup Operations

A backup operation creates a copy of a version of primary data 112 at a particular point in time (e.g., one or more files or other data units). Each subsequent backup copy 116 (which is a form of secondary copy 116) may be maintained independently of the first. A backup generally involves maintaining a version of the copied primary data 112 as well as backup copies 116. Further, a backup copy in some embodiments is generally stored in a form that is different from the native format, e.g., a backup format. This contrasts to the version in primary data 112 which may instead be stored in a format native to the source application(s) 110. In various cases, backup copies can be stored in a format in which the data is compressed, encrypted, deduplicated, and/or otherwise modified from the original native application format. For example, a backup copy may be stored in a compressed backup format that facilitates efficient long-term storage. Backup copies 116 can have relatively long retention periods as compared to primary data 112, which is generally highly changeable. Backup copies 116 may be stored on media with slower retrieval times than primary storage device 104. Some backup copies may have shorter retention periods than some other types of secondary copies 116, such as archive copies (described below). Backups may be stored at an offsite location.

Backup operations can include full backups, differential backups, incremental backups, "synthetic full" backups, and/or creating a "reference copy." A full backup (or "standard full backup") in some embodiments is generally a complete image of the data to be protected. However, because full backup copies can consume a relatively large amount of storage, it can be useful to use a full backup copy as a baseline and only store changes relative to the full backup copy afterwards.

A differential backup operation (or cumulative incremental backup operation) tracks and stores changes that occurred since the last full backup. Differential backups can grow quickly in size, but can restore relatively efficiently because a restore can be completed in some cases using only the full backup copy and the latest differential copy.

An incremental backup operation generally tracks and stores changes since the most recent backup copy of any type, which can greatly reduce storage utilization. In some cases, however, restoring can be lengthy compared to full or differential backups because completing a restore operation may involve accessing a full backup in addition to multiple incremental backups.

Synthetic full backups generally consolidate data without directly backing up data from the client computing device. A synthetic full backup is created from the most recent full backup (i.e., standard or synthetic) and subsequent incremental and/or differential backups. The resulting synthetic full backup is identical to what would have been created had the last backup for the subclient been a standard full backup. Unlike standard full, incremental, and differential backups, however, a synthetic full backup does not actually transfer data from primary storage to the backup media, because it operates as a backup consolidator. A synthetic full backup extracts the index data of each participating subclient. Using this index data and the previously backed up user data images, it builds new full backup images (e.g., bitmaps), one for each subclient. The new backup images consolidate the index and user data stored in the related incremental, differential, and previous full backups into a synthetic backup file that fully represents the subclient (e.g., via pointers) but does not comprise all its constituent data.

Any of the above types of backup operations can be at the volume level, file level, or block level. Volume level backup operations generally involve copying of a data volume (e.g., a logical disk or partition) as a whole. In a file-level backup, information management system 100 generally tracks changes to individual files and includes copies of files in the backup copy. For block-level backups, files are broken into constituent blocks, and changes are tracked at the block level. Upon restore, system 100 reassembles the blocks into files in a transparent fashion. Far less data may actually be transferred and copied to secondary storage devices 108 during a file-level copy than a volume-level copy. Likewise, a block-level copy may transfer less data than a file-level copy, resulting in faster execution. However, restoring a relatively higher-granularity copy can result in longer restore times. For instance, when restoring a block-level copy, the process of locating and retrieving constituent blocks can sometimes take longer than restoring file-level backups.

A reference copy may comprise copy(ies) of selected objects from backed up data, typically to help organize data by keeping contextual information from multiple sources together, and/or help retain specific data for a longer period of time, such as for legal hold needs. A reference copy generally maintains data integrity, and when the data is restored, it may be viewed in the same format as the source data. In some embodiments, a reference copy is based on a specialized client, individual subclient and associated information management policies (e.g., storage policy, retention policy, etc.) that are administered within system 100.

Archive Operations

Because backup operations generally involve maintaining a version of the copied primary data 112 and also maintaining backup copies in secondary storage device(s) 108, they can consume significant storage capacity. To reduce storage consumption, an archive operation according to certain embodiments creates an archive copy 116 by both copying and removing source data. Or, seen another way, archive operations can involve moving some or all of the source data to the archive destination. Thus, data satisfying criteria for removal (e.g., data of a threshold age or size) may be removed from source storage. The source data may be primary data 112 or a secondary copy 116, depending on the situation. As with backup copies, archive copies can be stored in a format in which the data is compressed, encrypted, deduplicated, and/or otherwise modified from the format of the original application or source copy. In addition, archive copies may be retained for relatively long periods of time (e.g., years) and, in some cases are never deleted. In certain embodiments, archive copies may be made and kept for extended periods in order to meet compliance regulations.

Archiving can also serve the purpose of freeing up space in primary storage device(s) 104 and easing the demand on computational resources on client computing device 102. Similarly, when a secondary copy 116 is archived, the archive copy can therefore serve the purpose of freeing up space in the source secondary storage device(s) 108. Examples of data archiving operations are provided in U.S. Pat. No. 7,107,298.

Snapshot Operations

Snapshot operations can provide a relatively lightweight, efficient mechanism for protecting data. From an end-user viewpoint, a snapshot may be thought of as an "instant" image of primary data 112 at a given point in time, and may include state and/or status information relative to an application 110 that creates/manages primary data 112. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation occurs where a target storage device (e.g., a primary storage device 104 or a secondary storage device 108) performs the snapshot operation in a self-contained fashion, substantially independently, using hardware, firmware and/or software operating on the storage device itself. For instance, the storage device may perform snapshot operations generally without intervention or oversight from any of the other components of the system 100, e.g., a storage array may generate an "array-created" hardware snapshot and may also manage its storage, integrity, versioning, etc. In this manner, hardware snapshots can off-load other components of system 100 from snapshot processing. An array may receive a request from another component to take a snapshot and then proceed to execute the "hardware snapshot" operations autonomously, preferably reporting success to the requesting component.

A "software snapshot" (or "software-based snapshot") operation, on the other hand, occurs where a component in system 100 (e.g., client computing device 102, etc.) implements a software layer that manages the snapshot operation via interaction with the target storage device. For instance, the component executing the snapshot management software layer may derive a set of pointers and/or data that represents the snapshot. The snapshot management software layer may then transmit the same to the target storage device, along with appropriate instructions for writing the snapshot. One example of a software snapshot product is Microsoft Volume Snapshot Service (VSS), which is part of the Microsoft Windows operating system.

Some types of snapshots do not actually create another physical copy of all the data as it existed at the particular point in time, but may simply create pointers that map files and directories to specific memory locations (e.g., to specific disk blocks) where the data resides as it existed at the particular point in time. For example, a snapshot copy may include a set of pointers derived from the file system or from an application. In some other cases, the snapshot may be created at the block-level, such that creation of the snapshot occurs without awareness of the file system. Each pointer points to a respective stored data block, so that collectively, the set of pointers reflect the storage location and state of the data object (e.g., file(s) or volume(s) or data set(s)) at the point in time when the snapshot copy was created.

An initial snapshot may use only a small amount of disk space needed to record a mapping or other data structure representing or otherwise tracking the blocks that correspond to the current state of the file system. Additional disk space is usually required only when files and directories change later on. Furthermore, when files change, typically only the pointers which map to blocks are copied, not the blocks themselves. For example for "copy-on-write" snapshots, when a block changes in primary storage, the block is copied to secondary storage or cached in primary storage before the block is overwritten in primary storage, and the pointer to that block is changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782. A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Replication is another type of secondary copy operation. Some types of secondary copies 116 periodically capture images of primary data 112 at particular points in time (e.g., backups, archives, and snapshots). However, it can also be useful for recovery purposes to protect primary data 112 in a more continuous fashion, by replicating primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments, secondary copy operations are performed on replicated data that represents a recoverable state, or "known good state" of a particular application running on the source system. For instance, in certain embodiments, known good replication copies may be viewed as copies of primary data 112. This feature allows the system to directly access, copy, restore, back up, or otherwise manipulate the replication copies as if they were the "live" primary data 112. This can reduce access time, storage utilization, and impact on source applications 110, among other benefits. Based on known good state information, system 100 can replicate sections of application data that represent a recoverable state rather than rote copying of blocks of data. Examples of replication operations (e.g., continuous data replication) are provided in U.S. Pat. No. 7,617,262.

Deduplication/Single-Instancing Operations

Deduplication or single-instance storage is useful to reduce the amount of non-primary data. For instance, some or all of the above-described secondary copy operations can involve deduplication in some fashion. New data is read, broken down into data portions of a selected granularity (e.g., sub-file level blocks, files, etc.), compared with corresponding portions that are already in secondary storage, and only new/changed portions are stored. Portions that already exist are represented as pointers to the already-stored data. Thus, a deduplicated secondary copy 116 may comprise actual data portions copied from primary data 112 and may further comprise pointers to already-stored data, which is generally more storage-efficient than a full copy.

In order to streamline the comparison process, system 100 may calculate and/or store signatures (e.g., hashes or cryptographically unique IDs) corresponding to the individual source data portions and compare the signatures to already-stored data signatures, instead of comparing entire data portions. In some cases, only a single instance of each data portion is stored, and deduplication operations may therefore be referred to interchangeably as "single-instancing" operations. Depending on the implementation, however, deduplication operations can store more than one instance of certain data portions, yet still significantly reduce stored-data redundancy. Depending on the embodiment, deduplication portions such as data blocks can be of fixed or variable length. Using variable length blocks can enhance deduplication by responding to changes in the data stream, but can involve more complex processing. In some cases, system 100 utilizes a technique for dynamically aligning deduplication blocks based on changing content in the data stream, as described in U.S. Pat. No. 8,364,652.

System 100 can deduplicate in a variety of manners at a variety of locations. For instance, in some embodiments, system 100 implements "target-side" deduplication by deduplicating data at the media agent 144 after being received from data agent 142. In some such cases, media agents 144 are generally configured to manage the deduplication process. For instance, one or more of the media agents 144 maintain a corresponding deduplication database that stores deduplication information (e.g., datablock signatures). Examples of such a configuration are provided in U.S. Pat. No. 9,020,900. Instead of or in combination with "target-side" deduplication, "source-side" (or "client-side") deduplication can also be performed, e.g., to reduce the amount of data to be transmitted by data agent 142 to media agent 144. Storage manager 140 may communicate with other components within system 100 via network protocols and cloud service provider APIs to facilitate cloud-based deduplication/single instancing, as exemplified in U.S. Pat. No. 8,954,446. Some other deduplication/single instancing techniques are described in U.S. Pat. Pub. No. 2006/0224846 and in U.S. Pat. No. 9,098,495.

Information Lifecycle Management and Hierarchical Storage Management

In some embodiments, files and other data over their lifetime move from more expensive quick-access storage to less expensive slower-access storage. Operations associated with moving data through various tiers of storage are sometimes referred to as information lifecycle management (ILM) operations.

One type of ILM operation is a hierarchical storage management (HSM) operation, which generally automatically moves data between classes of storage devices, such as from high-cost to low-cost storage devices. For instance, an HSM operation may involve movement of data from primary storage devices 104 to secondary storage devices 108, or between tiers of secondary storage devices 108. With each tier, the storage devices may be progressively cheaper, have relatively slower access/restore times, etc. For example, movement of data between tiers may occur as data becomes less important over time. In some embodiments, an HSM operation is similar to archiving in that creating an HSM copy may (though not always) involve deleting some of the source data, e.g., according to one or more criteria related to the source data. For example, an HSM copy may include primary data 112 or a secondary copy 116 that exceeds a given size threshold or a given age threshold. Often, and unlike some types of archive copies, HSM data that is removed or aged from the source is replaced by a logical reference pointer or stub. The reference pointer or stub can be stored in the primary storage device 104 or other source storage device, such as a secondary storage device 108 to replace the deleted source data and to point to or otherwise indicate the new location in (another) secondary storage device 108.

For example, files are generally moved between higher and lower cost storage depending on how often the files are accessed. When a user requests access to HSM data that has been removed or migrated, system 100 uses the stub to locate the data and may make recovery of the data appear transparent, even though the HSM data may be stored at a location different from other source data. In this manner, the data appears to the user (e.g., in file system browsing windows and the like) as if it still resides in the source location (e.g., in a primary storage device 104). The stub may include metadata associated with the corresponding data, so that a file system and/or application can provide some information about the data object and/or a limited-functionality version (e.g., a preview) of the data object.

An HSM copy may be stored in a format other than the native application format (e.g., compressed, encrypted, deduplicated, and/or otherwise modified). In some cases, copies which involve the removal of data from source storage and the maintenance of stub or other logical reference information on source storage may be referred to generally as "online archive copies." On the other hand, copies which involve the removal of data from source storage without the maintenance of stub or other logical reference information on source storage may be referred to as "off-line archive copies." Examples of HSM and ILM techniques are provided in U.S. Pat. No. 7,343,453.

Auxiliary Copy Operations

An auxiliary copy is generally a copy of an existing secondary copy 116. For instance, an initial secondary copy 116 may be derived from primary data 112 or from data residing in secondary storage subsystem 118, whereas an auxiliary copy is generated from the initial secondary copy 116. Auxiliary copies provide additional standby copies of data and may reside on different secondary storage devices 108 than the initial secondary copies 116. Thus, auxiliary copies can be used for recovery purposes if initial secondary copies 116 become unavailable. Exemplary auxiliary copy techniques are described in further detail in U.S. Pat. No. 8,230,195.

Disaster-Recovery Copy Operations

System 100 may also make and retain disaster recovery copies, often as secondary, high-availability disk copies. System 100 may create secondary copies and store them at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Manipulation, Including Encryption and Compression

Data manipulation and processing may include encryption and compression as well as integrity marking and checking, formatting for transmission, formatting for storage, etc. Data may be manipulated "client-side" by data agent 142 as well as "target-side" by media agent 144 in the course of creating secondary copy 116, or conversely in the course of restoring data from secondary to primary.

Encryption Operations

System 100 in some cases is configured to process data (e.g., files or other data objects, primary data 112, secondary copies 116, etc.), according to an appropriate encryption algorithm (e.g., Blowfish, Advanced Encryption Standard (AES), Triple Data Encryption Standard (3-DES), etc.) to limit access and provide data security. System 100 in some cases encrypts the data at the client level, such that client computing devices 102 (e.g., data agents 142) encrypt the data prior to transferring it to other components, e.g., before sending the data to media agents 144 during a secondary copy operation. In such cases, client computing device 102 may maintain or have access to an encryption key or passphrase for decrypting the data upon restore. Encryption can also occur when media agent 144 creates auxiliary copies or archive copies. Encryption may be applied in creating a secondary copy 116 of a previously unencrypted secondary copy 116, without limitation. In further embodiments, secondary storage devices 108 can implement built-in, high performance hardware-based encryption.

Compression Operations

Similar to encryption, system 100 may also or alternatively compress data in the course of generating a secondary copy 116. Compression encodes information such that fewer bits are needed to represent the information as compared to the original representation. Compression techniques are well known in the art. Compression operations may apply one or more data compression algorithms. Compression may be applied in creating a secondary copy 116 of a previously uncompressed secondary copy, e.g., when making archive copies or disaster recovery copies. The use of compression may result in metadata that specifies the nature of the compression, so that data may be uncompressed on restore if appropriate.

Data Analysis, Reporting, and Management Operations

Data analysis, reporting, and management operations can differ from data movement operations in that they do not necessarily involve copying, migration or other transfer of data between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging data under management to enhance search and other features.

Classification Operations/Content Indexing

In some embodiments, information management system 100 analyzes and indexes characteristics, content, and metadata associated with primary data 112 ("online content indexing") and/or secondary copies 116 ("off-line content indexing"). Content indexing can identify files or other data objects based on content (e.g., user-defined keywords or phrases, other keywords/phrases that are not defined by a user, etc.), and/or metadata (e.g., email metadata such as "to," "from," "cc," "bcc," attachment name, received time, etc.). Content indexes may be searched and search results may be restored.

System 100 generally organizes and catalogues the results into a content index, which may be stored within media agent database 152, for example. The content index can also include the storage locations of or pointer references to indexed data in primary data 112 and/or secondary copies 116. Results may also be stored elsewhere in system 100 (e.g., in primary storage device 104 or in secondary storage device 108). Such content index data provides storage manager 140 or other components with an efficient mechanism for locating primary data 112 and/or secondary copies 116 of data objects that match particular criteria, thus greatly increasing the search speed capability of system 100. For instance, search criteria can be specified by a user through user interface 158 of storage manager 140. Moreover, when system 100 analyzes data and/or metadata in secondary copies 116 to create an "off-line content index," this operation has no significant impact on the performance of client computing devices 102 and thus does not take a toll on the production environment. Examples of content indexing techniques are provided in U.S. Pat. No. 8,170,995.

One or more components, such as a content index engine, can be configured to scan data and/or associated metadata for classification purposes to populate a database (or other data structure) of information, which can be referred to as a "data classification database" or a "metabase." Depending on the embodiment, the data classification database(s) can be organized in a variety of different ways, including centralization, logical sub-divisions, and/or physical sub-divisions. For instance, one or more data classification databases may be associated with different subsystems or tiers within system 100. As an example, there may be a first metabase associated with primary storage subsystem 117 and a second metabase associated with secondary storage subsystem 118. In other cases, metabase(s) may be associated with individual components, e.g., client computing devices 102 and/or media agents 144. In some embodiments, a data classification database may reside as one or more data structures within management database 146, may be otherwise associated with storage manager 140, and/or may reside as a separate component. In some cases, metabase(s) may be included in separate database(s) and/or on separate storage device(s) from primary data 112 and/or secondary copies 116, such that operations related to the metabase(s) do not significantly impact performance on other components of system 100. In other cases, metabase(s) may be stored along with primary data 112 and/or secondary copies 116. Files or other data objects can be associated with identifiers (e.g., tag entries, etc.) to facilitate searches of stored data objects. Among a number of other benefits, the metabase can also allow efficient, automatic identification of files or other data objects to associate with secondary copy or other information management operations. For instance, a metabase can dramatically improve the speed with which system 100 can search through and identify data as compared to other approaches that involve scanning an entire file system. Examples of metabases and data classification operations are provided in U.S. Pat. Nos. 7,734,669 and 7,747,579.

Management and Reporting Operations

Certain embodiments leverage the integrated ubiquitous nature of system 100 to provide useful system-wide management and reporting. Operations management can generally include monitoring and managing the health and performance of system 100 by, without limitation, performing error tracking, generating granular storage/performance metrics (e.g., job success/failure information, deduplication efficiency, etc.), generating storage modeling and costing information, and the like. As an example, storage manager 140 or another component in system 100 may analyze traffic patterns and suggest and/or automatically route data to minimize congestion. In some embodiments, the system can generate predictions relating to storage operations or storage operation information. Such predictions, which may be based on a trending analysis, may predict various network operations or resource usage, such as network traffic levels, storage media use, use of bandwidth of communication links, use of media agent components, etc. Further examples of traffic analysis, trend analysis, prediction generation, and the like are described in U.S. Pat. No. 7,343,453.

In some configurations having a hierarchy of storage operation cells, a master storage manager 140 may track the status of subordinate cells, such as the status of jobs, system components, system resources, and other items, by communicating with storage managers 140 (or other components) in the respective storage operation cells. Moreover, the master storage manager 140 may also track status by receiving periodic status updates from the storage managers 140 (or other components) in the respective cells regarding jobs, system components, system resources, and other items. In some embodiments, a master storage manager 140 may store status information and other information regarding its associated storage operation cells and other system information in its management database 146 and/or index 150 (or in another location). The master storage manager 140 or other component may also determine whether certain storage-related or other criteria are satisfied, and may perform an action or trigger event (e.g., data migration) in response to the criteria being satisfied, such as where a storage threshold is met for a particular volume, or where inadequate protection exists for certain data. For instance, data from one or more storage operation cells is used to dynamically and automatically mitigate recognized risks, and/or to advise users of risks or suggest actions to mitigate these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be restorable within a given time period, that data on a secondary volume may be mirrored or otherwise migrated to a specified number of other volumes, etc.). If a risk condition or other criterion is triggered, the system may notify the user of these conditions and may suggest (or automatically implement) a mitigation action to address the risk. For example, the system may indicate that data from a primary copy 112 should be migrated to a secondary storage device 108 to free up space on primary storage device 104. Examples of the use of risk factors and other triggering criteria are described in U.S. Pat. No. 7,343,453.

In some embodiments, system 100 may also determine whether a metric or other indication satisfies particular storage criteria sufficient to perform an action. For example, a storage policy or other definition might indicate that a storage manager 140 should initiate a particular action if a storage metric or other indication drops below or otherwise fails to satisfy specified criteria such as a threshold of data protection. In some embodiments, risk factors may be quantified into certain measurable service or risk levels. For example, certain applications and associated data may be considered to be more important relative to other data and services. Financial compliance data, for example, may be of greater importance than marketing materials, etc. Network administrators may assign priority values or "weights" to certain data and/or applications corresponding to the relative importance. The level of compliance of secondary copy operations specified for these applications may also be assigned a certain value. Thus, the health, impact, and overall importance of a service may be determined, such as by measuring the compliance value and calculating the product of the priority value and the compliance value to determine the "service level" and comparing it to certain operational thresholds to determine whether it is acceptable. Further examples of the service level determination are provided in U.S. Pat. No. 7,343,453.

System 100 may additionally calculate data costing and data availability associated with information management operation cells. For instance, data received from a cell may be used in conjunction with hardware-related information and other information about system elements to determine the cost of storage and/or the availability of particular data. Exemplary information generated could include how fast a particular department is using up available storage space, how long data would take to recover over a particular pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides, for example. Storage devices may be assigned to a particular cost categories, for example. Further examples of costing techniques are described in U.S. Pat. No. 7,343,453.

Any of the above types of information (e.g., information related to trending, predictions, job, cell or component status, risk, service level, costing, etc.) can generally be provided to users via user interface 158 in a single integrated view or console (not shown). Report types may include: scheduling, event management, media management and data aging. Available reports may also include backup history, data aging history, auxiliary copy history, job history, library and drive, media in library, restore history, and storage policy, etc., without limitation. Such reports may be specified and created at a certain point in time as a system analysis, forecasting, or provisioning tool. Integrated reports may also be generated that illustrate storage and performance metrics, risks and storage costing information. Moreover, users may create their own reports based on specific needs. User interface 158 can include an option to graphically depict the various components in the system using appropriate icons. As one example, user interface 158 may provide a graphical depiction of primary storage devices 104, secondary storage devices 108, data agents 142 and/or media agents 144, and their relationship to one another in system 100.

In general, the operations management functionality of system 100 can facilitate planning and decision-making. For example, in some embodiments, a user may view the status of some or all jobs as well as the status of each component of information management system 100. Users may then plan and make decisions based on this data. For instance, a user may view high-level information regarding secondary copy operations for system 100, such as job status, component status, resource status (e.g., communication pathways, etc.), and other information. The user may also drill down or use other means to obtain more detailed information regarding a particular component, job, or the like. Further examples are provided in U.S. Pat. No. 7,343,453.

System 100 can also be configured to perform system-wide e-discovery operations in some embodiments. In general, e-discovery operations provide a unified collection and search capability for data in the system, such as data stored in secondary storage devices 108 (e.g., backups, archives, or other secondary copies 116). For example, system 100 may construct and maintain a virtual repository for data stored in system 100 that is integrated across source applications 110, different storage device types, etc. According to some embodiments, e-discovery utilizes other techniques described herein, such as data classification and/or content indexing.

Information Management Policies

An information management policy 148 can include a data structure or other information source that specifies a set of parameters (e.g., criteria and rules) associated with secondary copy and/or other information management operations.

One type of information management policy 148 is a "storage policy." According to certain embodiments, a storage policy generally comprises a data structure or other information source that defines (or includes information sufficient to determine) a set of preferences or other criteria for performing information management operations. Storage policies can include one or more of the following: (1) what data will be associated with the storage policy, e.g., subclient; (2) a destination to which the data will be stored; (3) datapath information specifying how the data will be communicated to the destination; (4) the type of secondary copy operation to be performed; and (5) retention information specifying how long the data will be retained at the destination (see, e.g., FIG. 1E). Data associated with a storage policy can be logically organized into subclients, which may represent primary data 112 and/or secondary copies 116. A subclient may represent static or dynamic associations of portions of a data volume. Subclients may represent mutually exclusive portions. Thus, in certain embodiments, a portion of data may be given a label and the association is stored as a static entity in an index, database or other storage location. Subclients may also be used as an effective administrative scheme of organizing data according to data type, department within the enterprise, storage preferences, or the like. Depending on the configuration, subclients can correspond to files, folders, virtual machines, databases, etc. In one exemplary scenario, an administrator may find it preferable to separate e-mail data from financial data using two different subclients.

A storage policy can define where data is stored by specifying a target or destination storage device (or group of storage devices). For instance, where the secondary storage device 108 includes a group of disk libraries, the storage policy may specify a particular disk library for storing the subclients associated with the policy. As another example, where the secondary storage devices 108 include one or more tape libraries, the storage policy may specify a particular tape library for storing the subclients associated with the storage policy, and may also specify a drive pool and a tape pool defining a group of tape drives and a group of tapes, respectively, for use in storing the subclient data. While information in the storage policy can be statically assigned in some cases, some or all of the information in the storage policy can also be dynamically determined based on criteria set forth in the storage policy. For instance, based on such criteria, a particular destination storage device(s) or other parameter of the storage policy may be determined based on characteristics associated with the data involved in a particular secondary copy operation, device availability (e.g., availability of a secondary storage device 108 or a media agent 144), network status and conditions (e.g., identified bottlenecks), user credentials, and the like.

Datapath information can also be included in the storage policy. For instance, the storage policy may specify network pathways and components to utilize when moving the data to the destination storage device(s). In some embodiments, the storage policy specifies one or more media agents 144 for conveying data associated with the storage policy between the source and destination. A storage policy can also specify the type(s) of associated operations, such as backup, archive, snapshot, auxiliary copy, or the like. Furthermore, retention parameters can specify how long the resulting secondary copies 116 will be kept (e.g., a number of days, months, years, etc.), perhaps depending on organizational needs and/or compliance criteria.

When adding a new client computing device 102, administrators can manually configure information management policies 148 and/or other settings, e.g., via user interface 158. However, this can be an involved process resulting in delays, and it may be desirable to begin data protection operations quickly, without awaiting human intervention. Thus, in some embodiments, system 100 automatically applies a default configuration to client computing device 102. As one example, when one or more data agent(s) 142 are installed on a client computing device 102, the installation script may register the client computing device 102 with storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Another type of information management policy 148 is a "scheduling policy," which specifies when and how often to perform operations. Scheduling parameters may specify with what frequency (e.g., hourly, weekly, daily, event-based, etc.) or under what triggering conditions secondary copy or other information management operations are to take place. Scheduling policies in some cases are associated with particular components, such as a subclient, client computing device 102, and the like.

Another type of information management policy 148 is an "audit policy" (or "security policy"), which comprises preferences, rules and/or criteria that protect sensitive data in system 100. For example, an audit policy may define "sensitive objects" which are files or data objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

Another type of information management policy 148 is a "provisioning policy," which can include preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). Storage manager 140 or other components may enforce the provisioning policy. For instance, media agents 144 may enforce the policy when transferring data to secondary storage devices 108. If a client computing device 102 exceeds a quota, a budget for the client computing device 102 (or associated department) may be adjusted accordingly or an alert may trigger.

While the above types of information management policies 148 are described as separate policies, one or more of these can be generally combined into a single information management policy 148. For instance, a storage policy may also include or otherwise be associated with one or more scheduling, audit, or provisioning policies or operational parameters thereof. Moreover, while storage policies are typically associated with moving and storing data, other policies may be associated with other types of information management operations. The following is a non-exhaustive list of items that information management policies 148 may specify:

- schedules or other timing information, e.g., specifying when and/or how often to perform information management operations;
- the type of secondary copy 116 and/or copy format (e.g., snapshot, backup, archive, HSM, etc.);
- a location or a class or quality of storage for storing secondary copies 116 (e.g., one or more particular secondary storage devices 108);
- preferences regarding whether and how to encrypt, compress, deduplicate, or otherwise modify or transform secondary copies 116;
- which system components and/or network pathways (e.g., preferred media agents 144) should be used to perform secondary storage operations;
- resource allocation among different computing devices or other system components used in performing information management operations (e.g., bandwidth allocation, available storage capacity, etc.);
- whether and how to synchronize or otherwise distribute files or other data objects across multiple computing devices or hosted services; and
- retention information specifying the length of time primary data 112 and/or secondary copies 116 should be retained, e.g., in a particular class or tier of storage devices, or within the system 100.

Information management policies 148 can additionally specify or depend on historical or current criteria that may be used to determine which rules to apply to a particular data object, system component, or information management operation, such as:

- frequency with which primary data 112 or a secondary copy 116 of a data object or metadata has been or is predicted to be used, accessed, or modified;
- time-related factors (e.g., aging information such as time since the creation or modification of a data object);
- deduplication information (e.g., hashes, data blocks, deduplication block size, deduplication efficiency or other metrics);
- an estimated or historic usage or cost associated with different components (e.g., with secondary storage devices 108);
- the identity of users, applications 110, client computing devices 102 and/or other computing devices that created, accessed, modified, or otherwise utilized primary data 112 or secondary copies 116;

- a relative sensitivity (e.g., confidentiality, importance) of a data object, e.g., as determined by its content and/or metadata;
- the current or historical storage capacity of various storage devices;
- the current or historical network capacity of network pathways connecting various components within the storage operation cell;
- access control lists or other security information; and
- the content of a particular data object (e.g., its textual content) or of metadata associated with the data object.

Exemplary Storage Policy and Secondary Copy Operations

Figure 1E:
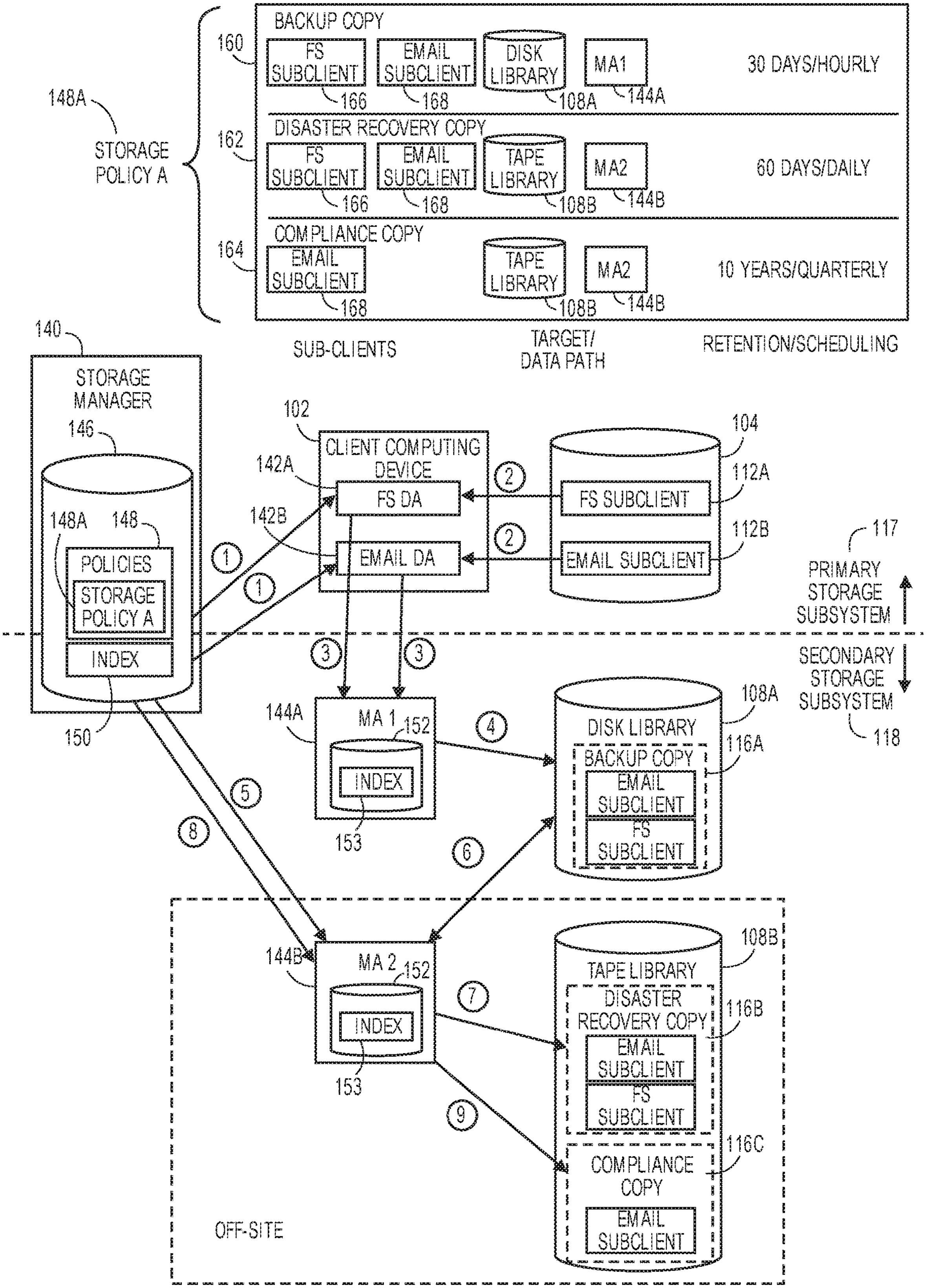
FIG. 1E illustrates certain secondary copy operations according to an exemplary storage policy.

FIG. 1E includes a data flow diagram depicting performance of secondary copy operations by an embodiment of information management system 100, according to an exemplary storage policy 148A. System 100 includes a storage manager 140, a client computing device 102 having a file system data agent 142A and an email data agent 142B operating thereon, a primary storage device 104, two media agents 144A, 144B, and two secondary storage devices 108: a disk library 108A and a tape library 108B. As shown, primary storage device 104 includes primary data 112A, which is associated with a logical grouping of data associated with a file system ("file system subclient"), and primary data 112B, which is a logical grouping of data associated with email ("email subclient"). The techniques described with respect to FIG. 1E can be utilized in conjunction with data that is otherwise organized as well.

As indicated by the dashed box, the second media agent 144B and tape library 108B are "off-site," and may be remotely located from the other components in system 100 (e.g., in a different city, office building, etc.). Indeed, "off-site" may refer to a magnetic tape located in remote storage, which must be manually retrieved and loaded into a tape drive to be read. In this manner, information stored on the tape library 108B may provide protection in the event of a disaster or other failure at the main site(s) where data is stored.

The file system subclient 112A in certain embodiments generally comprises information generated by the file system and/or operating system of client computing device 102, and can include, for example, file system data (e.g., regular files, file tables, mount points, etc.), operating system data (e.g., registries, event logs, etc.), and the like. The e-mail subclient 112B can include data generated by an e-mail application operating on client computing device 102, e.g., mailbox information, folder information, emails, attachments, associated database information, and the like. As described above, the subclients can be logical containers, and the data included in the corresponding primary data 112A and 112B may or may not be stored contiguously.

The exemplary storage policy 148A includes backup copy preferences or rule set 160, disaster recovery copy preferences or rule set 162, and compliance copy preferences or rule set 164. Backup copy rule set 160 specifies that it is associated with file system subclient 166 and email subclient 168. Each of subclients 166 and 168 are associated with the particular client computing device 102. Backup copy rule set 160 further specifies that the backup operation will be written to disk library 108A and designates a particular media agent 144A to convey the data to disk library 108A. Finally, backup copy rule set 160 specifies that backup copies created according to rule set 160 are scheduled to be generated hourly and are to be retained for 30 days. In some other embodiments, scheduling information is not included in storage policy 148A and is instead specified by a separate scheduling policy.

Disaster recovery copy rule set 162 is associated with the same two subclients 166 and 168. However, disaster recovery copy rule set 162 is associated with tape library 108B, unlike backup copy rule set 160. Moreover, disaster recovery copy rule set 162 specifies that a different media agent, namely 144B, will convey data to tape library 108B. Disaster recovery copies created according to rule set 162 will be retained for 60 days and will be generated daily. Disaster recovery copies generated according to disaster recovery copy rule set 162 can provide protection in the event of a disaster or other catastrophic data loss that would affect the backup copy 116A maintained on disk library 108A.

Compliance copy rule set 164 is only associated with the email subclient 168, and not the file system subclient 166. Compliance copies generated according to compliance copy rule set 164 will therefore not include primary data 112A from the file system subclient 166. For instance, the organization may be under an obligation to store and maintain copies of email data for a particular period of time (e.g., 10 years) to comply with state or federal regulations, while similar regulations do not apply to file system data. Compliance copy rule set 164 is associated with the same tape library 108B and media agent 144B as disaster recovery copy rule set 162, although a different storage device or media agent could be used in other embodiments. Finally, compliance copy rule set 164 specifies that the copies it governs will be generated quarterly and retained for 10 years.

Secondary Copy Jobs

A logical grouping of secondary copy operations governed by a rule set and being initiated at a point in time may be referred to as a "secondary copy job" (and sometimes may be called a "backup job," even though it is not necessarily limited to creating only backup copies). Secondary copy jobs may be initiated on demand as well. Steps 1-9 below illustrate three secondary copy jobs based on storage policy 148A.

Referring to FIG. 1E, at step 1, storage manager 140 initiates a backup job according to the backup copy rule set 160, which logically comprises all the secondary copy operations necessary to effectuate rules 160 in storage policy 148A every hour, including steps 1-4 occurring hourly. For instance, a scheduling service running on storage manager 140 accesses backup copy rule set 160 or a separate scheduling policy associated with client computing device 102 and initiates a backup job on an hourly basis. Thus, at the scheduled time, storage manager 140 sends instructions to client computing device 102 (i.e., to both data agent 142A and data agent 142B) to begin the backup job.

At step 2, file system data agent 142A and email data agent 142B on client computing device 102 respond to instructions from storage manager 140 by accessing and processing the respective subclient primary data 112A and 112B involved in the backup copy operation, which can be found in primary storage device 104. Because the secondary copy operation is a backup copy operation, the data agent(s) 142A, 142B may format the data into a backup format or otherwise process the data suitable for a backup copy.

At step 3, client computing device 102 communicates the processed file system data (e.g., using file system data agent 142A) and the processed email data (e.g., using email data agent 142B) to the first media agent 144A according to backup copy rule set 160, as directed by storage manager 140. Storage manager 140 may further keep a record in management database 146 of the association between media agent 144A and one or more of: client computing device 102, file system subclient 112A, file system data agent 142A, email subclient 112B, email data agent 142B, and/or backup copy 116A.

The target media agent 144A receives the data-agent-processed data from client computing device 102, and at step 4 generates and conveys backup copy 116A to disk library 108A to be stored as backup copy 116A, again at the direction of storage manager 140 and according to backup copy rule set 160. Media agent 144A can also update its index 153 to include data and/or metadata related to backup copy 116A, such as information indicating where the backup copy 116A resides on disk library 108A, where the email copy resides, where the file system copy resides, data and metadata for cache retrieval, etc. Storage manager 140 may similarly update its index 150 to include information relating to the secondary copy operation, such as information relating to the type of operation, a physical location associated with one or more copies created by the operation, the time the operation was performed, status information relating to the operation, the components involved in the operation, and the like. In some cases, storage manager 140 may update its index 150 to include some or all of the information stored in index 153 of media agent 144A. At this point, the backup job may be considered complete. After the 30-day retention period expires, storage manager 140 instructs media agent 144A to delete backup copy 116A from disk library 108A and indexes 150 and/or 153 are updated accordingly.

At step 5, storage manager 140 initiates another backup job for a disaster recovery copy according to the disaster recovery rule set 162. Illustratively this includes steps 5-7 occurring daily for creating disaster recovery copy 116B. Illustratively, and by way of illustrating the scalable aspects and off-loading principles embedded in system 100, disaster recovery copy 116B is based on backup copy 116A and not on primary data 112A and 112B.

At step 6, illustratively based on instructions received from storage manager 140 at step 5, the specified media agent 1446 retrieves the most recent backup copy 116A from disk library 108A.

At step 7, again at the direction of storage manager 140 and as specified in disaster recovery copy rule set 162, media agent 144B uses the retrieved data to create a disaster recovery copy 1166 and store it to tape library 1086. In some cases, disaster recovery copy 116B is a direct, mirror copy of backup copy 116A, and remains in the backup format. In other embodiments, disaster recovery copy 116B may be further compressed or encrypted, or may be generated in some other manner, such as by using primary data 112A and 1126 from primary storage device 104 as sources. The disaster recovery copy operation is initiated once a day and disaster recovery copies 1166 are deleted after 60 days; indexes 153 and/or 150 are updated accordingly when/after each information management operation is executed and/or completed. The present backup job may be considered completed.

At step 8, storage manager 140 initiates another backup job according to compliance rule set 164, which performs steps 8-9 quarterly to create compliance copy 116C. For instance, storage manager 140 instructs media agent 144B to create compliance copy 116C on tape library 1086, as specified in the compliance copy rule set 164.

At step 9 in the example, compliance copy 116C is generated using disaster recovery copy 1166 as the source. This is efficient, because disaster recovery copy resides on the same secondary storage device and thus no network resources are required to move the data. In other embodiments, compliance copy 116C is instead generated using primary data 112B corresponding to the email subclient or using backup copy 116A from disk library 108A as source data. As specified in the illustrated example, compliance copies 116C are created quarterly, and are deleted after ten years, and indexes 153 and/or 150 are kept up-to-date accordingly.

Exemplary Applications of Storage Policies—Information Governance Policies and Classification Again referring to FIG. 1E, storage manager 140 may permit a user to specify aspects of storage policy 148A. For example, the storage policy can be modified to include information governance policies to define how data should be managed in order to comply with a certain regulation or business objective. The various policies may be stored, for example, in management database 146. An information governance policy may align with one or more compliance tasks that are imposed by regulations or business requirements. Examples of information governance policies might include a Sarbanes-Oxley policy, a HIPAA policy, an electronic discovery (e-discovery) policy, and so on.

Information governance policies allow administrators to obtain different perspectives on an organization's online and offline data, without the need for a dedicated data silo created solely for each different viewpoint. As described previously, the data storage systems herein build an index that reflects the contents of a distributed data set that spans numerous clients and storage devices, including both primary data and secondary copies, and online and offline copies. An organization may apply multiple information governance policies in a top-down manner over that unified data set and indexing schema in order to view and manipulate the data set through different lenses, each of which is adapted to a particular compliance or business goal. Thus, for example, by applying an e-discovery policy and a Sarbanes-Oxley policy, two different groups of users in an organization can conduct two very different analyses of the same underlying physical set of data/copies, which may be distributed throughout the information management system.

An information governance policy may comprise a classification policy, which defines a taxonomy of classification terms or tags relevant to a compliance task and/or business objective. A classification policy may also associate a defined tag with a classification rule. A classification rule defines a particular combination of criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes in any combination, without limitation. A classification rule may also be defined using other classification tags in the taxonomy. The various criteria used to define a classification rule may be combined in any suitable fashion, for example, via Boolean operators, to define a complex classification rule. As an example, an e-discovery classification policy might define a classification tag "privileged" that is associated with documents or data objects that (1) were created or modified by legal department staff, or (2) were sent to or received from outside counsel via email, or (3) contain one of the following keywords: "privileged" or "attorney" or "counsel," or other like terms. Accordingly, all these documents or data objects will be classified as "privileged."

One specific type of classification tag, which may be added to an index at the time of indexing, is an "entity tag."

An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc. A user may define a classification policy by indicating criteria, parameters or descriptors of the policy via a graphical user interface, such as a form or page with fields to be filled in, pull-down menus or entries allowing one or more of several options to be selected, buttons, sliders, hypertext links or other known user interface tools for receiving user input, etc. For example, a user may define certain entity tags, such as a particular product number or project ID. In some implementations, the classification policy can be implemented using cloud-based techniques. For example, the storage devices may be cloud storage devices, and the storage manager 140 may execute cloud service provider API over a network to classify data stored on cloud storage devices.

Restore Operations from Secondary Copies

While not shown in FIG. 1E, at some later point in time, a restore operation can be initiated involving one or more of secondary copies 116A, 116B, and 116C. A restore operation logically takes a selected secondary copy 116, reverses the effects of the secondary copy operation that created it, and stores the restored data to primary storage where a client computing device 102 may properly access it as primary data. A media agent 144 and an appropriate data agent 142 (e.g., executing on the client computing device 102) perform the tasks needed to complete a restore operation. For example, data that was encrypted, compressed, and/or deduplicated in the creation of secondary copy 116 will be correspondingly rehydrated (reversing deduplication), uncompressed, and unencrypted into a format appropriate to primary data. Metadata stored within or associated with the secondary copy 116 may be used during the restore operation. In general, restored data should be indistinguishable from other primary data 112. Preferably, the restored data has fully regained the native format that may make it immediately usable by application 110.

As one example, a user may manually initiate a restore of backup copy 116A, e.g., by interacting with user interface 158 of storage manager 140 or with a web-based console with access to system 100. Storage manager 140 may accesses data in its index 150 and/or management database 146 (and/or the respective storage policy 148A) associated with the selected backup copy 116A to identify the appropriate media agent 144A and/or secondary storage device 108A where the secondary copy resides. The user may be presented with a representation (e.g., stub, thumbnail, listing, etc.) and metadata about the selected secondary copy, in order to determine whether this is the appropriate copy to be restored, e.g., date that the original primary data was created. Storage manager 140 will then instruct media agent 144A and an appropriate data agent 142 on the target client computing device 102 to restore secondary copy 116A to primary storage device 104. A media agent may be selected for use in the restore operation based on a load balancing algorithm, an availability based algorithm, or other criteria. The selected media agent, e.g., 144A, retrieves secondary copy 116A from disk library 108A. For instance, media agent 144A may access its index 153 to identify a location of backup copy 116A on disk library 108A, or may access location information residing on disk library 108A itself.

In some cases a backup copy 116A that was recently created or accessed, may be cached to speed up the restore operation. In such a case, media agent 144A accesses a cached version of backup copy 116A residing in index 153, without having to access disk library 108A for some or all of the data. Once it has retrieved backup copy 116A, the media agent 144A communicates the data to the requesting client computing device 102. Upon receipt, file system data agent 142A and email data agent 142B may unpack (e.g., restore from a backup format to the native application format) the data in backup copy 116A and restore the unpackaged data to primary storage device 104. In general, secondary copies 116 may be restored to the same volume or folder in primary storage device 104 from which the secondary copy was derived; to another storage location or client computing device 102; to shared storage, etc. In some cases, the data may be restored so that it may be used by an application 110 of a different version/vintage from the application that created the original primary data 112.

Exemplary Secondary Copy Formatting

The formatting and structure of secondary copies 116 can vary depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to one or more secondary storage devices 108. In some cases, users can select different chunk sizes, e.g., to improve throughput to tape storage devices. Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, media agent 144, storage manager 140, or other component may divide files into chunks and generate headers for each chunk by processing the files. Headers can include a variety of information such as file and/or volume identifier(s), offset(s), and/or other information associated with the payload data items, a chunk sequence number, etc. Importantly, in addition to being stored with secondary copy 116 on secondary storage device 108, chunk headers can also be stored to index 153 of the associated media agent(s) 144 and/or to index 150 associated with storage manager 140. This can be useful for providing faster processing of secondary copies 116 during browsing, restores, or other operations. In some cases, once a chunk is successfully transferred to a secondary storage device 108, the secondary storage device 108 returns an indication of receipt, e.g., to media agent 144 and/or storage manager 140, which may update their respective indexes 153, 150 accordingly. During restore, chunks may be processed (e.g., by media agent 144) according to the information in the chunk header to reassemble the files.

Data can also be communicated within system 100 in data channels that connect client computing devices 102 to secondary storage devices 108. These data channels can be referred to as "data streams," and multiple data streams can be employed to parallelize an information management operation, improving data transfer rate, among other advantages. Example data formatting techniques including techniques involving data streaming, chunking, and the use of other data structures in creating secondary copies are described in U.S. Pat. Nos. 7,315,923, 8,156,086, and 8,578,120.

Figure 1F:
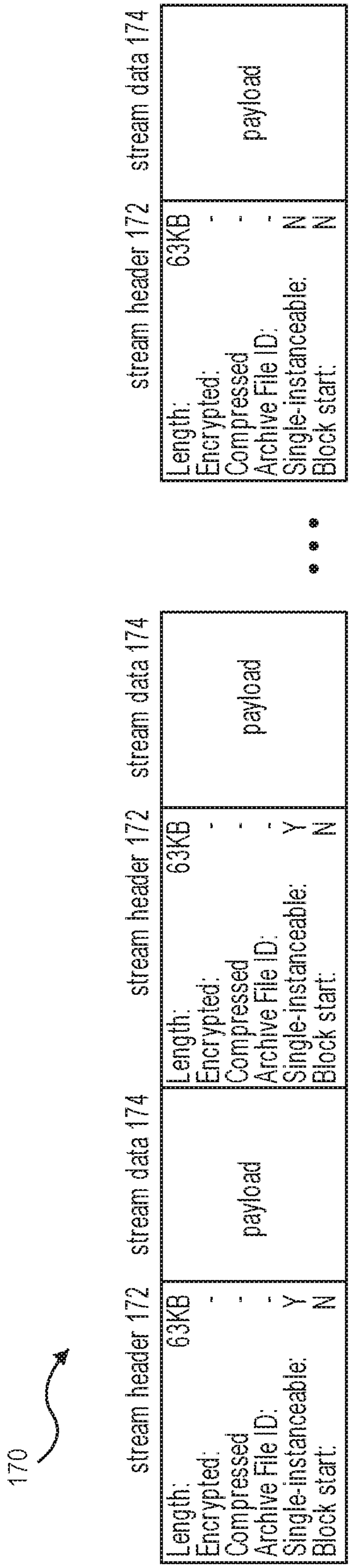
FIGS. 1F-1H are block diagrams illustrating suitable data structures that may be employed by the information management system.
Figure 1G:
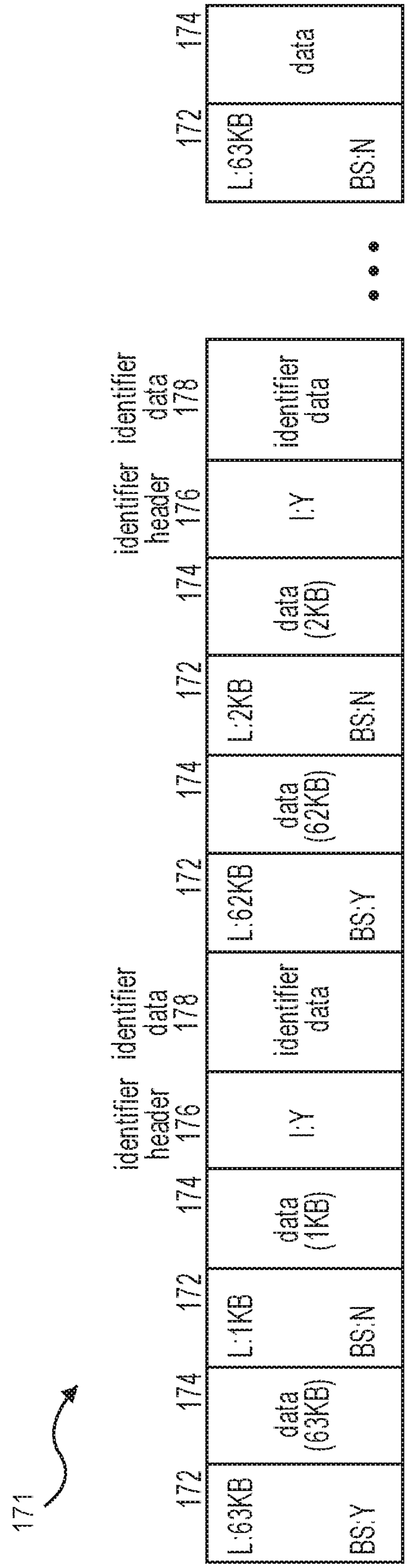

FIGS. 1F and 1G are diagrams of example data streams 170 and 171, respectively, which may be employed for performing information management operations. Referring to FIG. 1F, data agent 142 forms data stream 170 from source data associated with a client computing device 102 (e.g., primary data 112). Data stream 170 is composed of multiple pairs of stream header 172 and stream data (or stream payload) 174. Data streams 170 and 171 shown in the illustrated example are for a single-instanced storage operation, and a stream payload 174 therefore may include both single-instance (SI) data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or non-SI data.

Figure 1H:
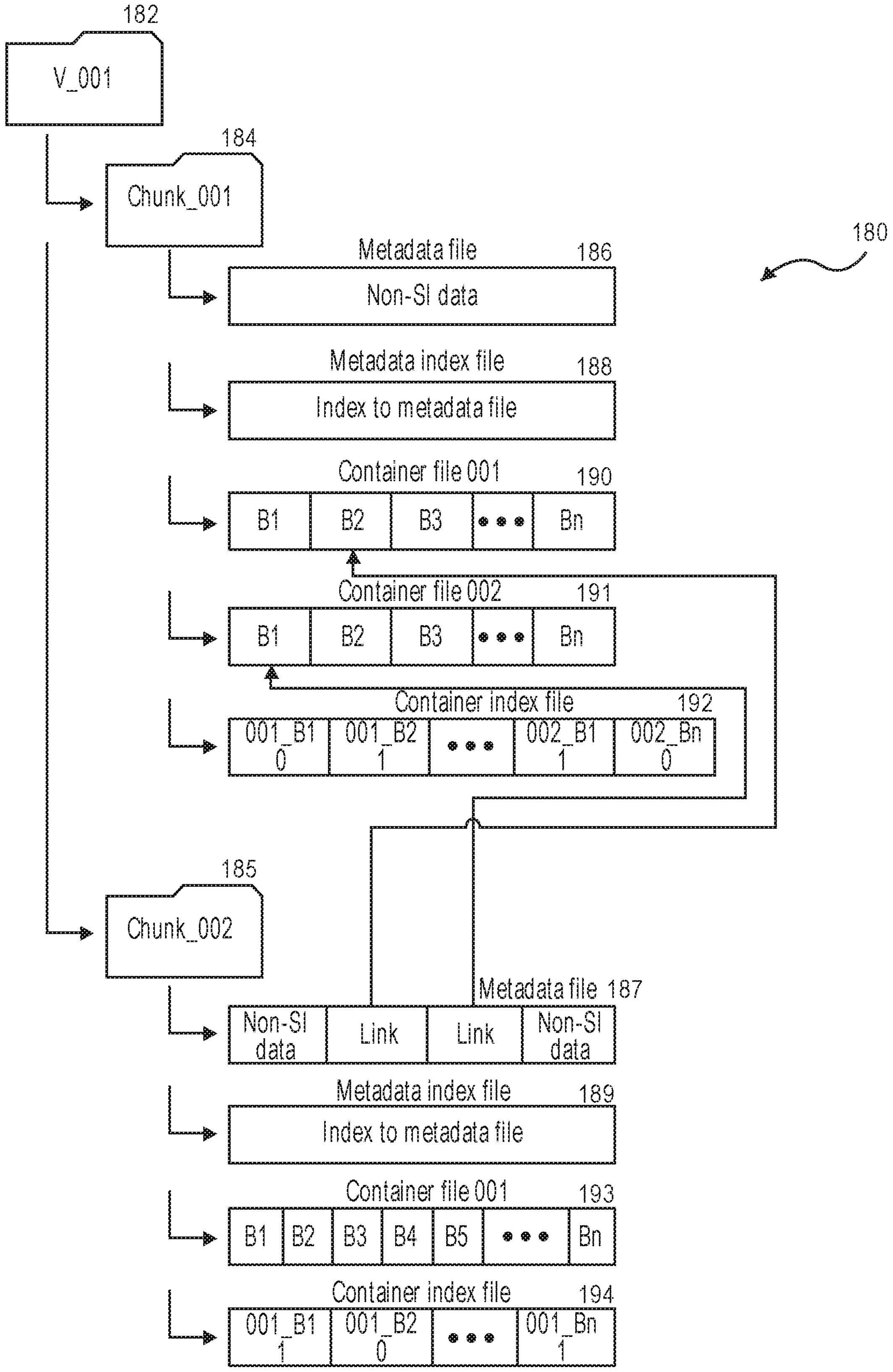

FIG. 1H is a diagram illustrating data structures 180 that may be used to store blocks of SI data and non-SI data on a storage device (e.g., secondary storage device 108). According to certain embodiments, data structures 180 do not form part of a native file system of the storage device. Data structures 180 include one or more volume folders 182, one or more chunk folders 184/185 within the volume folder 182, and multiple files within chunk folder 184. Each chunk folder 184/185 includes a metadata file 186/187, a metadata index file 188/189, one or more container files 190/191/193, and a container index file 192/194. Metadata file 186/187 stores non-SI data blocks as well as links to SI data blocks stored in container files. Metadata index file 188/189 stores an index to the data in the metadata file 186/187. Container files 190/191/193 store SI data blocks. Container index file 192/194 stores an index to container files 190/191/193. Among other things, container index file 192/194 stores an indication of whether a corresponding block in a container file 190/191/193 is referred to by a link in a metadata file 186/187. For example, data block B2 in the container file 190 is referred to by a link in metadata file 187 in chunk folder 185. Accordingly, the corresponding index entry in container index file 192 indicates that data block B2 in container file 190 is referred to. As another example, data block B1 in container file 191 is referred to by a link in metadata file 187, and so the corresponding index entry in container index file 192 indicates that this data block is referred to.

As an example, data structures 180 illustrated in FIG. 1H may have been created as a result of separate secondary copy operations involving two client computing devices 102. For example, a first secondary copy operation on a first client computing device 102 could result in the creation of the first chunk folder 184, and a second secondary copy operation on a second client computing device 102 could result in the creation of the second chunk folder 185. Container files 190/191 in the first chunk folder 184 would contain the blocks of SI data of the first client computing device 102. If the two client computing devices 102 have substantially similar data, the second secondary copy operation on the data of the second client computing device 102 would result in media agent 144 storing primarily links to the data blocks of the first client computing device 102 that are already stored in the container files 190/191. Accordingly, while a first secondary copy operation may result in storing nearly all of the data subject to the operation, subsequent secondary storage operations involving similar data may result in substantial data storage space savings, because links to already stored data blocks can be stored instead of additional instances of data blocks.

If the operating system of the secondary storage computing device 106 on which media agent 144 operates supports sparse files, then when media agent 144 creates container files 190/191/193, it can create them as sparse files. A sparse file is a type of file that may include empty space (e.g., a sparse file may have real data within it, such as at the beginning of the file and/or at the end of the file, but may also have empty space in it that is not storing actual data, such as a contiguous range of bytes all having a value of zero). Having container files 190/191/193 be sparse files allows media agent 144 to free up space in container files 190/191/193 when blocks of data in container files 190/191/193 no longer need to be stored on the storage devices. In some examples, media agent 144 creates a new container file 190/191/193 when a container file 190/191/193 either includes 100 blocks of data or when the size of the container file 190 exceeds 50 MB. In other examples, media agent 144 creates a new container file 190/191/193 when a container file 190/191/193 satisfies other criteria (e.g., it contains from approx. 100 to approx. 1000 blocks or when its size exceeds approximately 50 MB to 1 GB). In some cases, a file on which a secondary copy operation is performed may comprise a large number of data blocks. For example, a 100 MB file may comprise 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. Restoring such files may require accessing multiple container files, chunk folders, and/or volume folders to obtain the requisite data blocks.

Using Backup Data for Replication and Disaster Recovery ("Live Synchronization")

There is an increased demand to off-load resource intensive information management tasks (e.g., data replication tasks) away from production devices (e.g., physical or virtual client computing devices) in order to maximize production efficiency. At the same time, enterprises expect access to readily-available up-to-date recovery copies in the event of failure, with little or no production downtime.

Figure 2A:
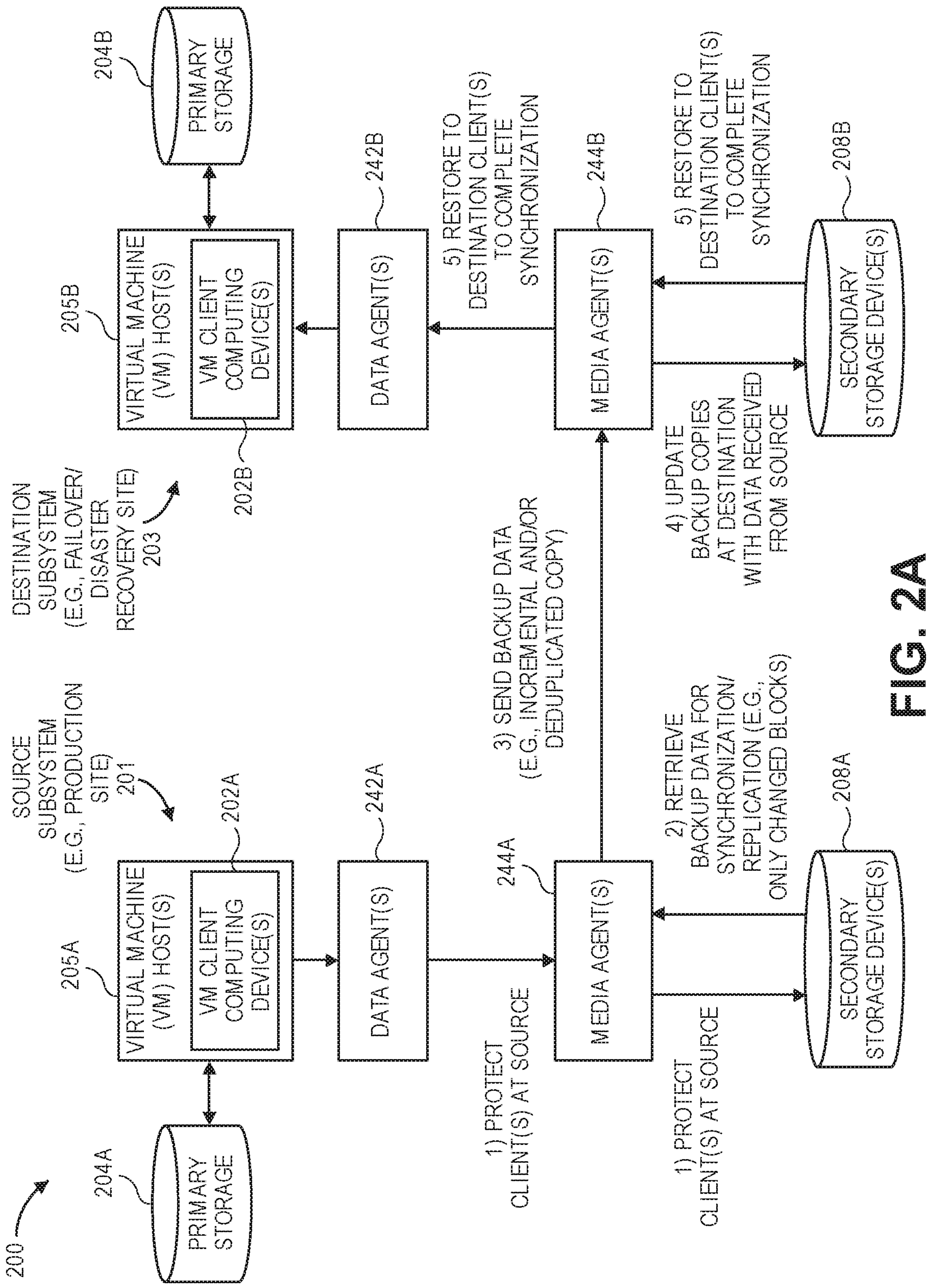
FIG. 2A illustrates a system and technique for synchronizing primary data to a destination such as a failover site using secondary copy data.

FIG. 2A illustrates a system 200 configured to address these and other issues by using backup or other secondary copy data to synchronize a source subsystem 201 (e.g., a production site) with a destination subsystem 203 (e.g., a failover site). Such a technique can be referred to as "live synchronization" and/or "live synchronization replication." In the illustrated embodiment, the source client computing devices 202*a* include one or more virtual machines (or "VMs") executing on one or more corresponding VM host computers 205*a*, though the source need not be virtualized. The destination site 203 may be at a location that is remote from the production site 201, or may be located in the same data center, without limitation. One or more of the production site 201 and destination site 203 may reside at data centers at known geographic locations, or alternatively may operate "in the cloud."

The synchronization can be achieved by generally applying an ongoing stream of incremental backups from the source subsystem 201 to the destination subsystem 203, such as according to what can be referred to as an "incremental forever" approach. FIG. 2A illustrates an embodiment of a data flow which may be orchestrated at the direction of one or more storage managers (not shown). At step 1, the source data agent(s) 242*a* and source media agent(s) 244*a* work together to write backup or other secondary copies of the primary data generated by the source client computing devices 202*a* into the source secondary storage device(s) 208*a*. At step 2, the backup/secondary copies are retrieved by the source media agent(s) 244*a* from secondary storage. At step 3, source media agent(s) 244*a* communicate the backup/secondary copies across a network to the destination media agent(s) 244*b* in destination subsystem 203.

As shown, the data can be copied from source to destination in an incremental fashion, such that only changed blocks are transmitted, and in some cases multiple incremental backups are consolidated at the source so that only the most current changed blocks are transmitted to and applied at the destination. An example of live synchronization of virtual machines using the "incremental forever" approach is found in U.S. Patent Application No. 62/265,339 entitled "Live Synchronization and Management of Virtual Machines across Computing and Virtualization Platforms and Using Live Synchronization to Support Disaster Recovery." Moreover, a deduplicated copy can be employed to further reduce network traffic from source to destination. For instance, the system can utilize the deduplicated copy techniques described in U.S. Pat. No. 9,239,687, entitled "Systems and Methods for Retaining and Using Data Block Signatures in Data Protection Operations."

At step 4, destination media agent(s) 244*b* write the received backup/secondary copy data to the destination secondary storage device(s) 208*b*. At step 5, the synchronization is completed when the destination media agent(s) and destination data agent(s) 242*b* restore the backup/secondary copy data to the destination client computing device(s) 202*b*. The destination client computing device(s) 202*b* may be kept "warm" awaiting activation in case failure is detected at the source. This synchronization/replication process can incorporate the techniques described in U.S. patent application Ser. No. 14/721,971, entitled "Replication Using Deduplicated Secondary Copy Data."

Where the incremental backups are applied on a frequent, on-going basis, the synchronized copies can be viewed as mirror or replication copies. Moreover, by applying the incremental backups to the destination site 203 using backup or other secondary copy data, the production site 201 is not burdened with the synchronization operations. Because the destination site 203 can be maintained in a synchronized "warm" state, the downtime for switching over from the production site 201 to the destination site 203 is substantially less than with a typical restore from secondary storage. Thus, the production site 201 may flexibly and efficiently fail over, with minimal downtime and with relatively up-to-date data, to a destination site 203, such as a cloud-based failover site. The destination site 203 can later be reverse synchronized back to the production site 201, such as after repairs have been implemented or after the failure has passed.

Integrating with the Cloud Using File System Protocols

Figure 2B:
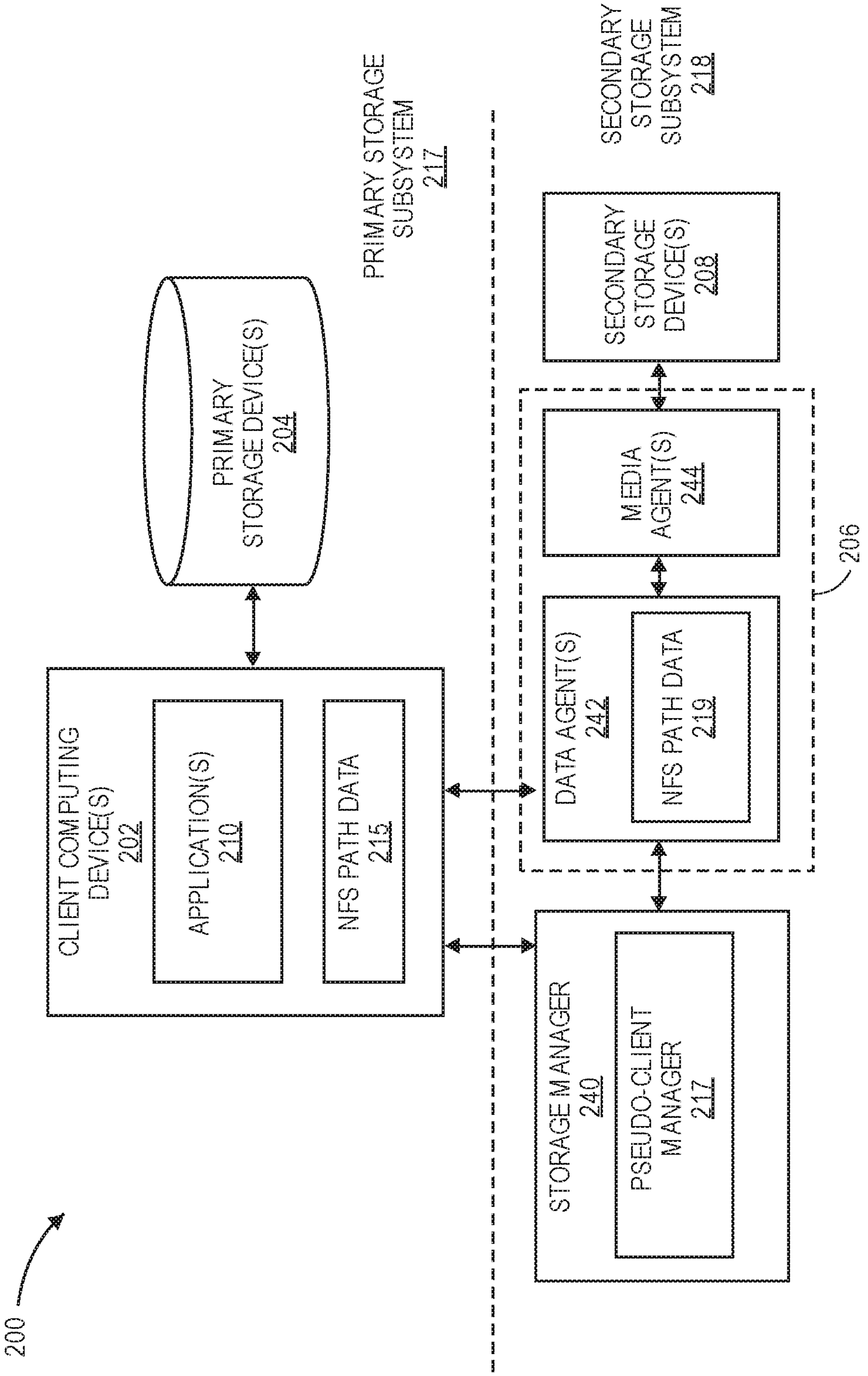
FIG. 2B illustrates an information management system architecture incorporating use of a network file system (NFS) protocol for communicating between the primary and secondary storage subsystems.

Given the ubiquity of cloud computing, it can be increasingly useful to provide data protection and other information management services in a scalable, transparent, and highly plug-able fashion. FIG. 2B illustrates an information management system 200 having an architecture that provides such advantages, and incorporates use of a standard file system protocol between primary and secondary storage subsystems 217, 218. As shown, the use of the network file system (NFS) protocol (or any another appropriate file system protocol such as that of the Common Internet File System (CIFS)) allows data agent 242 to be moved from the primary storage subsystem 217 to the secondary storage subsystem 218. For instance, as indicated by the dashed box 206 around data agent 242 and media agent 244, data agent 242 can co-reside with media agent 244 on the same server (e.g., a secondary storage computing device such as component 106), or in some other location in secondary storage subsystem 218.

Where NFS is used, for example, secondary storage subsystem 218 allocates an NFS network path to the client computing device 202 or to one or more target applications 210 running on client computing device 202. During a backup or other secondary copy operation, the client computing device 202 mounts the designated NFS path and writes data to that NFS path. The NFS path may be obtained from NFS path data 215 stored locally at the client computing device 202, and which may be a copy of or otherwise derived from NFS path data 219 stored in the secondary storage subsystem 218.

Write requests issued by client computing device(s) 202 are received by data agent 242 in secondary storage subsystem 218, which translates the requests and works in conjunction with media agent 244 to process and write data to a secondary storage device(s) 208, thereby creating a backup or other secondary copy. Storage manager 240 can include a pseudo-client manager 217, which coordinates the process by, among other things, communicating information relating to client computing device 202 and application 210 (e.g., application type, client computing device identifier, etc.) to data agent 242, obtaining appropriate NFS path data from the data agent 242 (e.g., NFS path information), and delivering such data to client computing device 202.

Conversely, during a restore or recovery operation client computing device 202 reads from the designated NFS network path, and the read request is translated by data agent 242. The data agent 242 then works with media agent 244 to retrieve, re-process (e.g., re-hydrate, decompress, decrypt), and forward the requested data to client computing device 202 using NFS.

By moving specialized software associated with system 200 such as data agent 242 off the client computing devices 202, the illustrative architecture effectively decouples the client computing devices 202 from the installed components of system 200, improving both scalability and plug-ability of system 200. Indeed, the secondary storage subsystem 218 in such environments can be treated simply as a read/write NFS target for primary storage subsystem 217, without the need for information management software to be installed on client computing devices 202. As one example, an enterprise implementing a cloud production computing environment can add VM client computing devices 202 without installing and configuring specialized information management software on these VMs. Rather, backups and restores are achieved transparently, where the new VMs simply write to and read from the designated NFS path. An example of integrating with the cloud using file system protocols or so-called "infinite backup" using NFS share is found in U.S. Patent Application No. 62/294,920, entitled "Data Protection Operations Based on Network Path Information." Examples of improved data restoration scenarios based on network-path information, including using stored backups effectively as primary data sources, may be found in U.S. Patent Application No. 62/297,057, entitled "Data Restoration Operations Based on Network Path Information."

Highly Scalable Managed Data Pool Architecture

Figure 2C:
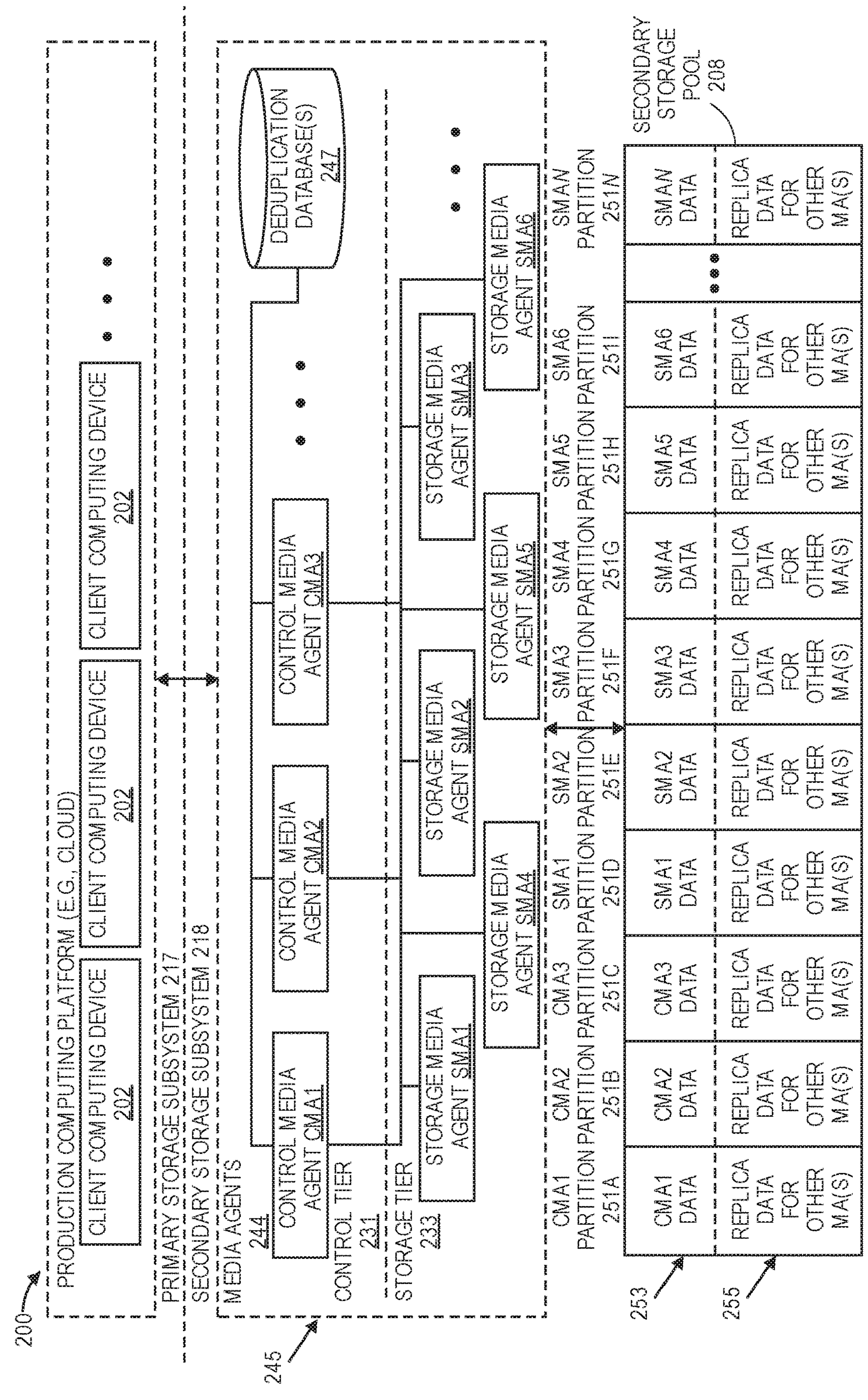
FIG. 2C is a block diagram of an example of a highly scalable managed data pool architecture.

Enterprises are seeing explosive data growth in recent years, often from various applications running in geographically distributed locations. FIG. 2C shows a block diagram of an example of a highly scalable, managed data pool architecture useful in accommodating such data growth. The illustrated system 200, which may be referred to as a "web-scale" architecture according to certain embodiments, can be readily incorporated into both open compute/storage and common-cloud architectures.

The illustrated system 200 includes a grid 245 of media agents 244 logically organized into a control tier 231 and a secondary or storage tier 233. Media agents assigned to the storage tier 233 can be configured to manage a secondary storage pool 208 as a deduplication store, and be configured to receive client write and read requests from the primary storage subsystem 217, and direct those requests to the secondary tier 233 for servicing. For instance, media agents CMA1-CMA3 in the control tier 231 maintain and consult one or more deduplication databases 247, which can include deduplication information (e.g., data block hashes, data block links, file containers for deduplicated files, etc.) sufficient to read deduplicated files from secondary storage pool 208 and write deduplicated files to secondary storage pool 208. For instance, system 200 can incorporate any of the deduplication systems and methods shown and described in U.S. Pat. No. 9,020,900, entitled "Distributed Deduplicated Storage System," and U.S. Pat. Pub. No. 2014/0201170, entitled "High Availability Distributed Deduplicated Storage System."

Media agents SMA1-SMA6 assigned to the secondary tier 233 receive write and read requests from media agents CMA1-CMA3 in control tier 231, and access secondary storage pool 208 to service those requests. Media agents CMA1-CMA3 in control tier 231 can also communicate with secondary storage pool 208, and may execute read and write requests themselves (e.g., in response to requests from other control media agents CMA1-CMA3) in addition to issuing requests to media agents in secondary tier 233. Moreover, while shown as separate from the secondary storage pool 208, deduplication database(s) 247 can in some cases reside in storage devices in secondary storage pool 208.

As shown, each of the media agents 244 (e.g., CMA1-CMA3, SMA1-SMA6, etc.) in grid 245 can be allocated a corresponding dedicated partition 251A-251I, respectively, in secondary storage pool 208. Each partition 251 can include a first portion 253 containing data associated with (e.g., stored by) media agent 244 corresponding to the respective partition 251. System 200 can also implement a desired level of replication, thereby providing redundancy in the event of a failure of a media agent 244 in grid 245. Along these lines, each partition 251 can further include a second portion 255 storing one or more replication copies of the data associated with one or more other media agents 244 in the grid.

System 200 can also be configured to allow for seamless addition of media agents 244 to grid 245 via automatic configuration. As one illustrative example, a storage manager (not shown) or other appropriate component may determine that it is appropriate to add an additional node to control tier 231, and perform some or all of the following: (i) assess the capabilities of a newly added or otherwise available computing device as satisfying a minimum criteria to be configured as or hosting a media agent in control tier 231; (ii) confirm that a sufficient amount of the appropriate type of storage exists to support an additional node in control tier 231 (e.g., enough disk drive capacity exists in storage pool 208 to support an additional deduplication database 247); (iii) install appropriate media agent software on the computing device and configure the computing device according to a pre-determined template; (iv) establish a partition 251 in the storage pool 208 dedicated to the newly established media agent 244; and (v) build any appropriate data structures (e.g., an instance of deduplication database 247). An example of highly scalable managed data pool architecture or so-called web-scale architecture for storage and data management is found in U.S. Patent Application No. 62/273,286 entitled "Redundant and Robust Distributed Deduplication Data Storage System."

The embodiments and components thereof disclosed in FIGS. 2A, 2B, and 2C, as well as those in FIGS. 1A-1H, may be implemented in any combination and permutation to satisfy data storage management and information management needs at one or more locations and/or data centers.

Hypervisor-Independent Block-Level Live Browse for Access to Backed Up Virtual Machine (VM) Data and Hypervisor-Free File-Level Recovery (Block-Level Pseudo-Mount)

Block-level live browse enables users to browse and recover files without requiring metadata collection during backup. Block-level browse is supported for streaming backups for all hypervisors (hypervisors at the source, but not required on browse and restore), and for Commvault IntelliSnap® backups for VMware. Block-level browse is ALSO supported from auxiliary copies and backup copies. Some hypervisors still provide the option to collect metadata during backups to enable file browsing and recovery, but the metadata is not needed or used according to the illustrative embodiments. Block-level browse according to the illustrative embodiments uses a block-level driver (pseudo-disk driver) to mount a pseudo-disk on the media agent host computing device being used for browse and restore operations. The pseudo-disk is used to get file system information, enabling browse and restore operations to read directly from stored virtual machine (VM) backup data, without relying on content indexing. Illustratively, to stage extents in the pseudo-disk for block-level live browse operations, the block-level browse feature uses a least recently used (LRU)-based pseudo-mount cache ("recall store") in the "job results" directory of the media agent host (or some other private location not readily visible to end users in order to prevent users' directly accessing the VM backup data). In an illustrative embodiment, the pseudo-mount cache is pruned periodically to free up extents, and requires up to 20 GB of free space for restore jobs of any size. Additional details can be found in U.S. Patent Applications Nos. 62/305,919, entitled "Using Hypervisor-Independent Block-Level Live Browse to Directly Access Backed Up Virtual Machine (VM) Data and Perform Hypervisor-Free File-Level Recovery (Block-Level Pseudo-Mount)" and Ser. No. 15/436,563, entitled "Hypervisor-Independent Block-Level Live Browse for Access to Backed Up Virtual Machine (VM) Data and Hypervisor-Free File-Level Recovery (Block-Level Pseudo-Mount)—both of which are hereby incorporated by reference herein.

Figure 3:
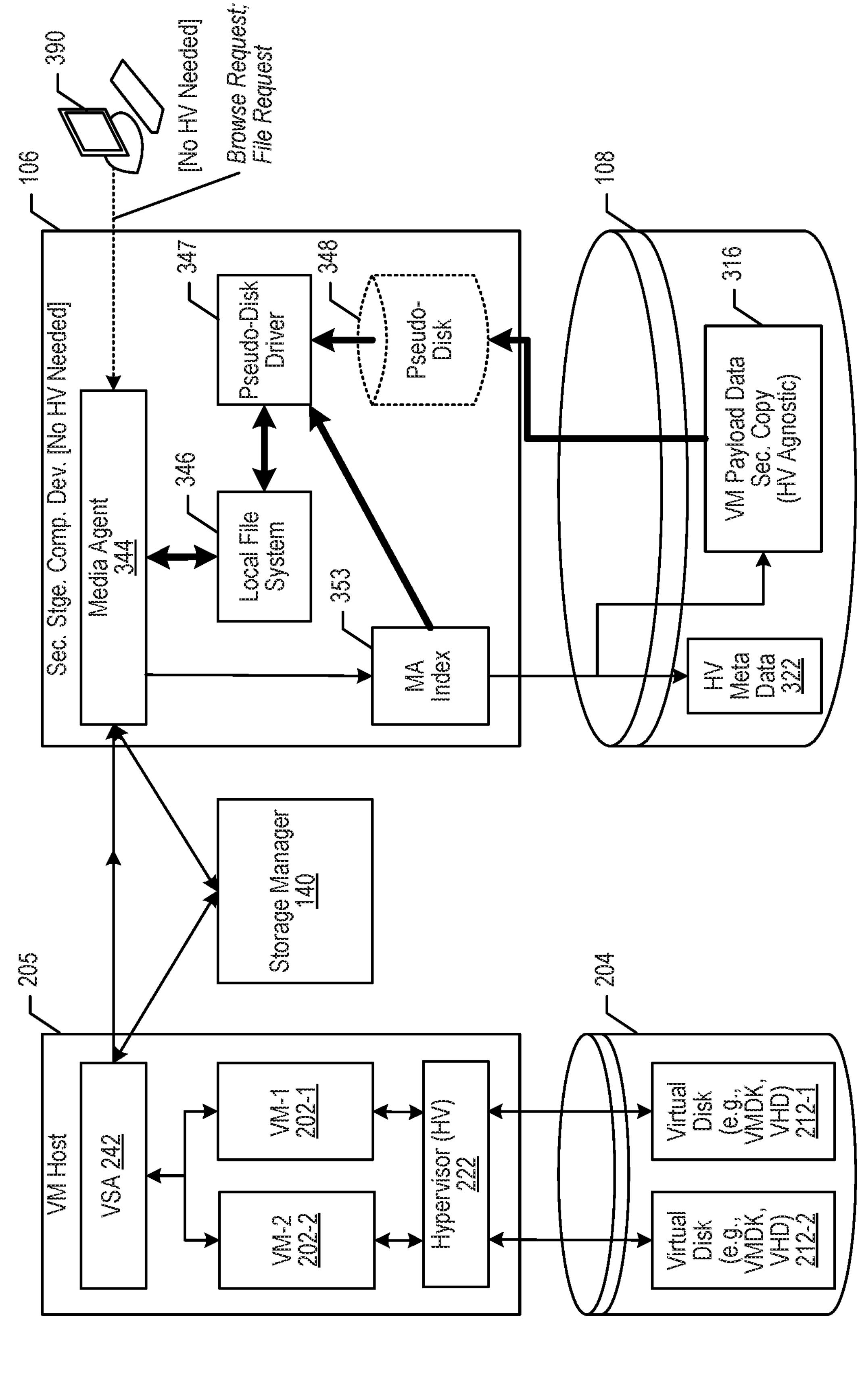
FIG. 3 is a block diagram illustrating some salient portions of a system 300 for hypervisor-independent block-level live browse and hypervisor-free file-level recovery (block-level pseudo-mount).

FIG. 3 is a block diagram illustrating some salient portions of a system 300 for hypervisor-independent block-level live browse and hypervisor-free file-level recovery (block-level pseudo-mount). As depicted, system 300 comprises: secondary storage computing device 106, comprising media agent 344, local file system 346, pseudo-disk driver 347, pseudo-disk 348, and media agent index 353; secondary storage device 108, comprising backed up VM payload data 316 and backed up hypervisor metadata 322; storage manager 140; primary storage device 204 comprising VM virtual disks 212 (e.g., 212-1, 212-2); and VM host computing device 205, hosting VMs 202 (e.g., 202-1, 202-2), hypervisor 222, and virtual server data agent (VSA) 242. Also depicted is a console 390 for user access to system 300, which need not be part of system 300. The depicted components are logically communicatively coupled as shown by the arrows. Any suitable physical infrastructure for electronic communications supports the depicted communication pathways, such as described in regard to communication pathways 114. The plain (thinner) arrows represent communicative pathways involved in backup operations. The bold (thicker) arrows represent communicative pathways involved in browse and restore operations according to the illustrative embodiment.

Secondary storage computing device 106, secondary storage device 108, storage manager 140, primary storage device 204, VM host computing device 205, VMs 202 (e.g., 202-1, 202-2), and virtual server data agent (VSA) 242 are well known in the art and are described in more detail elsewhere herein. Secondary storage computing device 106 hosts media agent 344 and therefore may be referred to herein as the "MA host" or "MA host computing device."

VM virtual disks 212 (e.g., 212-1, 212-2) are well known in the art. Each VM virtual disk 212 is associated with a corresponding virtual machine (VM) 202 and comprises metadata and payload data for the VM. The metadata is provided by the hypervisor 222. The VM virtual disk is formatted according to the hypervisor underlying the VM, e.g., VMDK, VHD, etc. VM virtual disk formats are well known in the art.

Hypervisor 222 is well known in the art. Hypervisor 222 supports and operates the depicted VMs 202, and also provides the metadata in the VM virtual disk 212 corresponding to the respective VM 202.

Backed up VM payload data 316 represents a secondary copy (one of any number of secondary copies) of VM payload data, as distinguished from VM metadata. According to an illustrative block-level backup operation (performed by VSA 242 in conjunction with media agent 344 as directed by storage manager 140), a VM virtual disk 212 for a given VM 202 is backed up such that the VM's payload data is stored to secondary copy 316, whereas the hypervisor-specific metadata found in the VM virtual disk 212 is backed up to HV metadata 322. Separating the VM's payload data from HV-specific metadata advantageously enables access to the backed up VM payload data 316 without needing a hypervisor at all, on any destination, or by using another hypervisor that is different from the source hypervisor 222. The files that form the VM payload data in a VM virtual disk 212 are backed up at the block level (not file-level), so that a given file which is distributed across non-contiguous data blocks in the source VM virtual disk, will be likewise non-contiguous in the secondary copy 316. The payload data is said to be backed up as a block device. The block-level backup makes no effort to bring together and organize the data blocks into a file-by-file backup format. The backed up data blocks are organized into groupings of data blocks called "extents," which are indexed and tracked by the illustrative media agent index 353. The extents 456 as well as the "table of contents" of the backed up VM payload data (VM file system catalogue 416) are depicted and discussed in more detail in FIGS. 4A and 4B.

Backed up hypervisor metadata 322 is backed up from the hypervisor-supplied metadata found in the respective source VM virtual disk 212. This metadata includes descriptions of how the payload data is organized in the VM virtual disk 212 according to how hypervisor 222 organized it based on configuration parameters and its own internal operational characteristics. Therefore, in the prior art, a corresponding (same or compatible) hypervisor could interpret the backed up hypervisor metadata 322 in order to browse or restore the backed up VM payload data. However, installing and using a hypervisor in order to browse and restore backed up data is inconvenient, expensive, and not feasible in some cases. In other prior art solutions, a compatible file system could be invoked at the destination to interpret a file-level backup copy of the VM virtual disk in order to discover the files therein.

In contrast to these more complex prior art approaches, the illustrative embodiment has a streamlined configuration that requires no hypervisor, no proxy VM host, and no data agent at the browse/restore site. Moreover, the illustrative embodiment enables a user to single out a particular file (backed up block-level from the VM) for browse and restore without having to access or restore any other files backed up from the VM.

Media agent 344 is analogous to media agent 144 and further comprises additional functionality for operating in system 300, such as having a communicative interface with the enumerator module 446 (see FIGS. 4A, 4B) in the local file system 346. Media agent 344 also receives and responds to requests for browsing VMs and VM files from outside entities, such as web consoles 390, storage manager(s), and/or client computing devices. By interoperating with enumerator 446 and with a co-located data agent 142 (see FIG. 4B), media agent 344 is able to respond to both browse requests and individual file requests without the need to invoke a hypervisor to access a VM backup copy, such as secondary copy 316.

Local file system 346 is a file system that natively operates on secondary storage computing device (MA host) 106. Local file system 346 is distinguishable from the file system that operated within a VM 202 on the VM host 205, and which VM file system comprises files whose backed up copies (e.g., in secondary copy 316) can be browsed or individually restored according to the illustrative embodiment. Local file system 346 serves the programs that run on secondary storage computing device 106, such as media agent 344. As explained in more detail in regard to FIGS. 4A and 4B, local file system 346 also comprises an interpreter/enumerator function, which is illustratively embodied by enumerator 446.

Pseudo-disk driver 347 is a computer program that is implemented as executable software and/or firmware, which is installed in the operating system of and executes on secondary storage computing device (MA host) 106. Illustratively, pseudo-disk driver 347 is delivered and installed on secondary storage computing device 106 along with media agent 344 and enumerator 446. Thus, in some embodiments, media agent 344, pseudo-disk driver 347, and enumerator 446 (and sometimes also data agent 142) are considered together as a functional package to be delivered to and installed on a secondary storage computing device 106 that is in communication with a secondary storage device (e.g., 108) that stores VM backup data, and the functional package is needed to implement the hypervisor-free browse and restore features described herein. However, these functional modules are depicted and described separately herein in order to enhance the reader's understanding of the present disclosure.

Illustratively, pseudo-disk driver 347 comprises an I/O buffer (not shown) that receives read and write requests from local file system 346, in some cases acting as an intermediary to media agent 344. Pseudo-disk driver 347 presents to local file system 346 an illustrative pseudo-disk 348, presented as a physical data storage device (not as a virtual disk associated with a VM). From the perspective of local file system 346, pseudo-disk 348 is a physical block device that stores data, and thus read requests can be and are addressed thereto, which are intercepted and processed by pseudo-disk driver 347. For purposes of browse and file-restore requests in the context of the present embodiments, the requests will be for backed up VM payload data (e.g., stored in secondary copies 316). From the perspective of pseudo-disk driver 347, pseudo-disk 348 is a data structure configured, maintained, and used by pseudo-disk driver 347 for staging data retrieved from the physical secondary storage device 108, and for preparing read responses directed to local file system 346, some of which are in response to read requests from media agent 344. Illustratively, pseudo-disk 348 is configured to present a storage volume, which is mounted to a private location on secondary storage computing device 106. Illustratively, to stage extents in the pseudo-disk for block-level live browse operations, the block-level browse feature uses a least recently used (LRU)-based pseudo-mount cache ("recall store") in the "job results" directory of the media agent host (or some other private location not readily visible to end users in order to prevent users' directly accessing the VM backup data). In some embodiments, the staging area in pseudo-disk 348 for storing data (e.g., extents) retrieved from secondary storage device 108 is referred to as a "recall store." In an illustrative embodiment, the pseudo-mount cache (recall store) is pruned periodically to free up extents, and requires up to 20 GB of free space for restore jobs of any size. An example of a similar pseudo-disk driver is given in U.S. Pat. Pub. No. 2016/0041880 A1, entitled "Efficient Application Recovery in an Information Management System Based on a Pseudo-Storage-Device Driver", which is incorporated by reference herein.

Notably, data is retrieved from secondary copy 316 into pseudo-disk 348 without the services of a hypervisor. Accordingly, no hypervisor is needed to run on secondary storage computing device (MA host) 106, no hypervisor is accessed on another host (e.g., a VM proxy server), and no hypervisor is required at the end-user who submits VM browse requests and selects individual files from the VM backup. Thus the backup payload data (e.g., secondary copy 316) is said to be directly accessible exclusively by MA host 106.

Media agent index 353 (or "MA index 353" or "index 353") is a data structure analogous to index 153, which is maintained, populated, and used by media agent 344 in order to properly operate in system 300. For example, index 353 stores data-block-to-extent indexing information that indicates which extent (grouping of data blocks) comprises which data blocks backed up from VM virtual disk 212, and in some embodiments also stores location information indicating where the given extent resides on the secondary storage device 108 ("on the media"). The information about the extents is used not only for identifying which extent comprises a certain data block associated with a sought-after file (in a restore operation), but also for locating the identified extent on the media (storage 108) for retrieval. In some alternative embodiments, an extent's ID is used to calculate where it resides on the media without further consulting index 353. Media agent index 353 is accessible to pseudo-disk driver 347. In some embodiments, media agent index 353 also comprises information about the VM file system catalogue 416 backed up from the VM virtual disk, which also resides on the media (storage 108). In other embodiments, local file system 346 (e.g., using enumerator 446) automatically accesses the VM file system catalogue at block 0 of the secondary copy 316 without first consulting index 353.

Web console 390 is a computing device that is configured to provide web access to certain aspects of system 300. For example, web console 390 may serve a user interface, which is directed at end-users wishing to browse a backed up VM or to retrieve a specific file backed up from the VM.

System 300 may further comprise other components not depicted in the present figure, without limitation, such as additional VM hosts 205, any number of operational VMs 202, any number of VM virtual disks 212 in primary storage (e.g., 204), secondary storage devices 108, secondary storage computing devices 106, client computing devices 102, data agents 142 and 242, and web-based user access via consoles 390.

Figure 4A:
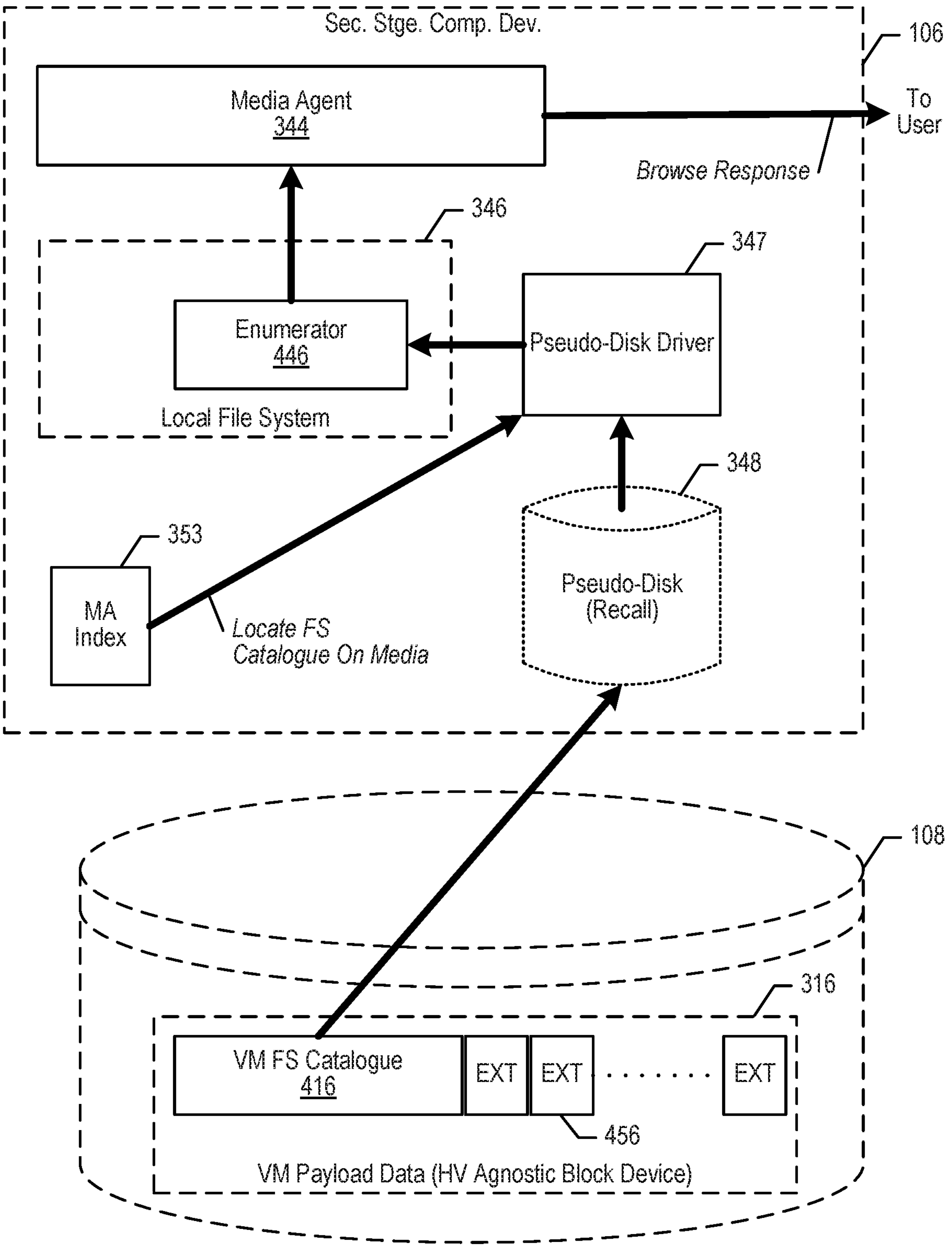
FIG. 4A is a block diagram depicting some salient details of system 300 in regard to live browsing of backed up VM payload data.

FIG. 4A is a block diagram depicting some salient details of system 300 in regard to live browsing of backed up VM payload data. FIG. 4A depicts: secondary storage computing device 106 comprising media agent 344, local file system 346 comprising enumerator 446, pseudo-disk driver 347, pseudo-disk 348, and MA index 353; and secondary storage device 108 comprising a secondary copy of VM payload data 316, which comprises a VM file system catalogue 416 and any number of data extents 456.

VM file system catalogue 416 is a set of data blocks, typically located at the beginning of secondary copy 316, that describes the file system of the backed up VM, including hierarchies, file names, etc. The VM file system catalogue 416 acts as a table of contents for the files and directories of the VM's file system. VM file system catalogue 416 also comprises file-to-data-block associations, so that a given file can be reconstructed from its constituent data blocks, which may be non-contiguously located within secondary copy 316. VM file system catalogue 416 is organized illustratively according to a GUID Partition Table (GPT) format, created when the secondary copy 316 is generated. In alternative embodiments, VM file system catalogue 416 is organized in another format such as master boot record (MBR).

Enumerator 446 is a functional component operating within local file system 346, and may be implemented as executable software and/or firmware, which executes on the underlying MA host 106. When it executes according to the illustrative embodiment, enumerator 446 operates as described in more detail in FIGS. 5-7, e.g., obtaining the VM file system catalogue 416 from backup copy 316, interpreting and enumerating it, and transmitting the resulting enumeration/interpretation to media agent 344 for a browse response. In a restore operation, enumerator 446 illustratively assembles constituent data blocks into a complete backup file, which is then restored by media agent 344 in conjunction with data agent 142 into a native (primary data) format suitable for a restore response. Enumerator 446 is configured to determine and recognize the format of the VM file system catalogue 416, e.g., GPT, MBR, so that it may properly enumerate it. Because the enumerator operates within the local file system of the MA host, the local file system and the MA host are said to perform the operations performed by enumerator 446.

Data extents 456 (or "extents 456") are groupings of payload data blocks that have been backed up from VM virtual disk 212 into backup copy 316. Each extent 456 comprises data blocks of payload data. Extents 456 are distinguishable in that in the course of the backup operation, they are individually indexed by media agent 344 storing the index information to index 353, so that each extent 456 can be found and randomly accessed on the media (storage 108). The data blocks in each extent 456 also are tracked so that they may be retrieved as needed in a file restore operation. Illustratively, a data block is sized at 512 bytes and an extent is 4 MB, i.e., 8K data blocks in each extent 456. Any other suitable data block and extent size can be chosen for other embodiments.

Any number of secondary copies of VM payload data 316, comprising a respective VM file system catalogue 416, can be accessed by enumerator 446 according to the illustrative embodiment thanks to the services of pseudo-disk driver 347 and its associated pseudo-disk 348.

The bold arrows in the present figure depict logical operations that collectively enable the illustrative embodiment to generate a response to a user wanting to browse a backed up VM. For example, VM file system catalogue 416 is retrieved from secondary copy 316 into the recall store (not shown) of pseudo-disk 348. Enumerator 446 accesses and interprets the retrieved VM file system catalogue in the recall store and provides an enumeration (e.g., list of files, directories, folders, hierarchies, file metadata, etc.) to media agent 344, which then generates a suitable response to the VM browse request received from the user. More details are given in subsequent figures.

Figure 4B:
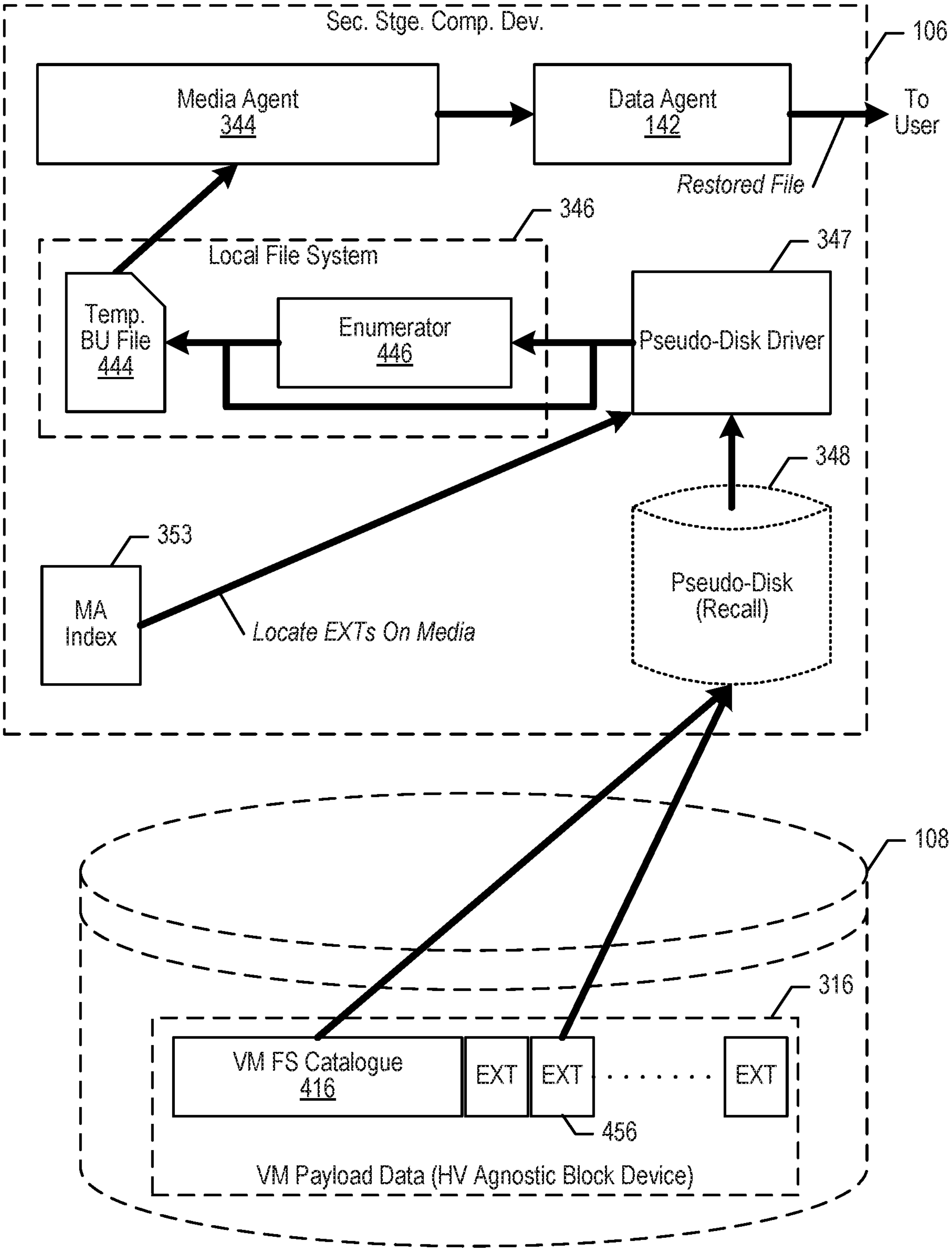
FIG. 4B is a block diagram depicting some salient details of system 300 in regard to hypervisor-free file-level restore of backed up VM payload data.

FIG. 4B is a block diagram depicting some salient details of system 300 in regard to hypervisor-free file-level restore of backed up VM payload data (block-level pseudo-mount). In addition to the elements depicted in FIG. 4A, FIG. 4B also depicts: data agent 142 co-resident with media agent 344 on MA host 106, and a temporary file 444 in (or associated with) local file system 346.

Data agent 142 is illustratively a file system data agent as described in more detail elsewhere herein. The present data agent 142 co-resides with media agent 344 on the MA host 106, rather than residing on a client computing device 102. The advantage of this arrangement is that the present data agent 142 in conjunction with media agent 344 (as directed by storage manager 140) can restore a secondary copy of a file into a native (primary data format) locally, on the MA host 106. As a result, the restored file can be transmitted to any destination in response to a file restore request—meaning that the destination does not require its own local data agent to complete the restore operation.

Temporary backup file 444 is a secondary copy of an individual file backed up from VM virtual disk 212. Temporary backup file 444 is assembled by local file system 346 (e.g., using enumerator 446) in the course of responding to a file restore request from a user.

The bold arrows in the present figure depict logical operations that collectively enable the illustrative embodiment to generate a response to a user seeking an individual file from a backed up VM—which requires the file to be restored from secondary copy 316. For example, VM file system catalogue 416 is retrieved from secondary copy 316 into the recall store of pseudo-disk 348. The location of the VM file system catalogue 416 on the media (storage device 108) is obtained by pseudo-disk driver 347 from index 353 in some embodiments, or in alternative embodiments by directly accessing block 0 (zero) of secondary copy 316, where the catalogue is expected to be found. Enumerator 446 accesses and interprets the retrieved VM file system catalogue in the recall store to identify the data blocks that make up the sought-after file (file-associated data blocks). The extents comprising those file-associated data blocks and their respective locations on the media are obtained by pseudo-disk driver 347 from index 353 and those extents are retrieved, by pseudo-disk driver 347, into the recall store of pseudo-disk 348. Pseudo-disk driver 347 then extracts and serves the file-associated data blocks to enumerator 446 to assemble temporary backup file 444. Once file 444 has been assembled, it is served to media agent 344 as a secondary copy of the sought-after file, so that it can be restored to native format and transmitted to the requesting user. More details are given in subsequent figures.

Figure 5:
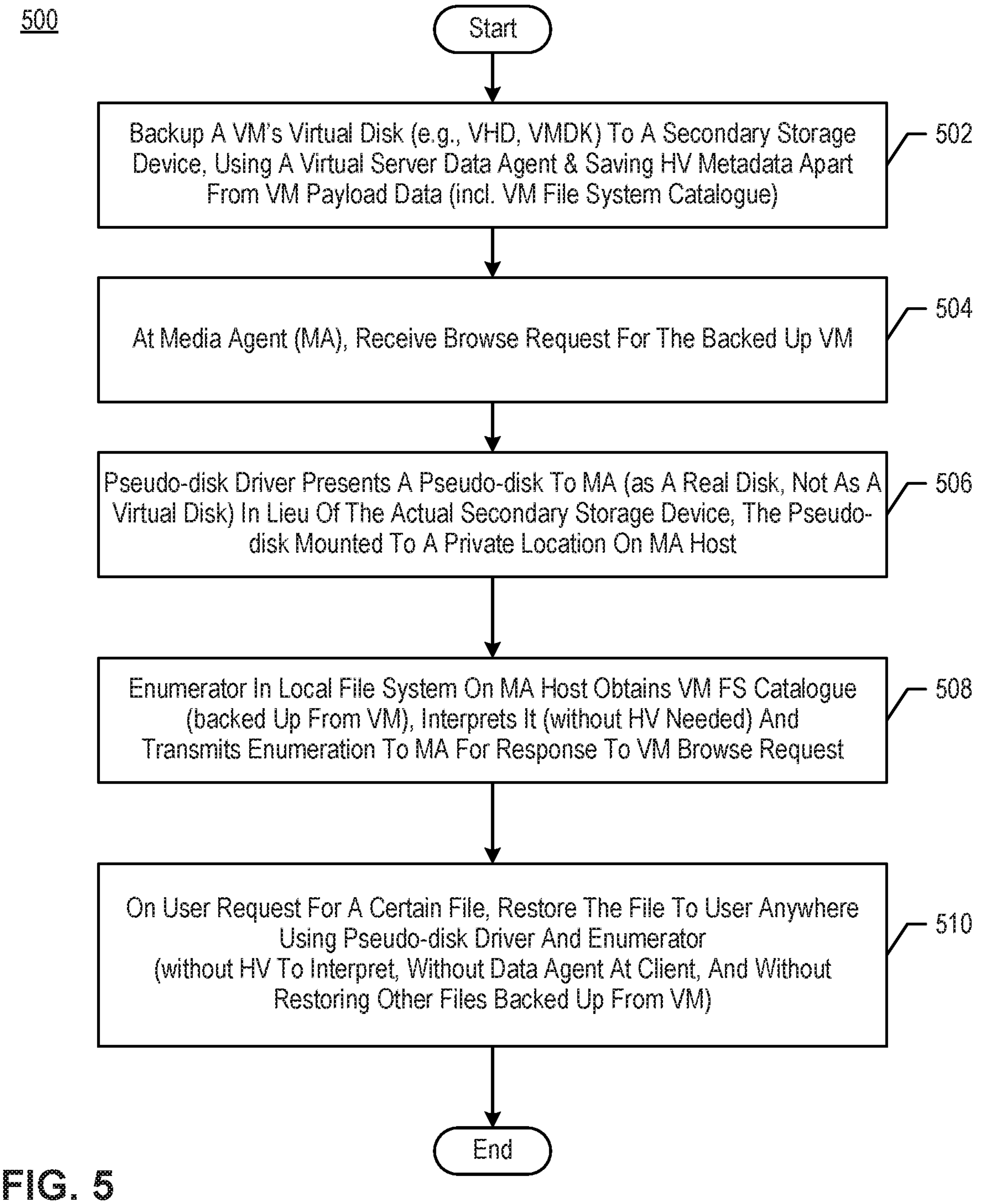
FIG. 5 depicts some salient operations of a method 500.

FIG. 5 depicts some salient operations of a method 500. In general, method 500 is performed by MA host 106, as described in more detail below.

At block 502, a VM's virtual disk 212 (e.g., VHD, VMDK) is backed up to a secondary storage device 108, using a virtual server data agent 242 and saving hypervisor (HV) metadata 322 apart from VM payload data 316, the latter including the source VM's file system catalogue 416. Illustratively, the backup operation is performed by media agent 344 and virtual server data agent 242 as directed by storage manager 140. The entire VM virtual disk 212 is backed up at the block level. Illustratively, data agent 242 is capable of distinguishing VM payload data from HV-specific metadata in the in the VM virtual disk 212, and on creating the secondary copy, media agent 344 saves HV metadata to a location and data structure 322 in secondary storage that is apart from the secondary copy of the VM payload data 316. Notably, this operation renders the secondary copy of the VM payload data hypervisor-agnostic, since all the HV-specific metadata has been segregated to copy element 322. This makes possible the hypervisor-free browse and restore operations from the HV-agnostic secondary copy 316 that are provided by the illustrative embodiment.

At block 504, media agent (MA) 344 receives a browse request for the backed up VM, illustratively identified as VM 202-1. This triggers media agent 344 to search index 353 for a secondary copy of the identified VM, e.g., finding secondary copy 316.

At block 506, pseudo-disk driver 347 presents a pseudo-disk 348 to local file system 346 as a real disk, not as a virtual disk, as the repository of secondary copy 316 (in lieu of the actual secondary storage device 108). Since pseudo-disk 348 is presented as a physical disk and not as a VM virtual disk, no hvpervisor is invoked or required to access pseudo-disk 348. Pseudo-disk 348 is mounted to a private location on MA host 106. At this point, local file system 346 tries to access pseudo-disk 348 to find out its contents, and specifically, to discover the file system catalogue of the sought-after backed up VM.

At block 508, enumerator 446 in local file system 346 on MA host 106 obtains the VM file system catalogue (backed up from VM), interprets it (without needing a hypervisor to do so), and transmits the resulting enumeration to a user in response to the browse request received at block 504. More details are given in a subsequent figure.

At block 510, when a user selects a certain file from the above browse response, the file is restored to the user anywhere using, at least in part, pseudo-disk driver 347 and enumerator 446. Notably, this is performed without a hypervisor to find and interpret data in the secondary copy 316, without a data agent at the client computing device, and without having to restore any other files that are in the VM secondary copy 316. Thus, only one individual file (or any number of individual files) can be singled out, found, and restored hypervisor-free on demand from a VM backup. Restoring an entire disk or file system for the sake of finding the one singled out file is not necessary here. More details are given in a subsequent figure.

Figure 6:
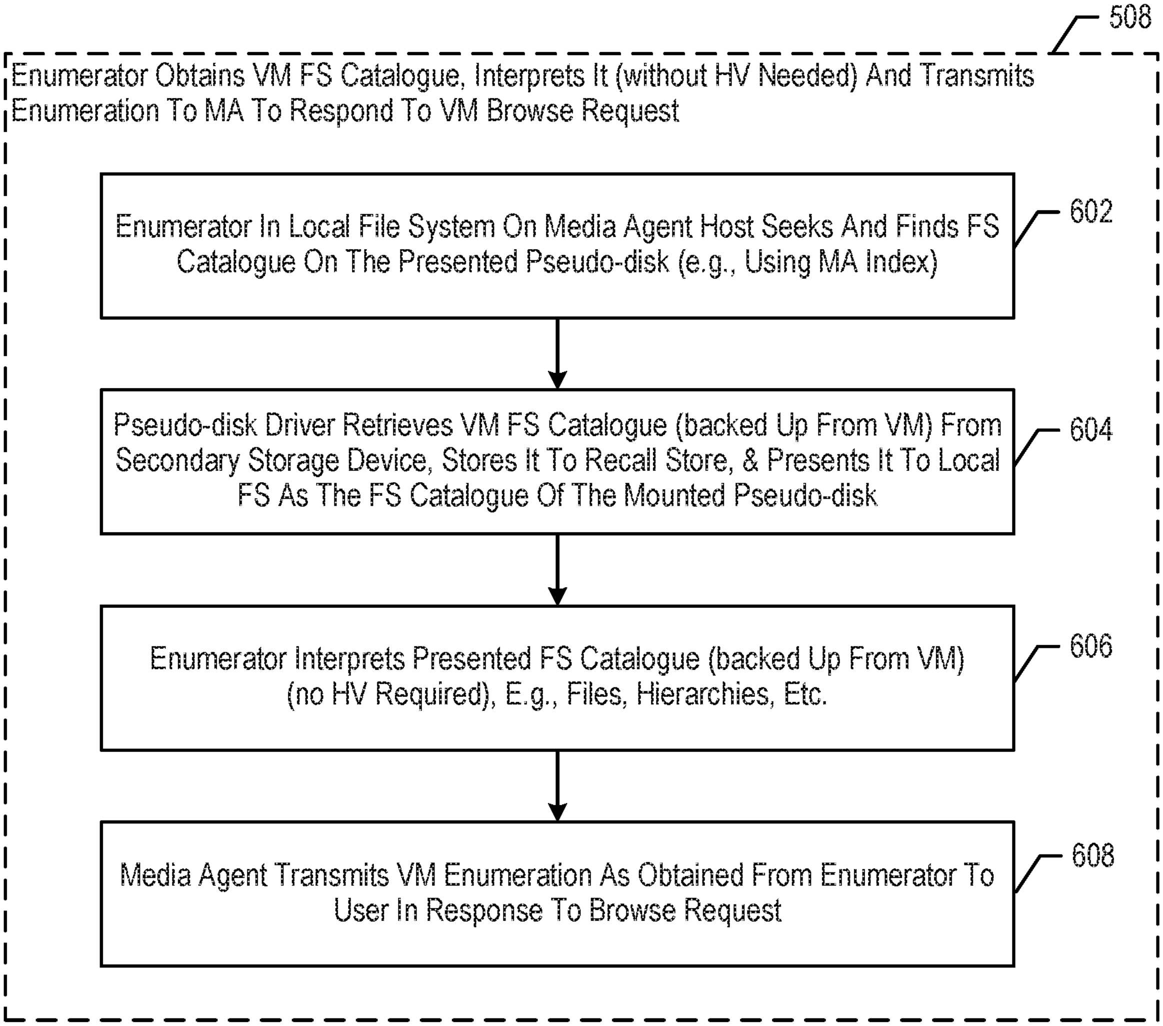
FIG. 6 depicts some salient details of block 508 in method 500.

FIG. 6 depicts some salient details of block 508 in method 500. In general, block 508 is concerned with enumerator 446 obtaining VM file system catalogue 416 from the media (storage 108), interpreting the catalogue (without a hypervisor), and transmitting the catalogue's enumeration to media agent 344 to respond to a VM browse request.

At block 602, enumerator 446 in local file system 346 on media agent host 106 finds the VM file system catalogue 416 on the presented pseudo-disk 348, e.g., by issuing a read request to pseudo-disk 348. Pseudo-disk driver 347 illustratively intercepts the read request and retrieves the location of VM file system catalogue 416 from MA index 353 (in other embodiments it accesses block 0 (zero) of secondary copy 316 without consulting index 353). In alternative embodiments, local file system 346 issues the read request to pseudo-disk 348 without using enumerator 446.

At block 604, pseudo-disk driver 347 retrieves VM file system catalogue 416 (backed up from VM virtual disk 212) from secondary copy 316 in secondary storage device 108, stores it to the recall store in pseudo-disk 348, and presents it to local file system 346 as the file system catalogue of the mounted pseudo-disk 348. As noted, the local file system 346 is not aware that pseudo-disk driver 347 is presenting a pseudo-disk 348, and instead treats and interacts with pseudo-disk 348 as though it were a real physical storage device.

At block 606, enumerator 446 interprets the presented file system catalogue (VM file system catalogue 416 backed up from VM pseudo-disk 212) without needing the services of a hypervisor (HV) to perform the interpretation. In the illustrative embodiment, the local file system 346 is compatible with the VM's file system, so that the local file system can readily identify and interpret the retrieved VM file system catalogue. In other embodiments, local file system 346 employs application programming interface(s) (API(s)) or other well-known techniques to interpret the retrieved VM file system catalogue. Because the VM file system catalogue 416 was saved apart from hypervisor-specific metadata, it can now be interpreted without the services of a hypervisor, effectively by being directly accessed by the local file system. Consequently, enumerator 446 reads in the data in VM file system catalogue 416 (from pseudo-disk 348) and determines file system hierarchies (e.g., folders, directories), file names, and other information about the file system and its constituent files available from the VM file system catalogue. The result of the present interpretation operation is referred to herein as an "enumeration" for convenience.

At block 608, the enumeration is transmitted to media agent 344. Media agent 344 in turn, in response to the browse request received at block 504, generates an appropriate response that comprises the enumeration of the file system catalogue (backed up from the VM virtual disk). The user now has a view of the file system of the backed up VM 202. Notably, at this point in time, none of the payload files that were backed up from the VM have been restored, and the browse request has been responded to without the need of a hypervisor or a proxy VM host to view the backed VM files. In some embodiments, the user will be presented with an opportunity (e.g., user interface) to navigate through the VM's file system and to select a particular file (see, e.g., block 510), which will then result in the selected file being restored from backup into a native format for the user to access directly.

Figure 7:
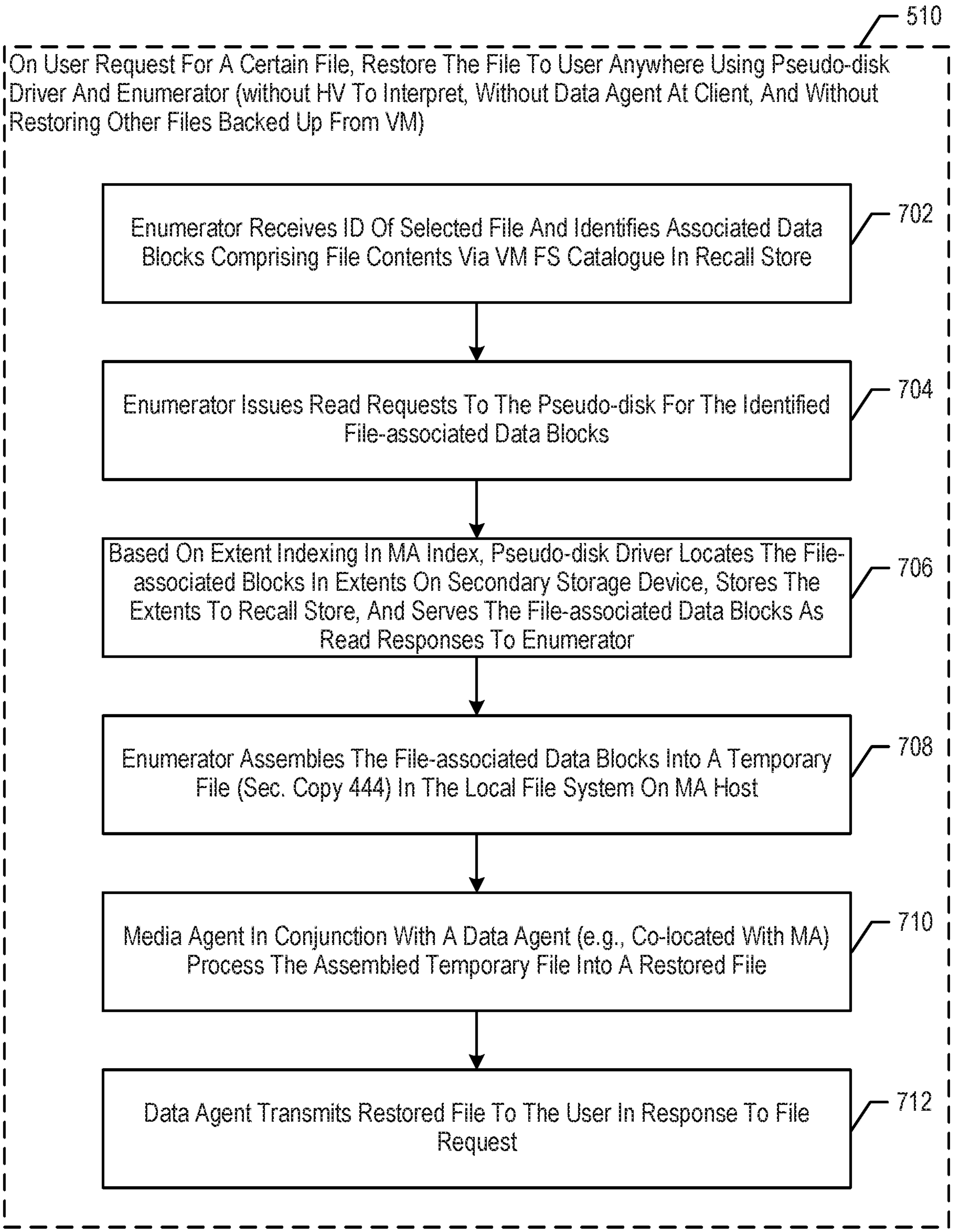
FIG. 7 depicts some salient details of block 510 in method 500.

FIG. 7 depicts some salient details of block 510 in method 500. In general, block 510 is directed to restoring a selected file to a user anywhere using pseudo-disk driver 347 and enumerator 446, and doing so without a hypervisor, without a data agent at the destination client, and without a disk-level restore operation.

At block 702, enumerator 446 receives an ID of a file selected by a user (after the browse response at block 508). Enumerator 446 identifies the associated data blocks collectively comprising the selected file's contents ("file-associated data blocks) via the VM file system catalogue in the pseudo-disk recall store. Since the backed up VM virtual disk did not consolidate data blocks according to file ID, data blocks may be non-contiguous on the secondary copy 316. Accordingly, the file system catalogue 416 provides information (e.g., an index, a linked list, etc.) identifying which data blocks are associated with the file ID.

At block 704, enumerator 446 issues read requests to pseudo-disk 348 for the identified file-associated data blocks.

At block 706, pseudo-disk 347 intercepts the data block read requests directed to pseudo-disk 348 and has to figure out where such data blocks can be found in secondary storage 108. Based on extent indexing in MA index 353, pseudo-disk driver 347 locates the file-associated blocks in one or more extents 456 stored on secondary storage device 108. Pseudo-disk driver 347 retrieves each relevant extent 456 and stores it to the recall store in pseudo-disk 348. Pseudo-disk 347 then extracts the file-associated data blocks from the retrieved extents 456 and serves the file-associated data blocks as read responses to enumerator 446.

At block 708, enumerator 446 assembles the file-associated data blocks into a temporary file 444 in (or associated with) the local file system 346 on MA host 106. Part of this operation is to properly order the data blocks into a complete secondary copy of the selected file. The secondary copy (temporary file 444) is in a secondary copy format, which is typically different from the native format of the original file, e.g., compressed, encrypted, deduplicated, etc. At this point, temporary file 444 is presented to media agent 344 as a secondary copy of the file selected by the user. Now the file needs to be restored into a usable native format for the user's consumption.

At block 710, media agent 344 in conjunction with a data agent 142 (e.g., co-located with MA 344 on MA host 106) process the assembled temporary file 444 into a restored file (not shown). In contrast to traditional prior art approaches where the restore operation involves a data agent at the user's machine (client-side data agent), the present solution configures data agent 142 on the same machine that hosts media agent 344 so that together they can execute the restore operation and transmit a fully restored file to any destination.

At block 712, after temporary file 444 has been restored to a native (primary) data format, data agent 142 (and in alternative embodiments media agent 344) transmits the restored file (not shown) to the user in response to the file request received at block 504. This approach means that the user can retrieve a file from any computing device, without requiring a hypervisor to interpret and a local data agent (at the user's computing device) to help restore a file. Instead, according to the illustrative embodiment, the user receives a restored file selected after the VM browse operation.

Figure 8:
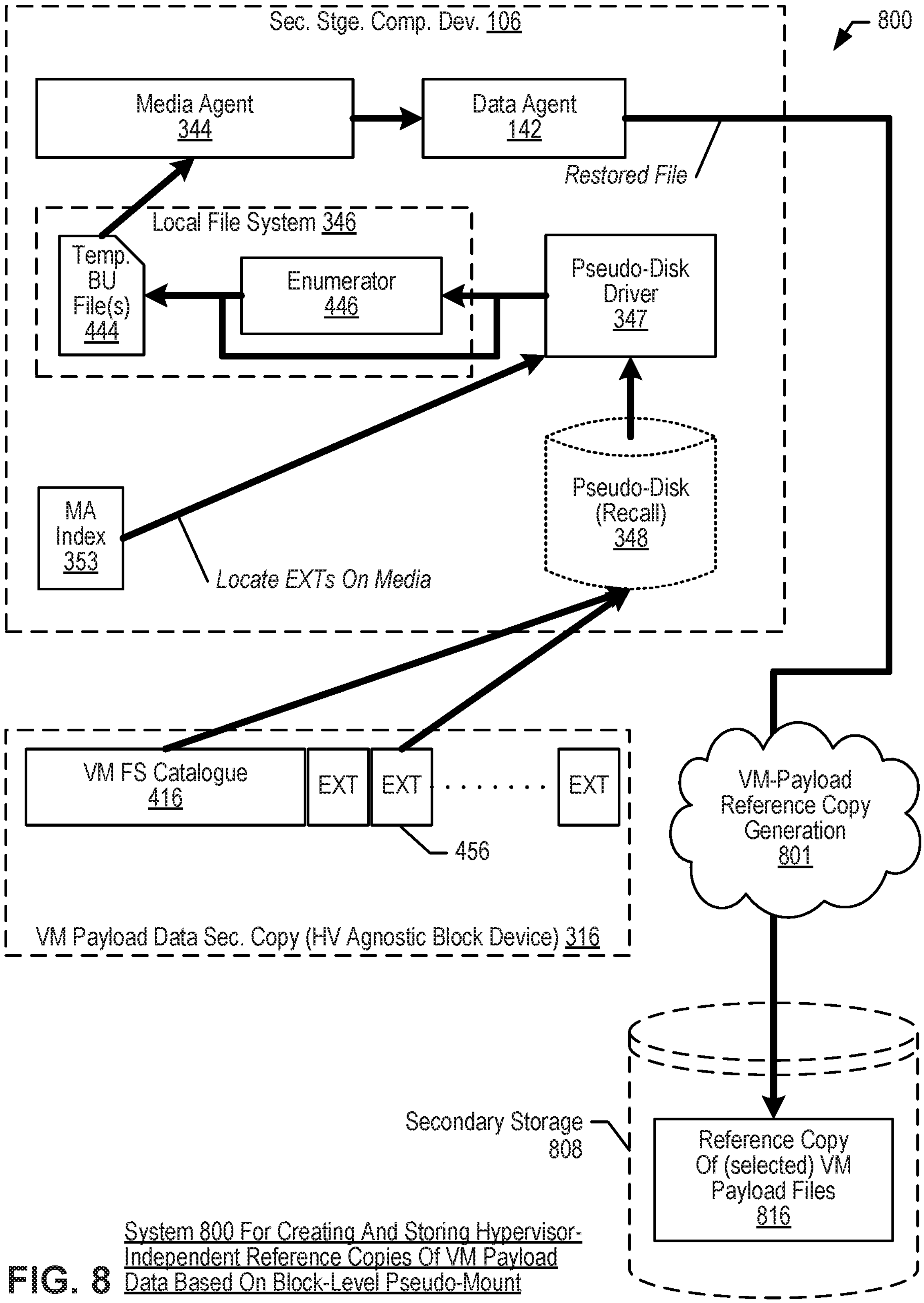
FIG. 8 is a block diagram depicting some salient portions of a system 800 for creating and storing hypervisor-independent reference copies of VM-payload data based on block-level pseudo-mount, according to an illustrative embodiment of the present invention.

Hypervisor-Independent Reference Copies of Virtual Machine Payload Data Based on Block-Level Pseudo-Mount FIG. 8 is a block diagram depicting some salient portions of a system 800 for creating and storing hypervisor-independent reference copies of VM-payload data based on block-level pseudo-mount, according to an illustrative embodiment of the present invention. This figure illustrates that the block-level pseudo-mount infrastructure is used here in part as input to a VM-payload reference copy generation sub-system (e.g., 801) for generating and storing VM-payload reference copies (e.g., 816). Sub-system 801 is discussed in more detail in a subsequent figure. According to the present illustration, a secondary copy 316, which is configured as a hypervisor-agnostic block storage device comprising VM payload data backed up from a VM virtual disk file, is the source of VM payload data for VM-payload reference copies 816, which are stored to a secondary storage device, e.g., 808.

Sub-system 801 is shown here (and in FIG. 9) as a collection of components and features of system 800 that enable the exemplary generation of reference copies comprising VM payload data—so-called "VM-payload reference copies" 816. The components and sub-components are connected by suitable electronic communications infrastructure as described in more detail in other figures herein, e.g., within an enterprise data network, to/from cloud storage, etc. It should be noted that, for the sake of enhancing the reader's understanding of the present disclosure, the VM-payload reference copy generation sub-system 801 is shown here outside secondary storage computing device 106, but some parts of sub-system 801 do in some embodiments reside in and execute on device 106, e.g., file system data agent 942 and/or media agent 944 and/or index 953 (see FIG. 9). In other embodiments, sub-system 801 does indeed operate on computing device(s) that are distinct and separate from secondary storage device 106 depicted here, e.g., in another data center.

Figure 9:
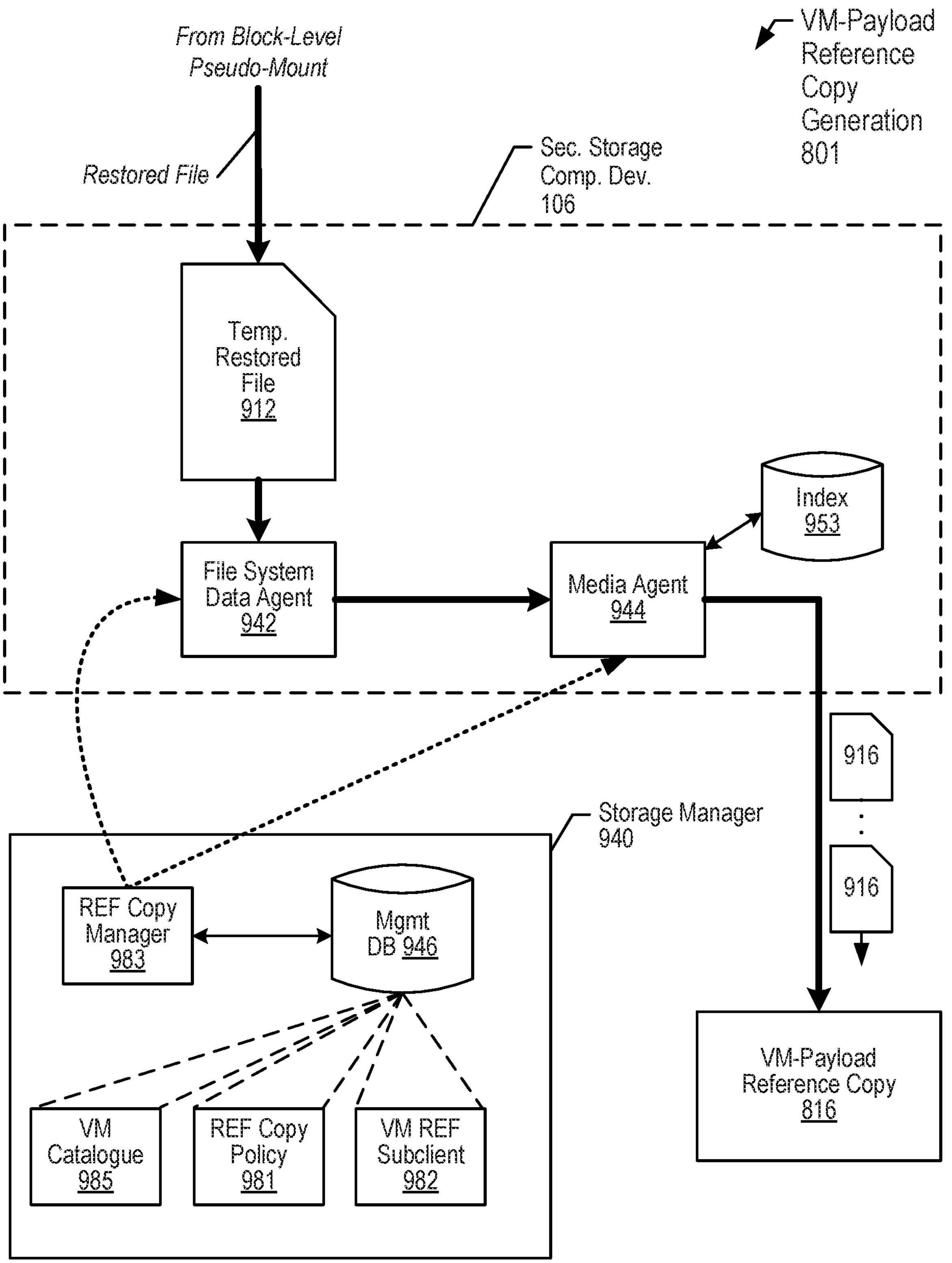
FIG. 9 is a block diagram illustrating some salient details of VM-payload reference copy generation sub-system 801 in system 800.

FIG. 9 is a block diagram illustrating some salient details of VM-payload reference copy generation sub-system 801 in system 800. FIG. 9 depicts sub-system 801 comprising: secondary storage computing device 106 (receiving a restored file from block-level pseudo-mount infrastructure discussed in other figures); VM payload reference copy 816; temporary restored file 912; file-level backup copies 916; storage manager 940, comprising reference copy manager 983 and management database 946, which comprises reference copy policy 981 and VM reference subclient definition 982, as well as VM catalogue 985; file system data agent 942; media agent 944 and associated media agent index 953. In some embodiments, file 912, data agent 942, and media agent 944 reside in and/or execute on secondary storage computing device 106. In such an embodiment, media agent 944 can additionally perform the operations of media agent 344 described in earlier figures. In alternative embodiments, these components reside in and/or execute on another secondary storage computing device 106, which is distinct and separate from the one illustrated in preceding figures, for example, being located elsewhere in the customer's data network, such as being geographically co-located with secondary storage device 808, which is where the reference copies 816 are stored.

The present figure provides an exemplary illustration of how VM-payload reference copies are generated and stored, based in part on block-level pseudo-mount infrastructure and techniques described in earlier figures.

Figure 10:
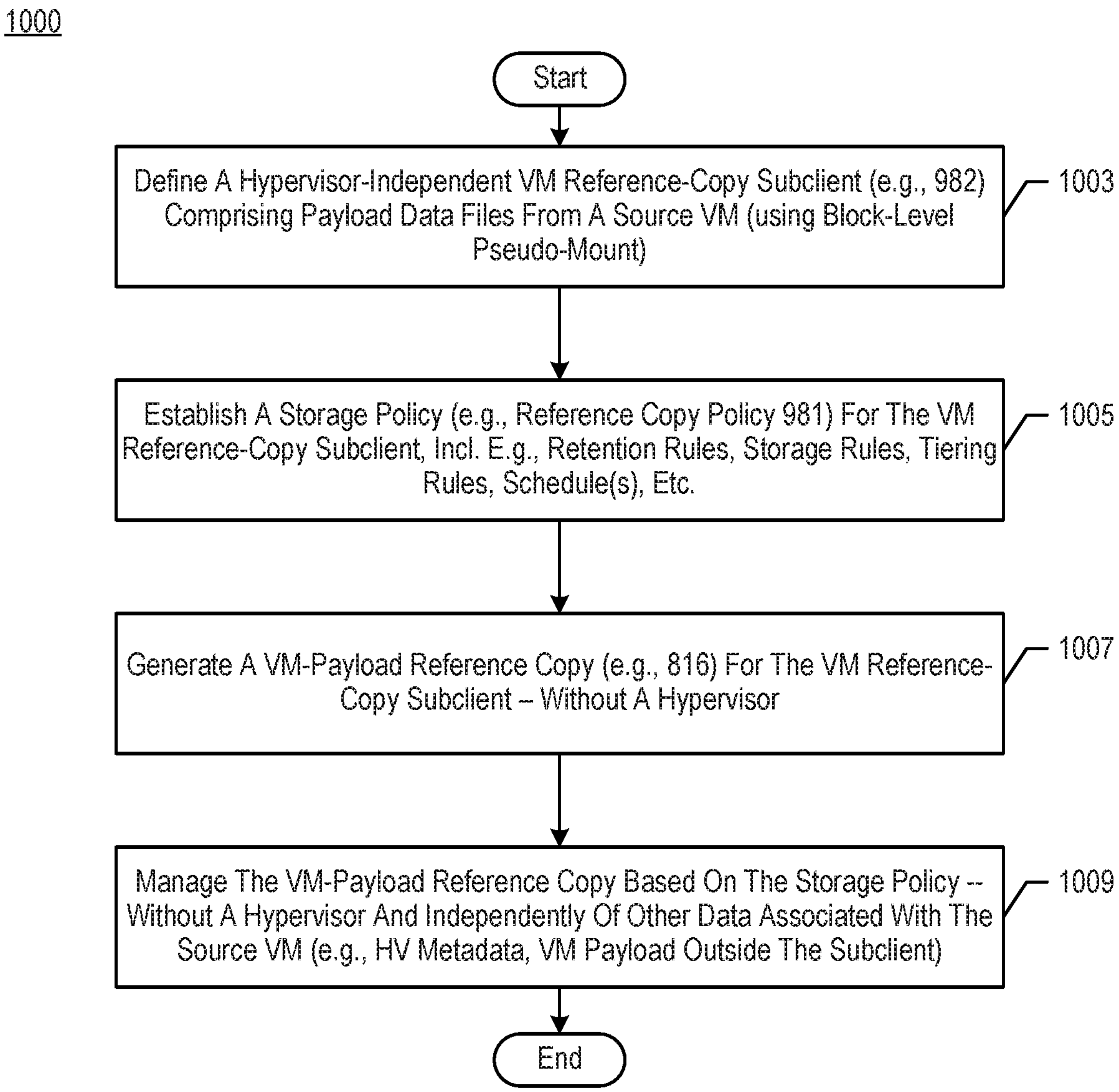
FIG. 10 depicts some salient operations of a method 1000, according to an illustrative embodiment of the present invention.

FIG. 10 depicts some salient operations of a method 1000, according to an illustrative embodiment of the present invention. Illustratively, method 1000 occurs in system 800, and is performed by one or more components of system 800, such as storage manager 940, data agent 942, and media agent 944, based in part on obtaining data from local file system 346 and using some block-level pseudo-mount infrastructure and techniques.

At block 1003, a hypervisor-independent VM reference-copy subclient (e.g., 982) is defined, e.g., via administration at the storage manager 940, by using a cloud-based console (not shown) for system administration, etc. The VM reference-copy subclient 982 is specially defined to comprise payload data files backed up from a source VM, and obtained without a hypervisor by using block-level pseudo-mount infrastructure and techniques. The subclient definition is stored to management database 946, which is logically a part of storage manager 940, and which is similar to management database 146 and comprises additional data and data structures needed for operations in system 800. The subclient comprises data that originated with a given VM, e.g., 202-1, 202-2, and therefore each VM will have at least one corresponding subclient 982.

At block 1005, a storage policy (e.g., Reference Copy Policy 981) is established for the VM reference-copy subclient 982. The policy 981 includes one or more operational parameters such as retention rules, storage rules, tiering rules, schedule(s), etc. The policy 981 is administered at the storage manager 940, and/or by using a cloud-based console (not shown) for system administration, etc. The policy 981 is stored to management database 946. The policy 981 is associated with one or more VM reference-copy subclients, such as 982, and governs the lifecycle of the data defined by these VM reference-copy subclient(s) within data storage management system 800, e.g., where the reference copy 816 is to be stored, how long it should be retained, whether/when it should be moved to lower-cost storage, etc.

At block 1007, a VM-payload reference copy (e.g., 816) is generated—without a hypervisor—for the VM reference-copy subclient 982. The reference copy 816 is illustratively stored to a suitable secondary storage device, e.g., 808.

At block 1009, the VM-payload reference copy 816 is managed on an ongoing basis based on the reference copy policy 981—without using a hypervisor and independently of other data associated with the source VM (e.g., HV metadata, VM payload data that falls outside the data defined in the subclient 981). As noted earlier, the operational parameters in policy 981 are used by storage manager 940 (e.g., using reference copy manager 983, jobs agent 156, etc.) to govern the lifecycle of VM payload reference copy 816 in system 800. Accordingly, without needing the further services of a hypervisor, the reference copy 816 will be managed, e.g., where it is to be stored, how long it is to be retained, whether/when it should be moved to lower-cost storage, etc.

Figure 11:
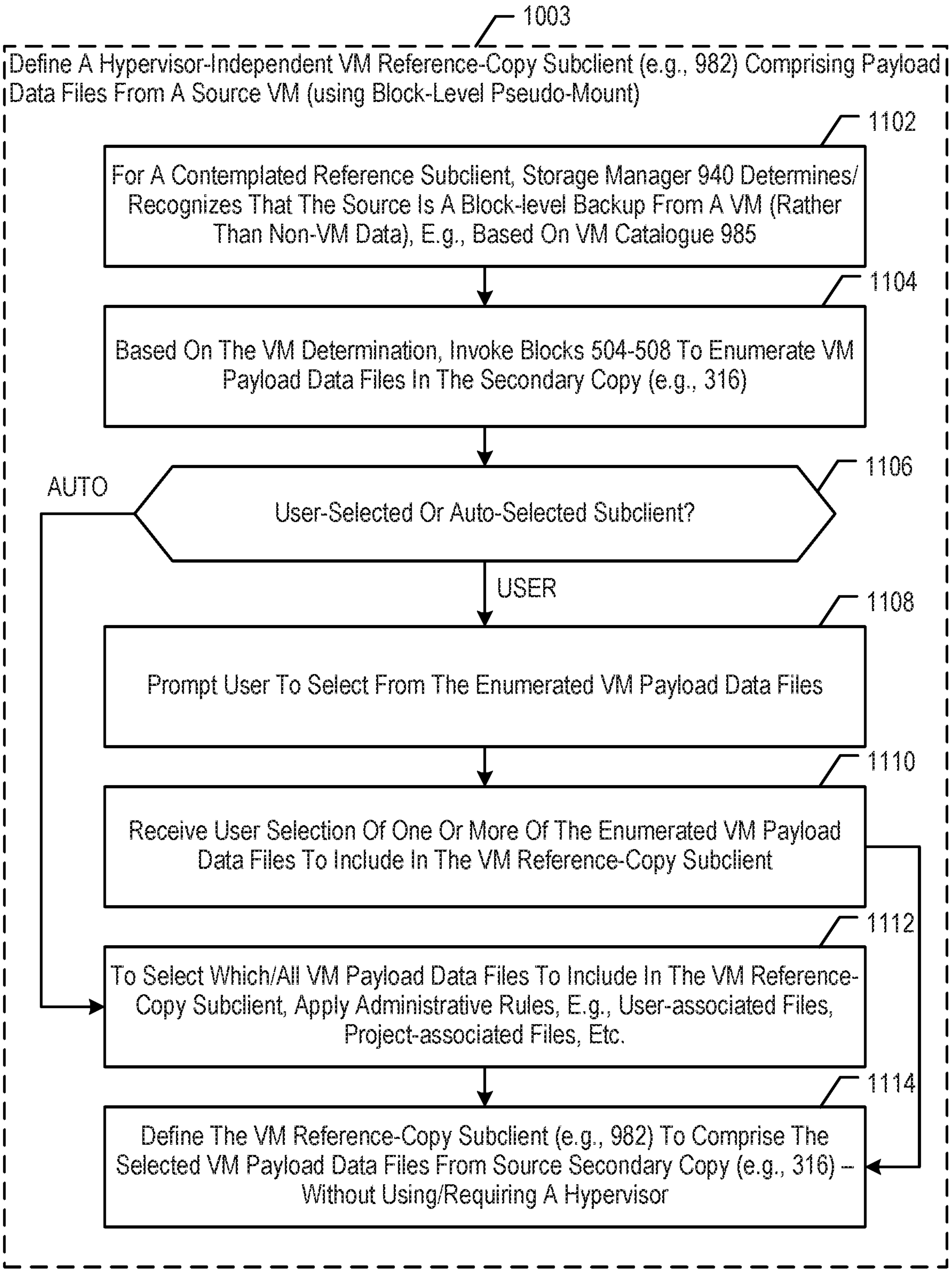
FIG. 11 depicts some salient details of block 1003 in method 1000.

FIG. 11 depicts some salient details of block 1003 in method 1000. In general, block 1003 is directed at defining, by storage manager 940, a hypervisor-independent VM reference-copy subclient (e.g., 982) comprising payload data files originating from a source VM. Block-level pseudo-mount techniques and infrastructure are used in part to accomplish this.

At block 1102, for a contemplated reference subclient, storage manager 940 determines and recognizes that the source of data is a block-level backup from a VM (in contrast to non-VM data). This determination is made based on VM tracking data, such as an illustrative VM catalogue 985, which identifies all VM clients and their respective VM virtual disk copies. Alternatively, the determination is based on metadata associated with a respective backup copy of the VM virtual disk file. Alternatively, the determination is based on metadata associated with the secondary copy of VM payload data, e.g., 316; the metadata is illustratively part of copy 316, but in alternative embodiments, the metadata is stored in illustrative VM catalogue 985, and in other embodiments it is stored elsewhere in management database 946 for speedier access than accessing the actual secondary copy 316 residing in secondary storage 108. In alternative embodiments, storage manager 940 (e.g., using reference copy manager 983) deduces the VM origination information from other sources, such as from a media agent index, e.g., 353, associated with media agent 344 that was involved in generating secondary copy 316. As noted, determining that the source data for a contemplated reference copy originated with a VM is an important element of the illustrative embodiment, because it triggers the use of block-level pseudo-mount techniques for finding the individual VM-payload data files, enumerating them, and identifying the ones to be protected in the reference copy.

At block 1104, based on the VM determination in the previous block, storage manager 940 invokes blocks 504-508 (see FIG. 5) to enumerate VM payload data files in the secondary copy (e.g., 316).

At block 1106, which is a decision point, storage manager 940 determines whether the subclient 982 will be defined by user selection (control passes to block 1108) or automatically (control passes to block 1112).

At block 1108, the enumeration resulting from block 1104 is directed to a user (e.g., system administrator, VM user, etc.). Accordingly, storage manager 940 (e.g., via a direct user interface, via cloud-based console, via network connection to user's computing device, etc.) prompts the user to select from the enumerated VM payload data files. Any suitable user interface is appropriate here, so long as it enables the user to see the enumeration of VM payload data files in secondary copy 316, and select one, a plurality, or all of the enumerated files presented. Notably, the enumeration presented to the user is based on the Live Browse features depicted in FIG. 4A. In alternative embodiments, the user who wants to see the contents of one or more enumerated files is given the opportunity to do so as shown in FIG. 4B by transmitting the restored file to the user's computing device.

At block 1110, the user's selection of one or more of the enumerated VM payload data files is received by storage manager 940 for inclusion in the VM reference-copy subclient 982. Control passes to block 1114.

At block 1112, which is reached when the file selection is automatic, storage manager 940 (e.g., using reference copy manager 983) applies administrative rules to select which (or all) VM payload data files to include in the VM reference-copy subclient 982. Examples of administrative rules, include without limitation user-associated files, project-associated files, etc. In one example, storage manager 940 selects all VM payload files enumerated from secondary copy 316. In another example, storage manager 940 identifies the VM payload files that are associated with a given project (e.g., based on file name, content indexing, tags, or other metadata, etc.) and selects the project-associated files but does not select other VM payload files in secondary copy 316 that appear not to be associated with the given project.

At block 1114, having collected the identifiers of the one or more VM payload data files that were selected in the preceding blocks, storage manager 940 (e.g., using reference copy manager 983) defines the VM reference copy subclient 982. Accordingly, storage manager 940 creates a data structure that identifies the selected VM payload data files and associates them with the present subclient 982. The data structure is illustratively stored in management database 946, e.g., as an update to existing table(s) therein, etc. Having defined a certain VM reference copy subclient 982, it should be noted that other subclients 982 can be further defined from the same source of data (e.g., 316). For example and without limitation, a first subclient 982-1 comprises all VM payload data files in the source, whereas a second subclient 982-2 comprises only the project-related data files, and a third subclient 982-3 comprises only one VM payload data file, e.g., a database, a spreadsheet, etc. created by using the source VM. Other subclients 982 are created in reference to other VMs. Notably, no hypervisor was required, used, or invoked in the course of performing the present operations in block 1003. Thus, the VM reference-copy subclient(s) 982 defined here is/are said to be hypervisor-independent even though the constituent data file(s) originated from a VM.

Figure 12:
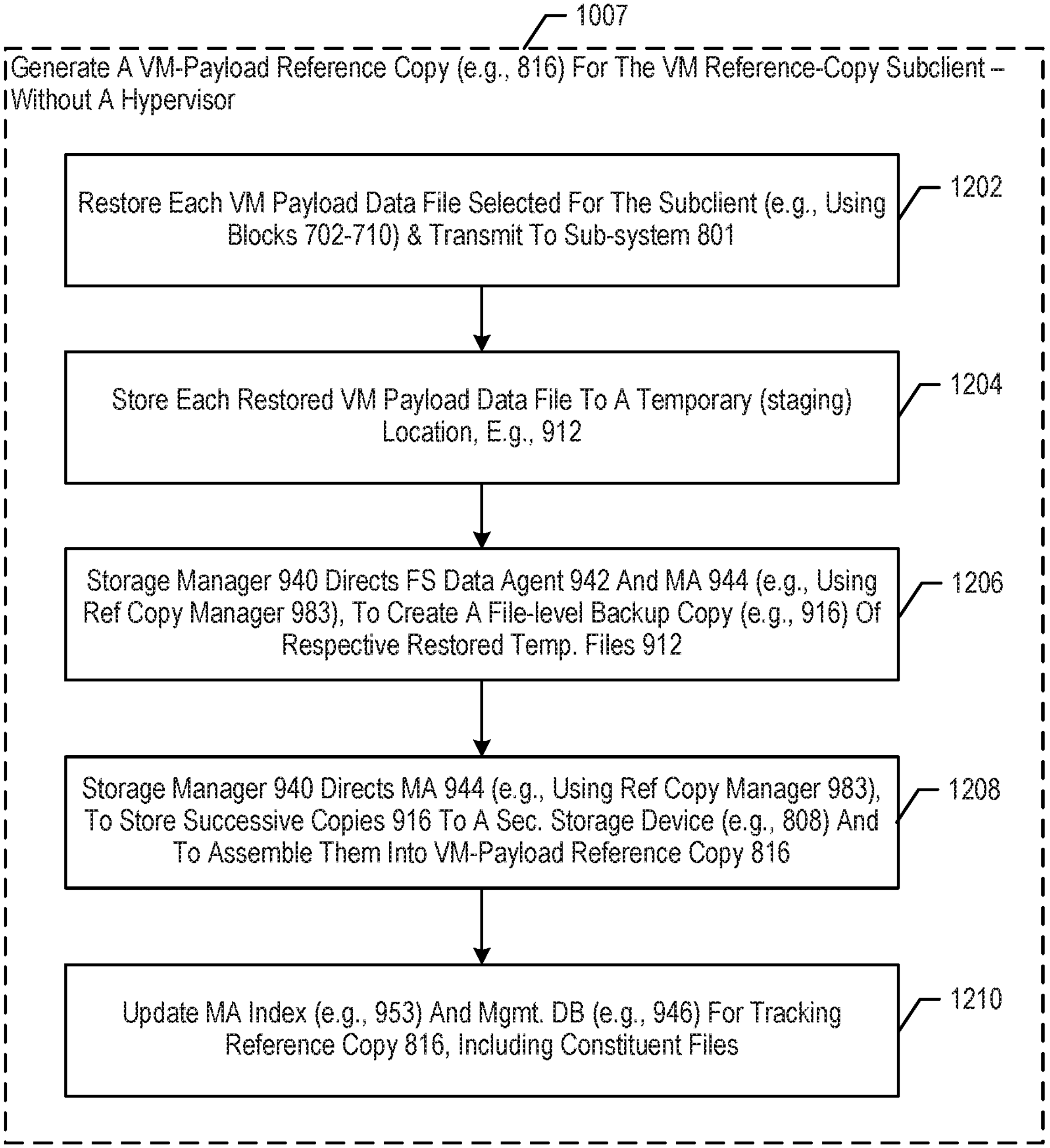
FIG. 12 depicts some salient details of block 1007 in method 1000.

FIG. 12 depicts some salient details of block 1007 in method 1000. In general, block 1007 is directed to generating, in system 880, a hypervisor-independent VM-payload reference copy (e.g., 816) for the VM reference-copy subclient 982. A hypervisor is not used in the illustrative generation process nor is a hypervisor needed for recovering the data in reference copy 816.

At block 1202, each VM payload data file selected for the subclient is restored to a native (primary data) format (e.g., using blocks 702-710 in FIG. 7). The restored file is transmitted to sub-system 801, e.g., by media agent 344 or by data agent 142 as shown in FIG. 4B.

At block 1204, each restored VM payload data file is stored to a temporary (staging) location, e.g., file 912. As explained earlier, in some embodiments the staging location and subsequent processing as shown in FIG. 9 is co-located with the block-level pseudo-mount infrastructure shown in FIG. 4B. In alternative embodiments, the staging location and subsequent processing as shown in FIG. 9 is located apart from the block-level pseudo-mount infrastructure shown in FIG. 4B, e.g., at a location proximate to secondary storage device 808 which houses VM reference copy 816.

At block 1206, storage manager 940 directs (e.g., using reference copy manager 983) file system data agent 942 and media agent 944, to create a file-level backup copy (e.g., 916) of respective restored temporary files 912. Accordingly, data agent 942 in conjunction with media agent 944 process temporary file 912 into a backup copy 916, e.g., having a backup format.

At block 1208, storage manager 940 (e.g., using reference copy manager 983), directs media agent 944 to store successive copies 916 to a secondary storage device (e.g., 808) and to assemble the plurality of copies 916 into VM-payload reference copy 816. Accordingly, the copies 916 are individually created, stored to secondary storage, and associated with other copies 916 that are part of the same subclient 982. In some embodiments VM-payload reference copy 816 is a logical collection of copy files 916. The logical collection is treated as a unit—reference copy 816—but the data is stored in individual backup copies 916.

In some alternative embodiments, blocks 1206 and 1208 operate differently to collate all temporary files 912 into a collective data structure (not shown), which acts as a file folder, and which is then backed up to a unitary backup file 916, which is then stored to secondary storage 808 as VM-payload reference copy 816. In this case, reference copy 816 is physically a unified file. Constituent VM payload data files can still be individually recovered, as they are indexed in the process of creating the reference copy 816.

At block 1210, indexes and tracking data structures are updated. For example, media agent index (e.g., 953) and management database (e.g., 946) are updated for tracking reference copy 816, including constituent files therein. It should be noted that in some embodiments reference copy 816 takes advantage of storage efficiency techniques, e.g., data compression, deduplication. Also, reference copy 816 can be encrypted.

However, none of the illustrative embodiments herein contemplate the use of a hypervisor for purposes of exploring the initial VM backup copy (e.g., 316), enumerating VM payload files, restoring VM payload files, and creating and indexing VM-payload reference copy 816. Thus, VM-payload reference copy 816 is said to be hypervisor-independent. Furthermore, because the reference copy 816 is created based on a predefined subclient definition (e.g., 982), it protects the respective selected VM payload data files independently of how other VM payload data files (e.g., in secondary copy 316) are managed in system 800, e.g., having its own policy for retention, storage, tiering, schedule, etc.; as well as independent of how metadata associated with the VM and hypervisor from which the VM payload data originated is managed in system 800.

In regard to the figures described herein, other embodiments are possible within the scope of the present invention, such that the above-recited components, steps, blocks, operations, messages, requests, queries, instructions, and/or prompts are differently arranged, sequenced, sub-divided, organized, and/or combined. In some embodiments, a different component may initiate or execute a given operation.

Example Embodiments

Some example enumerated embodiments of the present invention are recited in this section in the form of methods, systems, and non-transitory computer-readable media, without limitation.

A method associated with a data storage management system, the method comprising: generating a hypervisor-independent reference copy comprising one or more virtual-machine payload data files that originated from a first virtual machine, wherein the generating is based on enumerating the one or more virtual-machine payload data files from a block-level backup copy of a virtual disk file associated with the first virtual machine.

A data storage management system comprising: one or more computing devices, comprising one or more respective processors and corresponding computer-readable memory, configured to generate a hypervisor-independent reference copy comprising one or more virtual-machine payload data files that originated from a first virtual machine, wherein the hypervisor-independent reference copy is generated based on enumerating the one or more virtual-machine payload data files from a block-level backup copy of a virtual disk file associated with the first virtual machine.

A computer-readable medium, excluding transitory propagating signals, storing instructions that, when executed by at least one computing device comprising one or more processors and computer-readable memory, cause the computing device to perform operations comprising: generating a hypervisor-independent reference copy comprising one or more virtual-machine payload data files that originated from a first virtual machine, wherein the generating is based on enumerating the one or more virtual-machine payload data files from a block-level backup copy of a virtual disk file associated with the first virtual machine.

A method associated with a data storage management system, the method comprising: generating a hypervisor-independent reference copy comprising one or more virtual-machine payload data files that originated from a first virtual machine, wherein the generating is based on block-level pseudo-mount operations of a block-level backup copy of a virtual disk file associated with the first virtual machine.

A data storage management system comprising: one or more computing devices, comprising one or more respective processors and corresponding computer-readable memory, configured to generate a hypervisor-independent reference copy comprising one or more virtual-machine payload data files that originated from a first virtual machine, wherein the hypervisor-independent reference copy is generated based on block-level pseudo-mount operations of a block-level backup copy of a virtual disk file associated with the first virtual machine.

A computer-readable medium, excluding transitory propagating signals, storing instructions that, when executed by at least one computing device comprising one or more processors and computer-readable memory, cause the computing device to perform operations comprising: generating a hypervisor-independent reference copy comprising one or more virtual-machine payload data files that originated from a first virtual machine, wherein the generating is based on block-level pseudo-mount operations of a block-level backup copy of a virtual disk file associated with the first virtual machine.

A method for generating a hypervisor-independent reference copy in a data storage management system, the method comprising: generating a reference copy comprising one or more virtual-machine payload data files that originated from a first virtual machine, wherein the generating is based on enumerating the one or more virtual-machine payload data files from a block-level backup copy of a virtual disk file associated with the first virtual machine. The above-recited method wherein the generating comprises: restoring each of the one or more virtual-machine payload data files from the block-level backup copy of the virtual disk. The above-recited method wherein the generating comprises: creating a file-level backup copy, in a backup format, of each respective restored virtual-machine payload data file. The above-recited method wherein the generating comprises: assembling (logically and/or physically) the file-level backup copies created from the respective one or more restored virtual-machine payload data files into the reference copy. The above-recited method wherein the restoring, creating, and assembling operations are performed without a hypervisor, thereby generating the reference copy in a hypervisor-independent format.

The above-recited method wherein the enumerating is based on determining that at least one source for the reference copy originated with a virtual machine. The above-recited method wherein the enumerating is based on determining that at least one source for the reference copy originated with a virtual machine, thereby necessitating block-level pseudo-mounting of the block-level backup copy of the virtual disk file associated with the first virtual machine. The above-recited method wherein the enumerating is enabled by block-level pseudo-mounting of the block-level backup copy of the virtual disk file associated with the first virtual machine. The above-recited method wherein the generating is further based on block-level pseudo-mounting of the block-level backup copy of the virtual disk file associated with the first virtual machine. The above-recited method wherein a storage manager initiates the generating of the reference copy based on a reference-copy subclient that defines the one or more virtual-machine payload data files to be included in the reference copy. The above-recited method wherein a storage manager instructs a file-system data agent and a media agent to restore each of the one or more virtual-machine payload data files from the block-level backup copy of the virtual disk. The above-recited method wherein a storage policy comprises a rule for selecting the one or more virtual-machine payload data files to be included in the reference copy. The above-recited method wherein a storage manager initiates the generating of the reference copy based on parameters in a storage policy that comprises a rule for selecting the one or more virtual-machine payload data files to be included in the reference copy. The above-recited method wherein the reference copy protects the one or more virtual-machine payload data files restored from the block-level backup copy of the virtual disk independently of how the data storage management system manages other data in the block-level backup copy of the virtual disk. The above-recited method wherein a storage policy comprises a rule for selecting the one or more virtual-machine payload data files to be included in the reference copy; and wherein the reference copy protects the one or more virtual-machine payload data files restored from the block-level backup copy of the virtual disk independently of how the data storage management system manages other data in the block-level backup copy of the virtual disk. The above-recited method wherein the reference copy protects the one or more virtual-machine payload data files restored from the block-level backup copy of the virtual disk independently of how the data storage management system manages metadata associated with the first virtual machine from which the virtual disk originated. The above-recited method wherein a storage policy comprises a rule for selecting the one or more virtual-machine payload data files to be included in the reference copy; and wherein the reference copy protects the one or more virtual-machine payload data files restored from the block-level backup copy of the virtual disk independently of how the data storage management system manages metadata associated with the first virtual machine from which the virtual disk originated. The above-recited method wherein the reference copy protects the one or more virtual-machine payload data files restored from the block-level backup copy of the virtual disk independently of how the data storage management system manages other data in the block-level backup copy of the virtual disk, including metadata associated with the first virtual machine from which the virtual disk originated.

The above-recited method wherein VM payload data files are identified within block-level backups that lack file-level differentiation—apart from the VM's hypervisor metadata in the block-level backups. The above-recited method wherein generating the reference copy does not depend upon a continued operation of the VM that created the payload data files, or upon a later re-activation of a VM to access the VM payload data files.

A method for generating a hypervisor-independent reference copy in a data storage management system, the method comprising: generating a hypervisor-independent reference copy comprising one or more virtual-machine payload data files that originated from a first virtual machine, wherein the generating is based on block-level pseudo-mounting of a block-level backup copy of a virtual disk file associated with the first virtual machine. The above-recited method wherein the generating comprises: restoring each of the one or more virtual-machine payload data files from the block-level backup copy of the virtual disk. The above-recited method wherein the generating comprises: creating a file-level backup copy, in a backup format, of each respective restored virtual-machine payload data file. The above-recited method wherein the generating comprises: assembling (logically and/or physical) the file-level backup copies created from the respective one or more restored virtual-machine payload data files into the reference copy. The above-recited method wherein the restoring, creating, and assembling operations are performed without a hypervisor, thereby generating the reference copy in a hypervisor-independent format.

The above-recited method wherein the generating is further based on enumerating the one or more virtual-machine payload data files from the pseudo-mounted block-level backup copy of the virtual disk file associated with the first virtual machine. The above-recited method wherein the pseudo-mounting is based on determining that at least one source for the reference copy originated with a virtual machine. The above-recited method wherein a storage manager initiates the generating of the reference copy based on a reference-copy subclient that defines the one or more virtual-machine payload data files to be included in the reference copy. The above-recited method wherein a storage manager initiates the generating of the reference copy based on parameters in a storage policy that comprises a rule for selecting the one or more virtual-machine payload data files to be included in the reference copy. The above-recited method wherein the reference copy protects the one or more virtual-machine payload data files restored from the block-level backup copy of the virtual disk independently of how the data storage management system manages other data in the block-level backup copy of the virtual disk, including metadata associated with the first virtual machine from which the virtual disk originated. The above-recited method wherein generating the reference copy does not depend upon a continued operation of the VM that created the payload data files, or upon a later re-activation of a VM to access the VM payload data files.

A data storage management system comprising one or more computing devices, comprising one or more respective processors and corresponding computer-readable memory, configured to generate a reference copy comprising one or more virtual-machine payload data files that originated from a first virtual machine, wherein the hypervisor-independent reference copy is generated based on enumerating the one or more virtual-machine payload data files from a block-level backup copy of a virtual disk file associated with the first virtual machine. The above-recited system wherein a first one of the computing devices is configured to, without using a hypervisor: restore each of the one or more virtual-machine payload data files from the block-level backup copy of the virtual disk. The above-recited system wherein a first one of the computing devices is configured to, without using a hypervisor: create a file-level backup copy, in a backup format, of each respective restored virtual-machine payload data file. The above-recited system wherein a first one of the computing devices is configured to, without using a hypervisor: assemble the file-level backup copies created from the respective one or more restored virtual-machine payload data files into the reference copy, thereby generating the reference copy that is hypervisor-independent. The above-recited system wherein the reference copy is hypervisor-independent.

The above-recited system wherein the reference copy protects the one or more virtual-machine payload data files restored from the block-level backup copy of the virtual disk independently of how the data storage management system manages other data in the block-level backup copy of the virtual disk. The above-recited system wherein a storage policy comprises a rule for selecting the one or more virtual-machine payload data files to be included in the reference copy; and wherein the reference copy protects the one or more virtual-machine payload data files restored from the block-level backup copy of the virtual disk independently of how the data storage management system manages other data in the block-level backup copy of the virtual disk. The above-recited system wherein the reference copy protects the one or more virtual-machine payload data files restored from the block-level backup copy of the virtual disk independently of how the data storage management system manages metadata associated with the first virtual machine from which the virtual disk originated. The above-recited system wherein a storage policy comprises a rule for selecting the one or more virtual-machine payload data files to be included in the reference copy; and wherein the reference copy protects the one or more virtual-machine payload data files restored from the block-level backup copy of the virtual disk independently of how the data storage management system manages metadata associated with the first virtual machine from which the virtual disk originated. The above-recited system wherein generating the reference copy does not depend upon a continued operation of the VM that created the payload data files, or upon a later re-activation of a VM to access the VM payload data files.

In other embodiments, a system or systems may operate according to one or more of the methods and/or computer-readable media recited in the preceding paragraphs. In yet other embodiments, a method or methods may operate according to one or more of the systems and/or computer-readable media recited in the preceding paragraphs. In yet more embodiments, a computer-readable medium or media, excluding transitory propagating signals, may cause one or more computing devices having one or more processors and non-transitory computer-readable memory to operate according to one or more of the systems and/or methods recited in the preceding paragraphs.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C. sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A method for generating a hypervisor-independent reference copy from a block-level copy of a virtual disk file in a data storage management system, the method comprising:

backing up a virtual disk file of a first virtual machine to a block-level backup copy by separating hypervisor-dependent metadata of the virtual disk file from one or more virtual-machine payload data files of the virtual disk file;

generating a reference copy comprising the one or more virtual-machine payload data files that originated from the first virtual machine, wherein:

the generating is based on enumerating the one or more virtual-machine payload data files from the block-level backup copy of the virtual disk file associated with the first virtual machine without reference to the hypervisor-dependent metadata, the generating comprises:

restoring each of the one or more virtual-machine payload data files from the block-level backup copy of the virtual disk file, creating a file-level backup copy, in a backup format, of each respective restored virtual-machine payload data file, and logically assembling the file-level backup copies created from the respective one or more restored virtual-machine payload data files into the reference copy; and the restoring, creating, and assembling are performed without a hypervisor and without adding the hypervisor-dependent metadata to the reference copy, thereby generating the reference copy in a hypervisor-independent format.

2. The method of claim 1, wherein the enumerating is based on determining that at least one source for the reference copy originated with a virtual machine.

3. The method of claim 1, wherein the enumerating is based on determining that at least one source for the reference copy originated with a virtual machine, thereby necessitating block-level pseudo-mounting of the block-level backup copy of the virtual disk file associated with the first virtual machine.

4. The method of claim 1, wherein the enumerating is enabled by block-level pseudo-mounting of the block-level backup copy of the virtual disk file associated with the first virtual machine.

5. The method of claim 1, wherein the generating is further based on block-level pseudo-mounting of the block-level backup copy of the virtual disk file associated with the first virtual machine.

6. The method of claim 1, wherein a storage manager initiates the generating of the reference copy based on a reference-copy subclient that defines the one or more virtual-machine payload data files to be included in the reference copy.

7. The method of claim 1, wherein a storage manager instructs a file-system data agent and a media agent to restore each of the one or more virtual-machine payload data files from the block-level backup copy of the virtual disk file.

8. The method of claim 1, wherein a storage manager initiates the generating of the reference copy based on parameters in a storage policy that comprises a rule for selecting the one or more virtual-machine payload data files to be included in the reference copy.

9. The method of claim 1, wherein a storage policy comprises a rule for selecting the one or more virtual-machine payload data files to be included in the reference copy.

10. The method of claim 9, wherein the reference copy protects the one or more virtual-machine payload data files restored from the block-level backup copy of the virtual disk file independently of how the data storage management system manages other data in the block-level backup copy of the virtual disk file and also independently of how the data storage management system manages metadata associated with the first virtual machine from which the virtual disk file originated.

11. The method of claim 1, wherein the reference copy protects the one or more virtual-machine payload data files restored from the block-level backup copy of the virtual disk file independently of how the data storage management system manages other data in the block-level backup copy of the virtual disk file, including metadata associated with the first virtual machine from which the virtual disk file originated.

12. The method of claim 1, wherein the generating of the reference copy does not depend upon a continued operation of the first virtual machine that created the virtual-machine payload data files, or upon a later re-activation of a virtual machine to access the virtual-machine payload data files in the reference copy.

13. A method for generating a hypervisor-independent reference copy in a data storage management system, the method comprising:

backing up a virtual disk file of a first virtual machine to a block-level backup copy by separating hypervisor-dependent metadata of the virtual disk file from one or more virtual-machine payload data files of the virtual disk file;

generating a reference copy comprising the one or more virtual-machine payload data files that originated from the first virtual machine, wherein:

the generating is based on block-level pseudo-mounting of a block-level backup copy of a virtual disk file associated with the first virtual machine, the generating comprises:

restoring each of the one or more virtual-machine payload data files from the block-level backup copy of the virtual disk file, creating a file-level backup copy, in a backup format, of each respective restored virtual-machine payload data file, and logically assembling the file-level backup copies created from the respective one or more restored virtual-machine payload data files into the reference copy; and the restoring, creating, and assembling operations are performed without a hypervisor and without adding the hypervisor-dependent metadata to the reference copy, thereby generating the reference copy in a hypervisor-independent format.

14. The method of claim 13, wherein the generating is further based on enumerating the one or more virtual-machine payload data files from the pseudo-mounted block-level backup copy of the virtual disk file associated with the first virtual machine.

15. The method of claim 13, wherein the pseudo-mounting is based on determining that at least one source for the reference copy originated with a virtual machine.

16. The method of claim 13, wherein a storage manager initiates the generating of the reference copy based on a reference-copy subclient that defines the one or more virtual-machine payload data files to be included in the reference copy.

17. The method of claim 13, wherein a storage manager initiates the generating of the reference copy based on parameters in a storage policy that comprises a rule for selecting the one or more virtual-machine payload data files to be included in the reference copy.

18. A data storage management system comprising:

one or more computing devices, comprising one or more respective processors and corresponding computer-readable memory, configured to:

backing up a virtual disk file of a first virtual machine to a block-level backup copy by separating hypervisor-dependent metadata of the virtual disk file from one or more virtual-machine payload data files of the virtual disk file;

generate a reference copy comprising one or more virtual-machine payload data files that originated from the first virtual machine, wherein the reference copy is generated based on enumerating the one or more virtual-machine payload data files from the block-level backup copy of a virtual disk file associated with the first virtual machine without reference to the hypervisor-dependent metadata; and wherein a first one of the computing devices is configured to, without using a hypervisor:

restore each of the one or more virtual-machine payload data files from the block-level backup copy of the virtual disk file, create a file-level backup copy, in a backup format, of each respective restored virtual-machine payload data file, and assemble the file-level backup copies created from the respective one or more restored virtual-machine payload data files into the reference copy without adding the hypervisor-dependent metadata to the reference copy, thereby generating the reference copy that is hypervisor-independent.

19. The data storage management system of claim 18, wherein the reference copy protects the one or more virtual-machine payload data files restored from the block-level backup copy of the virtual disk file independently of how the data storage management system manages other data in the block-level backup copy of the virtual disk file.

20. The data storage management system of claim 18, wherein the reference copy protects the one or more virtual-machine payload data files restored from the block-level backup copy of the virtual disk file independently of how the data storage management system manages metadata associated with the first virtual machine from which the virtual disk file originated.

* * * * *